US012545524B2

(12) United States Patent
Guerra et al.

(10) Patent No.: US 12,545,524 B2
(45) Date of Patent: Feb. 10, 2026

(54) VERTICAL CONVEYING SYSTEM

(71) Applicant: Lewco, Inc., Sandusky, OH (US)

(72) Inventors: Ronald J. Guerra, Sandusky, OH (US); Louis B. Schaefer, V, Medina, OH (US)

(73) Assignee: LEWCO, Inc., Sandusky, OH (US)

( * ) Notice: Subject to any disclaimer, the term of this patent is extended or adjusted under 35 U.S.C. 154(b) by 199 days.

(21) Appl. No.: 18/544,359

(22) Filed: Dec. 18, 2023

(65) Prior Publication Data

US 2025/0197124 A1      Jun. 19, 2025

(51) Int. Cl.
*B65G 37/00* (2006.01)
*B65G 1/127* (2006.01)
*B65G 43/00* (2006.01)

(52) U.S. Cl.
CPC .......... *B65G 37/005* (2013.01); *B65G 1/127* (2013.01); *B65G 43/00* (2013.01); *B65G 2203/0283* (2013.01); *B65G 2203/042* (2013.01); *B65G 2207/14* (2013.01)

(58) Field of Classification Search
CPC .. B65G 1/127; B65G 47/5113; B65G 37/005; B65G 43/00; B65G 2203/0283; B65G 2203/042; B65G 2207/14
See application file for complete search history.

(56) References Cited

U.S. PATENT DOCUMENTS

| | | |
|---|---|---|
| 1,020,746 A | 3/1912 | Dehler |
| 1,830,740 A | 11/1931 | Leech et al. |
| 2,563,514 A | 8/1951 | Brosamer |
| 3,495,720 A | 2/1970 | Mann, Jr. et al. |
| 3,533,495 A | 10/1970 | Wallace |
| 3,622,043 A | 11/1971 | Chotard |
| 3,703,870 A | 11/1972 | Walton |

(Continued)

FOREIGN PATENT DOCUMENTS

| | | | | |
|---|---|---|---|---|
| DE | 102010016777 A1 | 11/2011 | | |
| FR | 2530926 A1 | * 2/1984 | ............... | A21B 1/42 |
| JP | 62-157123 | * 7/1987 | ............. | B65G 47/52 |

OTHER PUBLICATIONS

EMULATE3D, Industrial Controls Testing, Simulation, VR and AR, Demo3D USS Vertical Indexing Conveyor, https://www.youtube.com/watch?v=uLnJNpN7ioM, Accessed: May 3, 2024.

*Primary Examiner* — James R Bidwell
(74) *Attorney, Agent, or Firm* — CALFEE, HALTER & GRISWOLD LLP

(57) ABSTRACT

A conveyor system includes a first vertical conveyor, a second vertical conveyor adjacent to the first vertical conveyor, and a lateral conveyor disposed at least partially above the first and second conveyors. The system may independently convey a carrier through the system for temporary buffer storage, such as in an oven application to increase time at a desired temperature. The first vertical conveyor may elevate a carrier to couple with lateral supports of the lateral conveyor. The lateral conveyor may laterally convey the carrier to a position above the second vertical conveyor via the lateral supports. The second vertical conveyor may decouple the carrier from the lateral support and lower the carrier through the second vertical conveyor. The system may also include a controller configured to control operation of the conveyors.

19 Claims, 35 Drawing Sheets

(56) References Cited

U.S. PATENT DOCUMENTS

| | | |
|---|---|---|
| 3,732,971 A | 5/1973 | Simonsen |
| 3,738,506 A | 6/1973 | Cornford et al. |
| 3,902,427 A | 9/1975 | Kastenbein |
| 3,902,590 A | 9/1975 | Raynor et al. |
| 3,967,740 A * | 7/1976 | Molins ................ B65G 1/127 |
| | | 414/331.14 |
| 3,993,189 A * | 11/1976 | Khoylian ................ F25D 25/04 |
| | | 198/604 |
| 4,022,334 A | 5/1977 | Lassig |
| 4,214,848 A | 7/1980 | Stanton et al. |
| RE30,742 E | 9/1981 | Weier |
| 4,392,768 A | 7/1983 | Van Capelleveen |
| 4,421,227 A | 12/1983 | Kornylak |
| 4,464,998 A | 8/1984 | Wakabayashi |
| 4,509,893 A | 4/1985 | Nashimoto et al. |
| 4,643,495 A | 2/1987 | Pepping et al. |
| 4,770,286 A | 9/1988 | Opperthauser |
| 4,909,697 A | 3/1990 | Bernard, II et al. |
| 4,968,207 A | 11/1990 | Lichti |
| 4,987,992 A | 1/1991 | Pfleger |
| 5,050,726 A | 9/1991 | Flagg et al. |
| 5,073,081 A | 12/1991 | Johnson |
| 5,101,963 A | 4/1992 | Skarlupka et al. |
| 5,139,388 A | 8/1992 | Martin |
| 5,203,256 A * | 4/1993 | Mueller ................ A21C 13/02 |
| | | 99/476 |
| 5,253,743 A * | 10/1993 | Haas, Sr. ................ A21C 15/00 |
| | | 198/347.4 |
| 5,320,210 A | 6/1994 | Van Den Bergh et al. |
| 5,350,050 A * | 9/1994 | Franke ................ B65G 1/06 |
| | | 414/280 |
| 5,473,978 A * | 12/1995 | Colombo ............. B65G 17/123 |
| | | 99/477 |
| 5,588,790 A | 12/1996 | Lichti |
| 5,718,322 A | 2/1998 | Mulhern |
| 5,881,650 A | 3/1999 | Gersemsky et al. |
| 5,906,484 A * | 5/1999 | Imai ................. H01L 21/67109 |
| | | 198/775 |
| 5,984,620 A | 11/1999 | Heston |
| 6,321,899 B1 | 11/2001 | Hannessen |
| 6,523,462 B1 | 2/2003 | Johnson et al. |
| 6,533,533 B1 | 3/2003 | Heston |
| 6,860,088 B2 | 3/2005 | Goodman |
| 7,278,532 B2 | 10/2007 | Martin |
| 7,329,081 B2 | 2/2008 | Baker et al. |
| 7,653,457 B2 * | 1/2010 | Bloom ..................... G07C 9/23 |
| | | 700/226 |
| 7,736,120 B2 | 6/2010 | Pierson et al. |
| 8,770,385 B2 | 7/2014 | Hannessen |
| 9,096,375 B2 | 8/2015 | Lert et al. |
| 9,371,183 B2 | 6/2016 | Toebes et al. |
| 9,694,975 B2 | 7/2017 | Lert et al. |
| 10,301,114 B2 | 5/2019 | Fenile |
| 10,302,665 B2 | 5/2019 | Freeman et al. |
| 10,633,195 B2 | 4/2020 | Gadliger |
| 11,702,292 B2 | 7/2023 | Andreae et al. |
| 2004/0238326 A1 | 12/2004 | Lichti |
| 2004/0247416 A1 | 12/2004 | Komatsu et al. |
| 2005/0269765 A1 | 12/2005 | Widmer et al. |
| 2013/0287537 A1 * | 10/2013 | Hecht ..................... B65G 1/04 |
| | | 414/788.4 |
| 2014/0017057 A1 | 1/2014 | Haehnel et al. |
| 2019/0322456 A1 | 10/2019 | Propp et al. |

\* cited by examiner

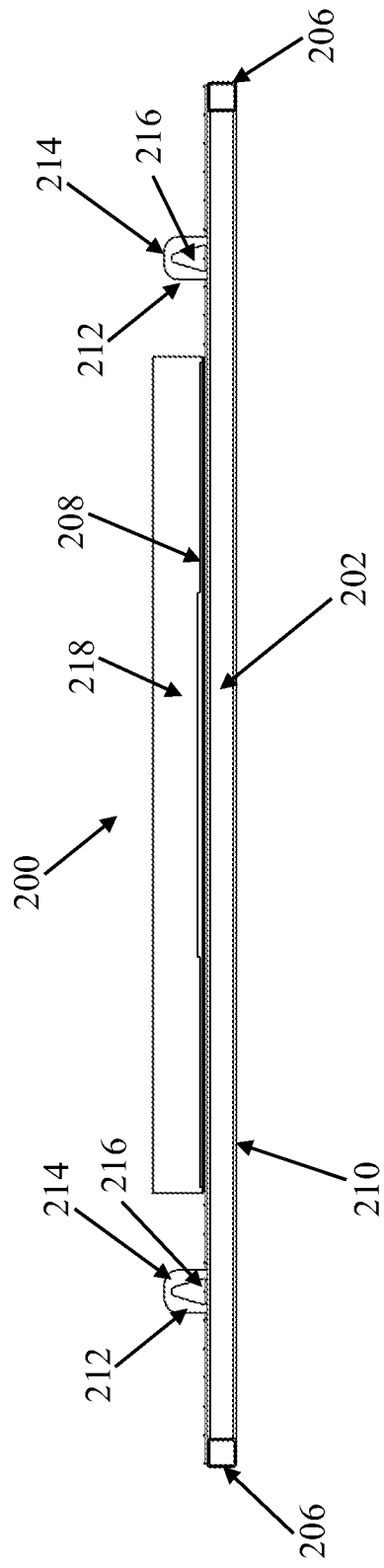
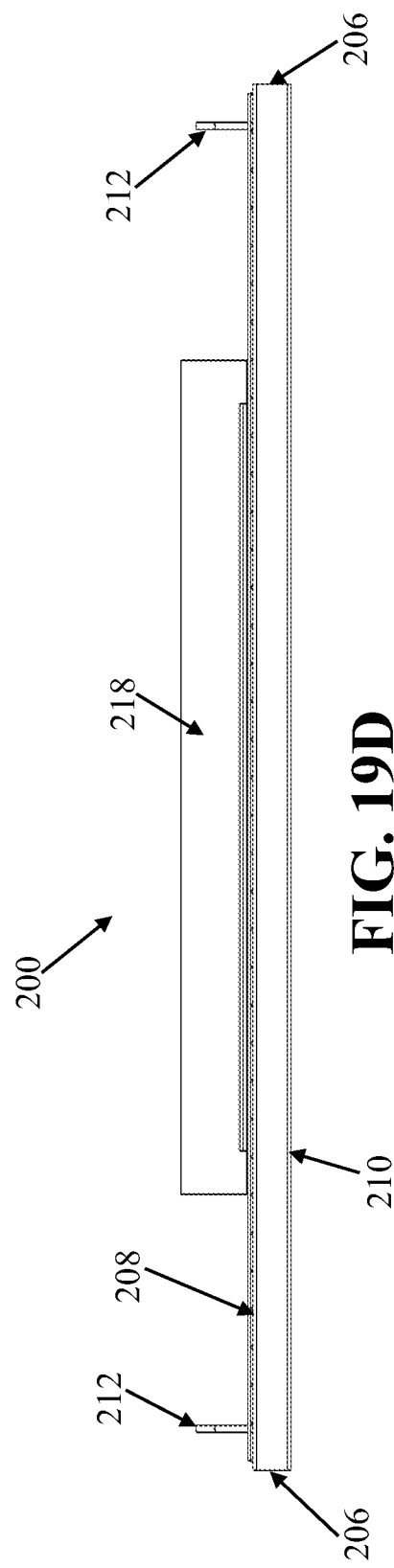
FIG. 19C
FIG. 19D

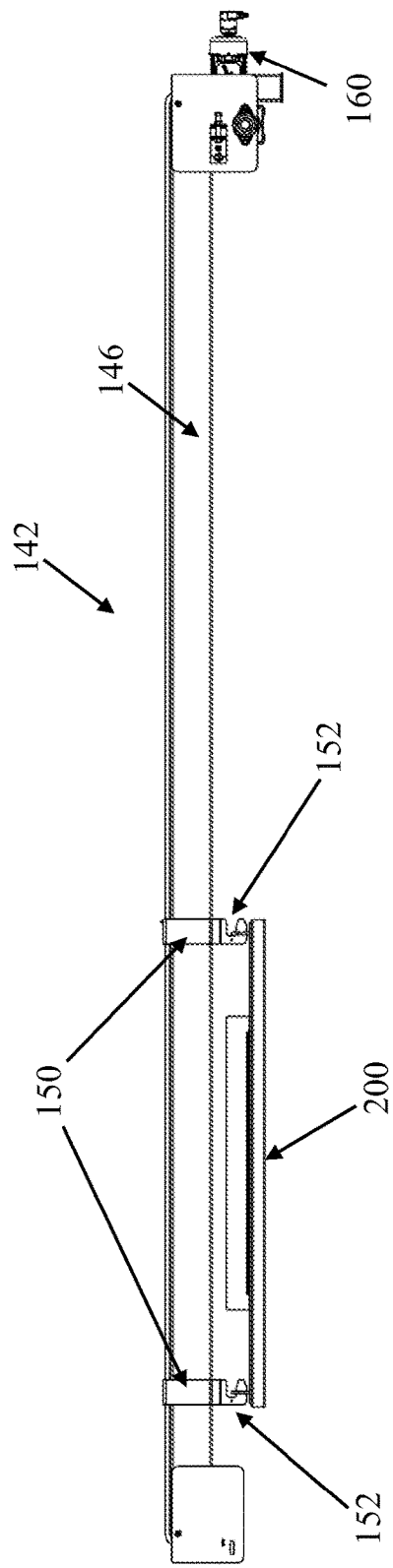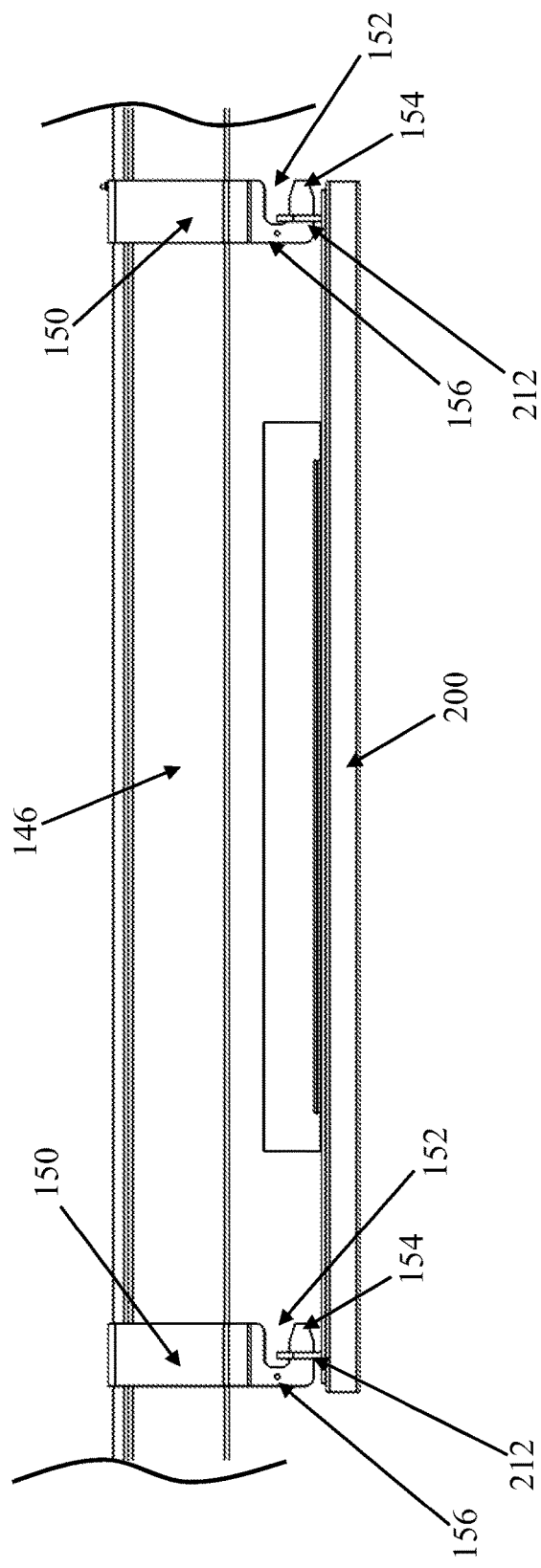
FIG. 22D
FIG. 22E

VERTICAL CONVEYING SYSTEM

TECHNICAL FIELD

The present application relates generally to vertical conveying systems and, more particularly, to conveying systems configured to vertically raise, laterally transfer, and vertically lower an independent pallet or container.

BACKGROUND OF THE INVENTION

Conveying systems may be used to control or regulate the conveyance of objects within an environment or operation, such as a manufacturing operation. In some conveying systems, at least a portion of the system is configured to increase the amount of time a conveyed object remains in the particular portion of the system, such as to provide buffer storage, to regulate/optimize the overall throughput of the system, or for manufacturing or assembly purposes. Some conventional conveying systems reduce or decrease the speed at which objects are conveyed through, such as by reducing conveyor belt speeds, to increase the overall time conveyed objects spend in the system. However, reducing the speed of the conveying system also reduces the number of objects which may be conveyed through the system, which may reduce the number of items which may be manufactured, assembled, or otherwise output (i.e., the throughput). Additionally or alternatively, conventional conveying systems may increase the length of conveyor segments such that objects remain on conveyor for longer periods of time. However, such configurations may be expensive, impractical, and/or impossible in a given environment, such as manufacturing plants with limited floor space.

Ovens may also be used in or in conjunction with a conveying system to heat one or more items conveyed on a conveyor, such as to bake, cook, or cure the items. The oven may include a heat delivery system capable of controlling the heat within the oven, such as to increase the heat to a level sufficient to bake, cook, or cure the conveyed items. The conveyor generally transports the item through the conveyor at a rate such that each item is suitably baked, cured, or cooked as the item is conveyed through the oven. The oven and the conveyor may run for a period of time such that a plurality of items may be conveyed through the oven and baked, cured, or cooked in the process.

The amount of time items are cooked or cured in the oven is generally proportional to the length of the one or more conveyors in the oven and the rate of the conveyor(s) in the oven. The conveying area within the oven is generally limited by the size of the oven and the size of the oven may be limited and/or reduced by a number of factors, such as due to costs associated with constructing and/or operating/heating the oven and space constraints within the building in which the oven is located. In some conveying systems, the speed of conveyors in the oven are reduced such that the items spend more time in the oven to cure or cook. However, reducing conveyor speeds may reduce throughput through the oven (e.g., items curing in oven prevent additional items from being added).

Additionally, the items to be baked, cooked, or cured in the oven may often be conveyed on conveying system via carriers, such as pallets, trays, or containers. The items may be placed on the carriers and the carriers may each be independently conveyed (e.g., not integral to) along the conveyors such that the carriers may be loaded onto and unloaded from the conveyors. However, many mechanisms and systems traditionally used in conveying systems to move carriers, such as between portions of the conveying system, do not function or operate correctly in the heat of the oven. For example, the inside of the oven may be in excess of about 500° Fahrenheit, such as in excess of about 600° Fahrenheit. Further, independent carriers may present additional alignment difficulties in conveying systems which control the throughput of objects, such as when transferring the carriers between conveyor portions or segments of the conveyor system.

Therefore, it would be desirable to provide a conveying system, such as for use within an oven, that operates in conjunction with a pallet that is independent from conveyor belts, may control the timing of objects conveyed through the system, and has a smaller footprint than conventional conveyors.

SUMMARY

The following is a brief summary of subject matter that is described in greater detail herein. This summary is not intended to be limiting as to the scope of the claims.

In one embodiment, a conveyor system for conveying a carrier is disclosed. The conveyor system includes a first vertical conveyor with a frame having a front, a rear, a first side, and a second side, a plurality of first carrier supports disposed on a first continuous belt extending along the first side, and a plurality of second carrier supports disposed on a second continuous belt extending along the second side. The conveyor system also includes a second vertical conveyor with a frame having a front, a rear, a first side, and a second side, a plurality of first carrier supports disposed on a first continuous belt extending along the first side, and a plurality of second carrier supports disposed on a second continuous belt extending along the second side. The conveyor system further includes a lateral conveyor disposed above the first and second vertical conveyors. The lateral conveyor includes a first side rail disposed near the first sides of the first and second vertical conveyors, a second side rail disposed near the second sides of the first and second vertical conveyors, a first lateral support slidably disposed on the first side rail, and a second lateral support slidably disposed on the second side rail. The carrier supports of the first vertical conveyor are configured to elevate the carrier to the lateral conveyor, the first and second lateral supports are configured to couple with the carrier elevated by the carrier supports of the first vertical conveyor and laterally convey the carrier to a position substantially above the second vertical conveyor, and the carrier supports of the second vertical conveyor are configured to receive the carrier from the lateral supports and lower the carrier through the second vertical conveyor.

In another embodiment, a conveyor system is disclosed. The conveyor system includes a first vertical conveyor, a second vertical conveyor adjacent to the first vertical conveyor, a lateral conveyor disposed above the first and second vertical conveyors, and processing circuitry. The first vertical conveyor includes first carrier supports affixed to a first continuous belt, second carrier supports affixed to a second continuous belt, and at least one first drive configured to drive the first and second continuous belts. The second vertical conveyor includes third carrier supports affixed to a third continuous belt, fourth carrier supports affixed to a fourth continuous belt, and at least one second drive configured to drive the third and fourth continuous belts. The lateral conveyor includes a first lateral support disposed on a first side rail and affixed to a fifth continuous belt, a second lateral support disposed on a second side rail and affixed to a sixth continuous belt, and a third drive configured to drive the fifth and sixth continuous belts. The processing circuitry is configured to perform the acts of generating an output command to cause the first drives to elevate the first and second carrier supports to elevate a carrier from a first height to a second height near a top of the first vertical conveyor, generating an output command to cause the third drive to laterally move the first and second lateral supports to couple with the carrier at the second height, generating an output command to cause the first drives to lower the first and second carrier supports from the second height to a third height to disengage from the carrier, generating an output command to cause the third drive to laterally move the first and second lateral supports to a position above the third and fourth carrier supports, generating an output command to cause the second drives to elevate the third and fourth carrier supports to lift the carrier and decouple the carrier from the first and second lateral supports, generating an output command to cause the third drive to laterally move the first and second lateral supports away from the carrier, and generating an output command to cause the second drives to lower the third and fourth carrier supports in the second vertical conveyor.

In another embodiment, a method for conveying a carrier through a conveyor system is disclosed. The method includes receiving the carrier at a first height in a first vertical conveyor comprising at least two carrier supports, elevating the carrier from the first height to a second height via the carrier supports of the first vertical conveyor, laterally moving lateral supports of a lateral conveyor from a first horizontal position spaced apart from the carrier supports of the first vertical conveyor to a second horizontal such that the lateral supports couple with the carrier, and lowering the carrier supports of the first vertical conveyor to a third height below the carrier. The method also includes laterally moving the lateral supports from the second horizontal to a third horizontal position substantially above two or more carrier supports of a second vertical conveyor, elevating the carrier supports of the second vertical conveyor to decouple the carrier from the lateral supports, and laterally moving the lateral supports to a fourth horizontal position to decouple the lateral supports from the carrier. The method further includes lowering the carrier supports of the second vertical conveyor and conveying the carrier out of the second vertical conveyor.

The above summary presents a simplified summary to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later. A further understanding of the nature and advantages of the present disclosure are set forth in the following description and claims, particularly when considered in conjunction with the accompanying drawings in which like parts bear like reference numerals.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which:

FIG. 19C is a front view of the carrier of FIG. 19A;

FIG. 19D is a side view of the carrier of FIG. 19A;

Figure 15:
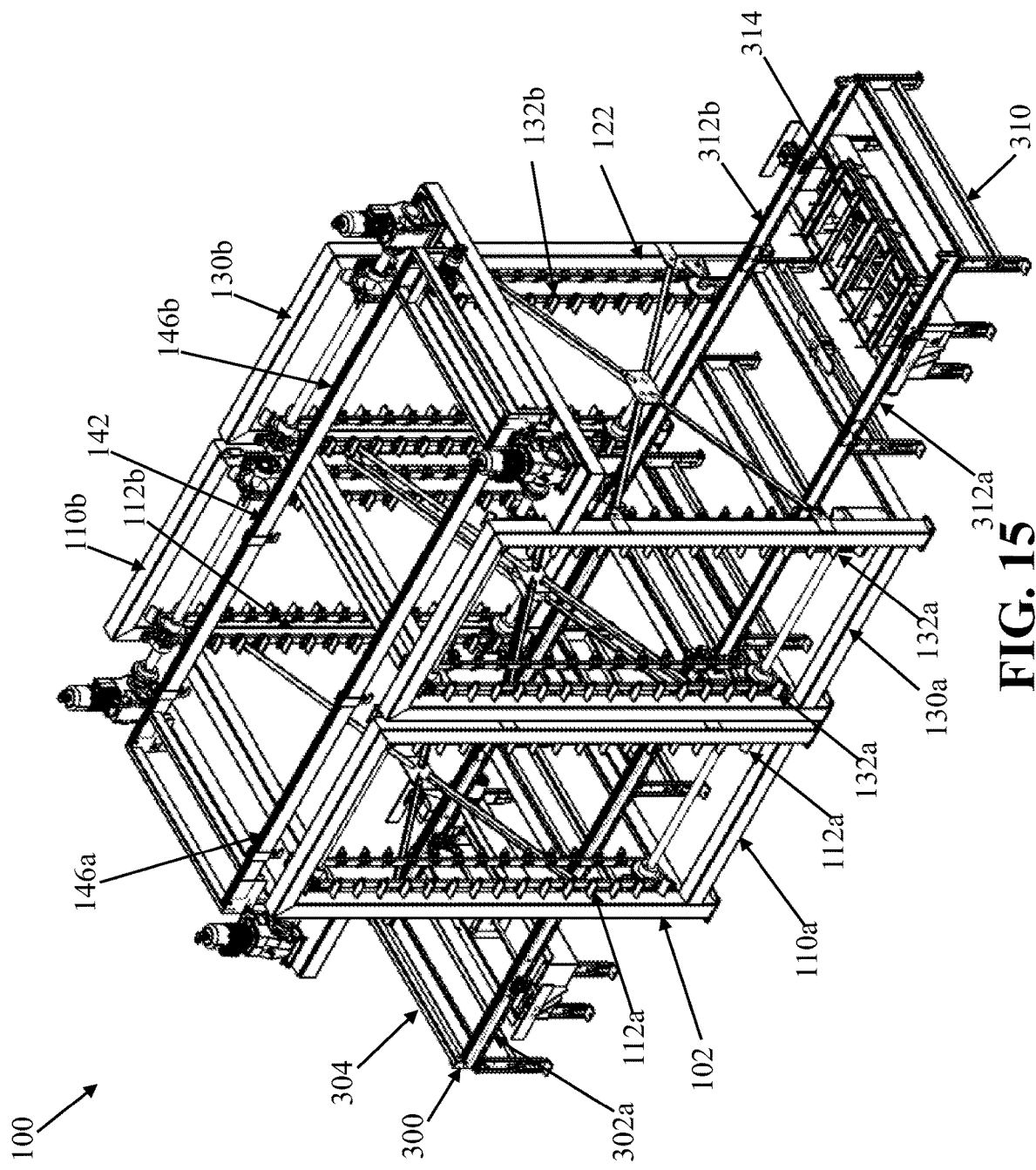
FIG. 15 is a top perspective view of the conveyor system of FIG. 2 with an input conveyor and an output conveyor.
Figure 16:
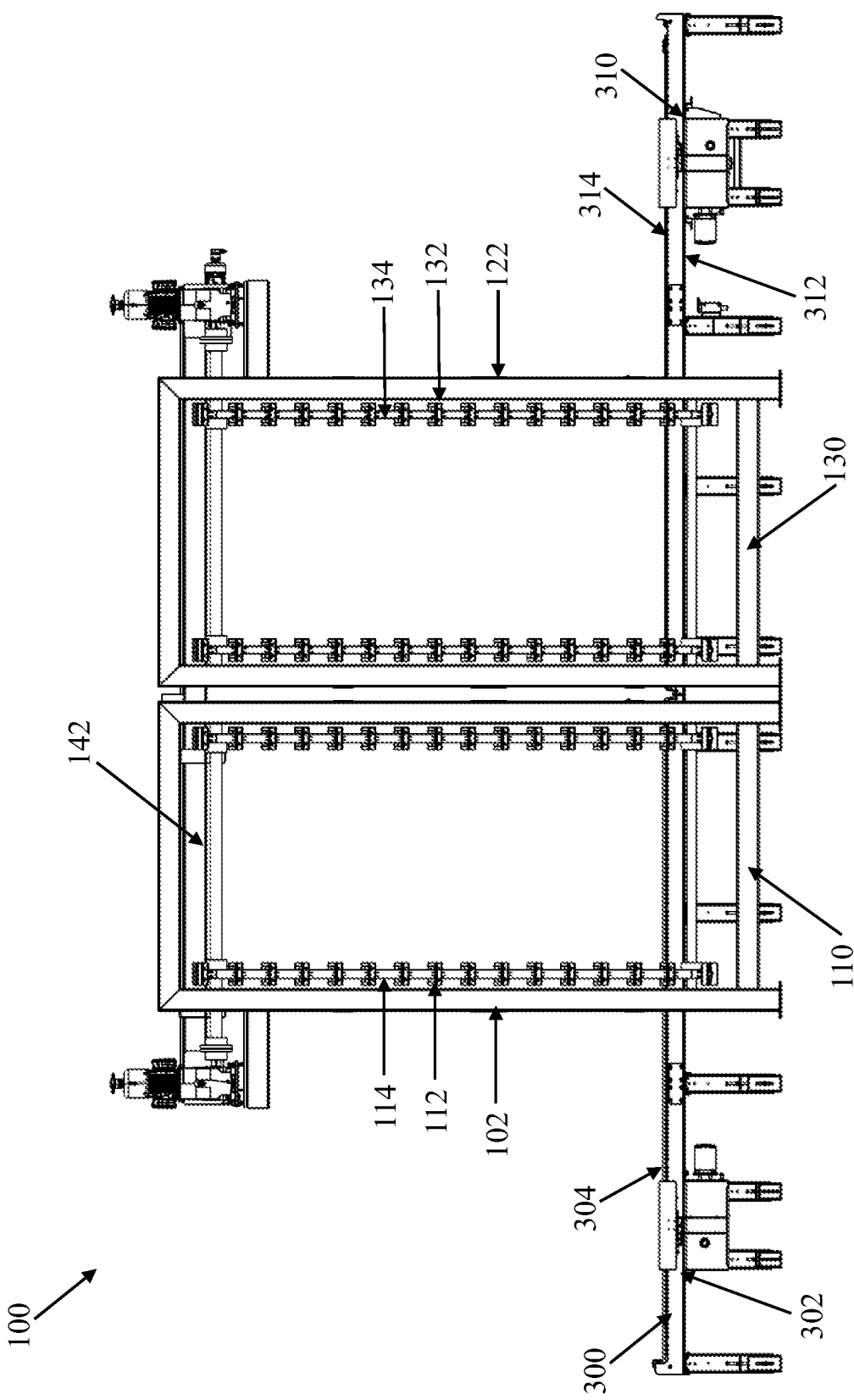
FIG. 16 is a side view of the conveyor system of FIG. 15.
Figure 17:
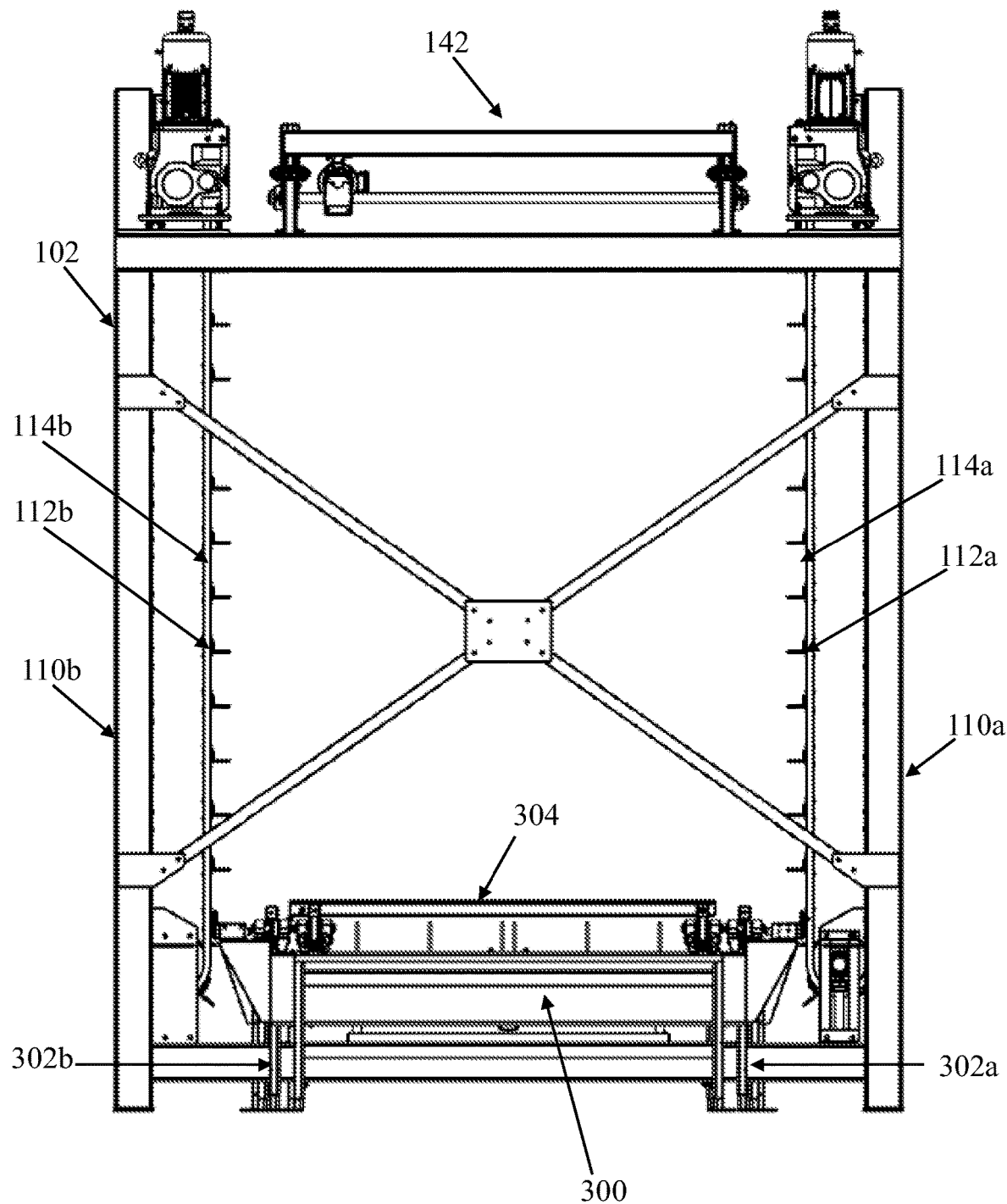
FIG. 17 is a front view of the conveyor system of FIG. 15.
Figure 18:
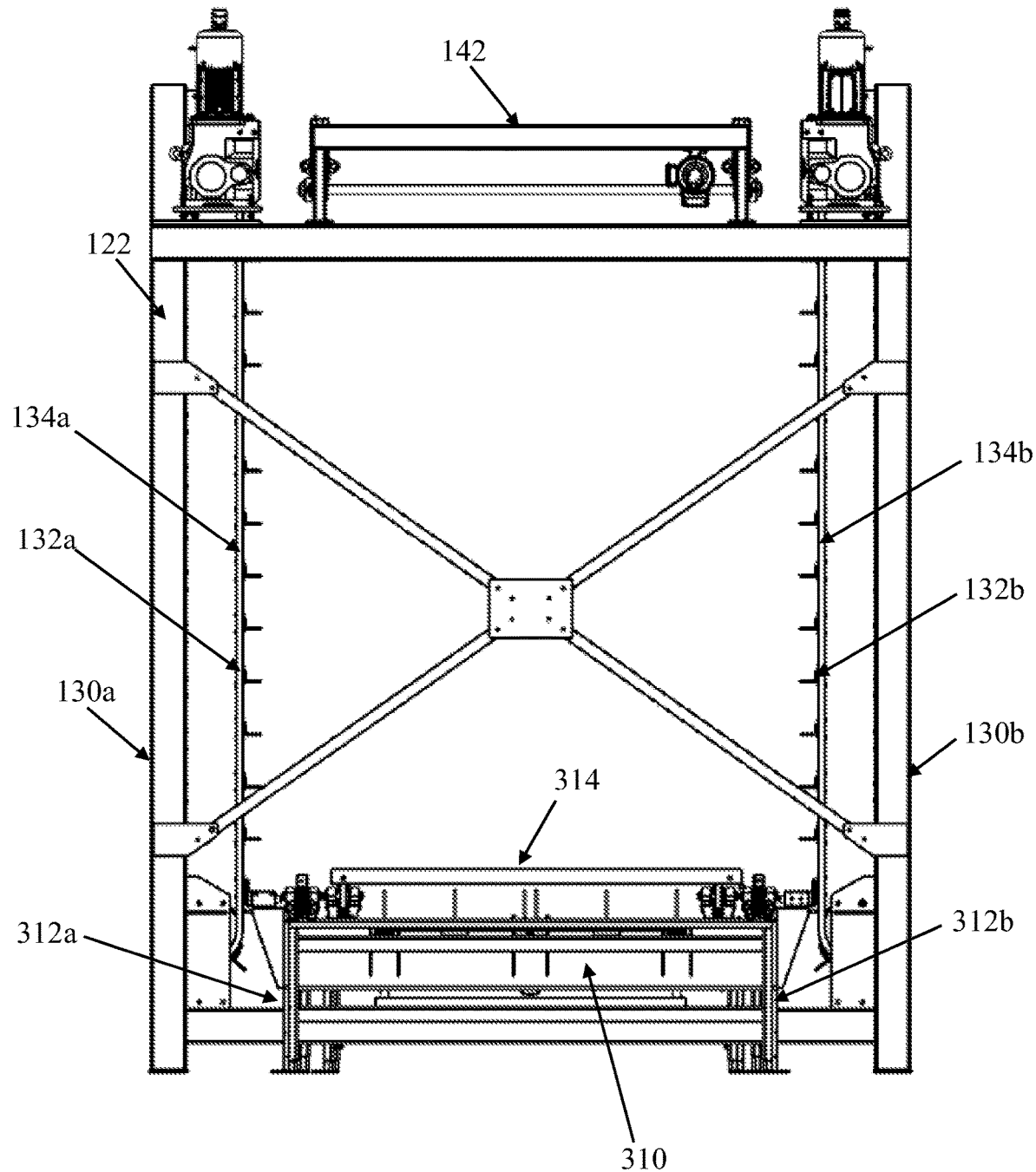
FIG. 18 is a rear view of the conveyor system of FIG. 15.
Figure 19A:
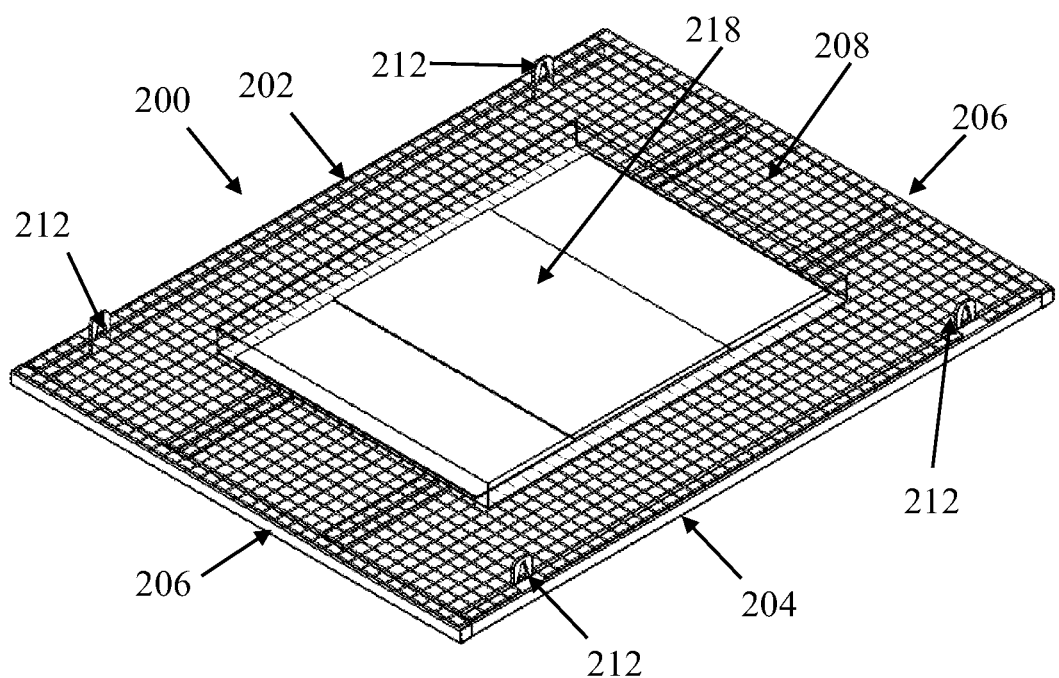
FIG. 19A is a top perspective view of a carrier for use with the conveyor systems of FIG. 2 or 15.
Figure 19B:
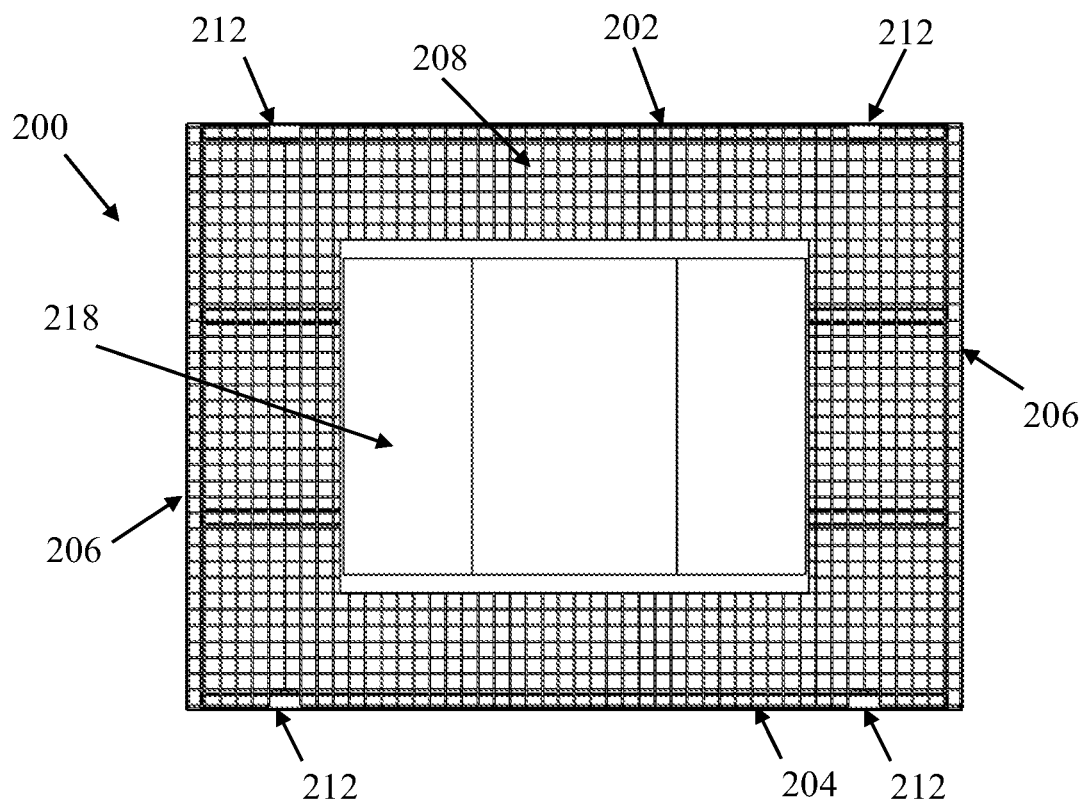
FIG. 19B is a to view of the carrier of FIG. 19A.
Figure 21A:
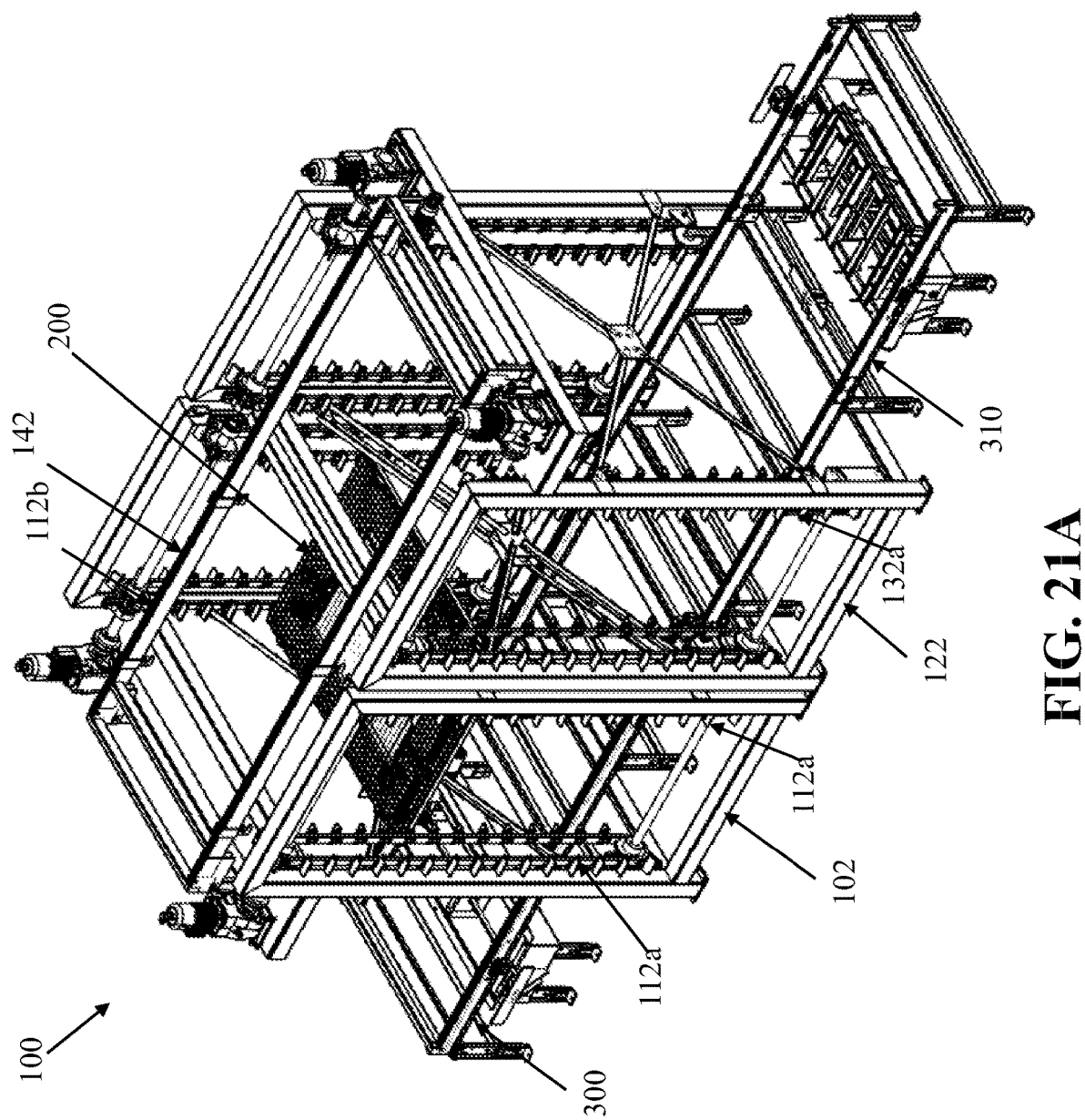
FIG. 21A is a perspective view of a carrier being lifted in the first vertical conveyor of the conveyor system FIG. 15.
Figure 21B:
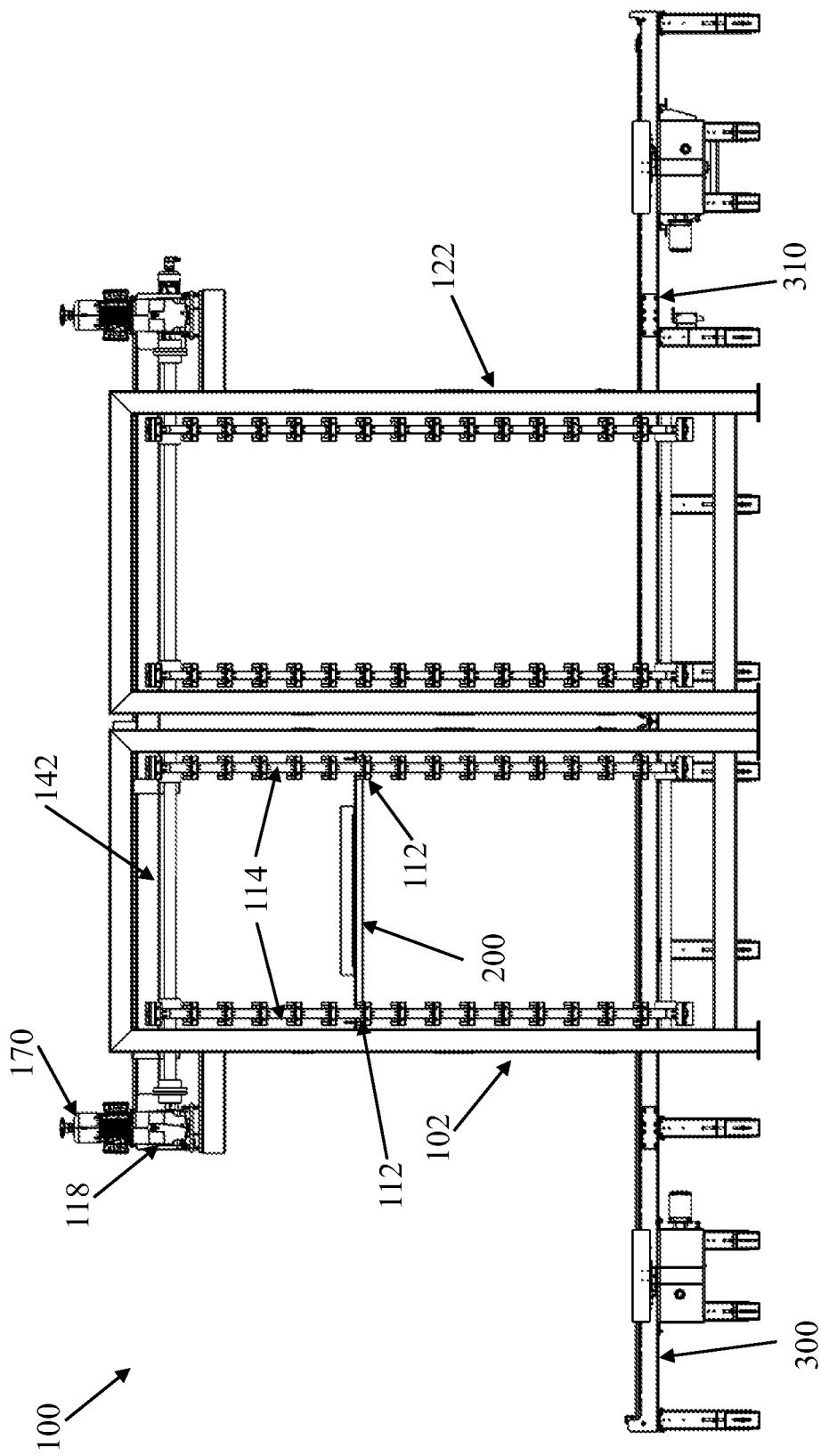
FIG. 21B is a side view of the conveyor system of FIG. 21A.
Figure 21C:
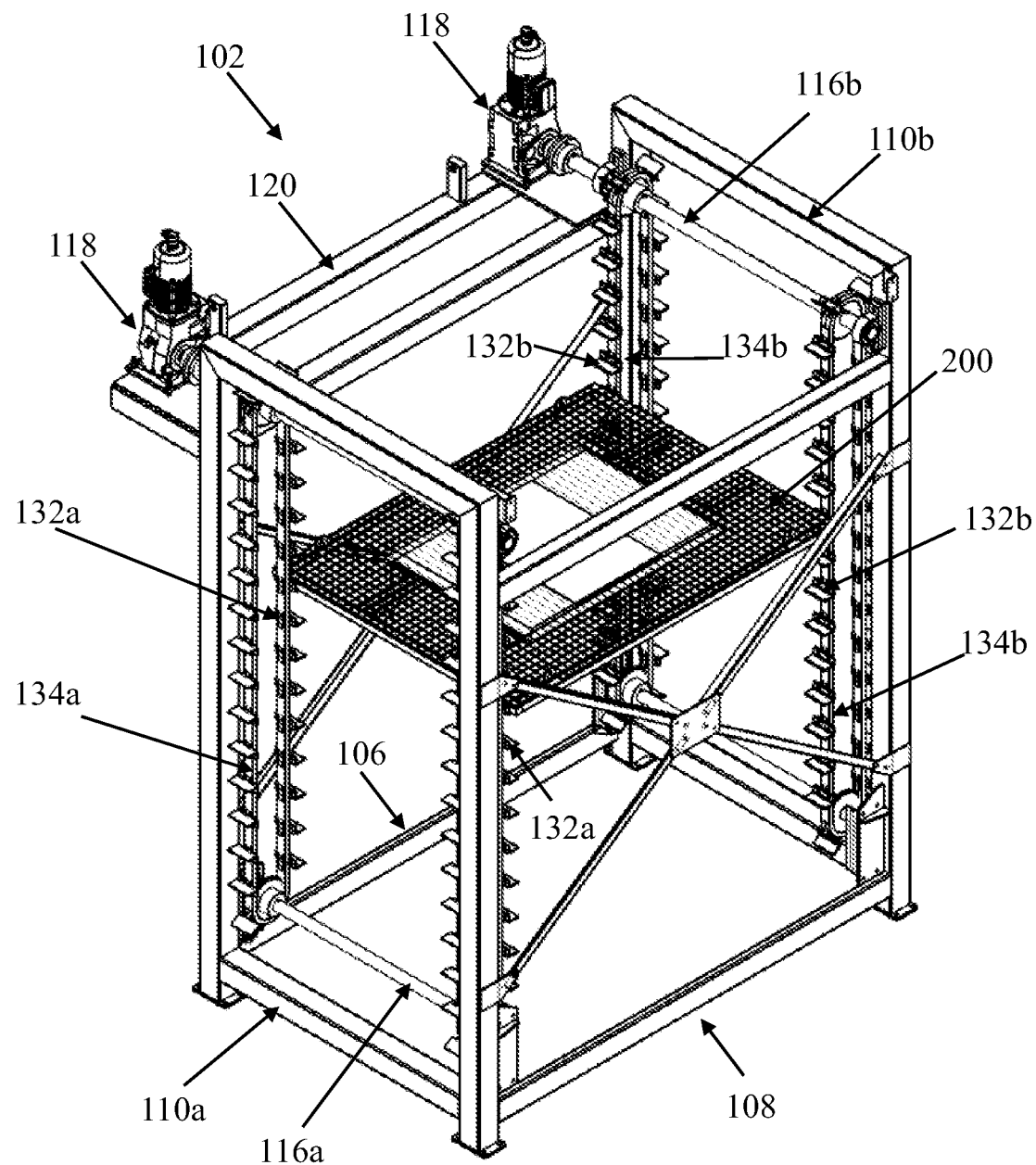
Figure 21D:
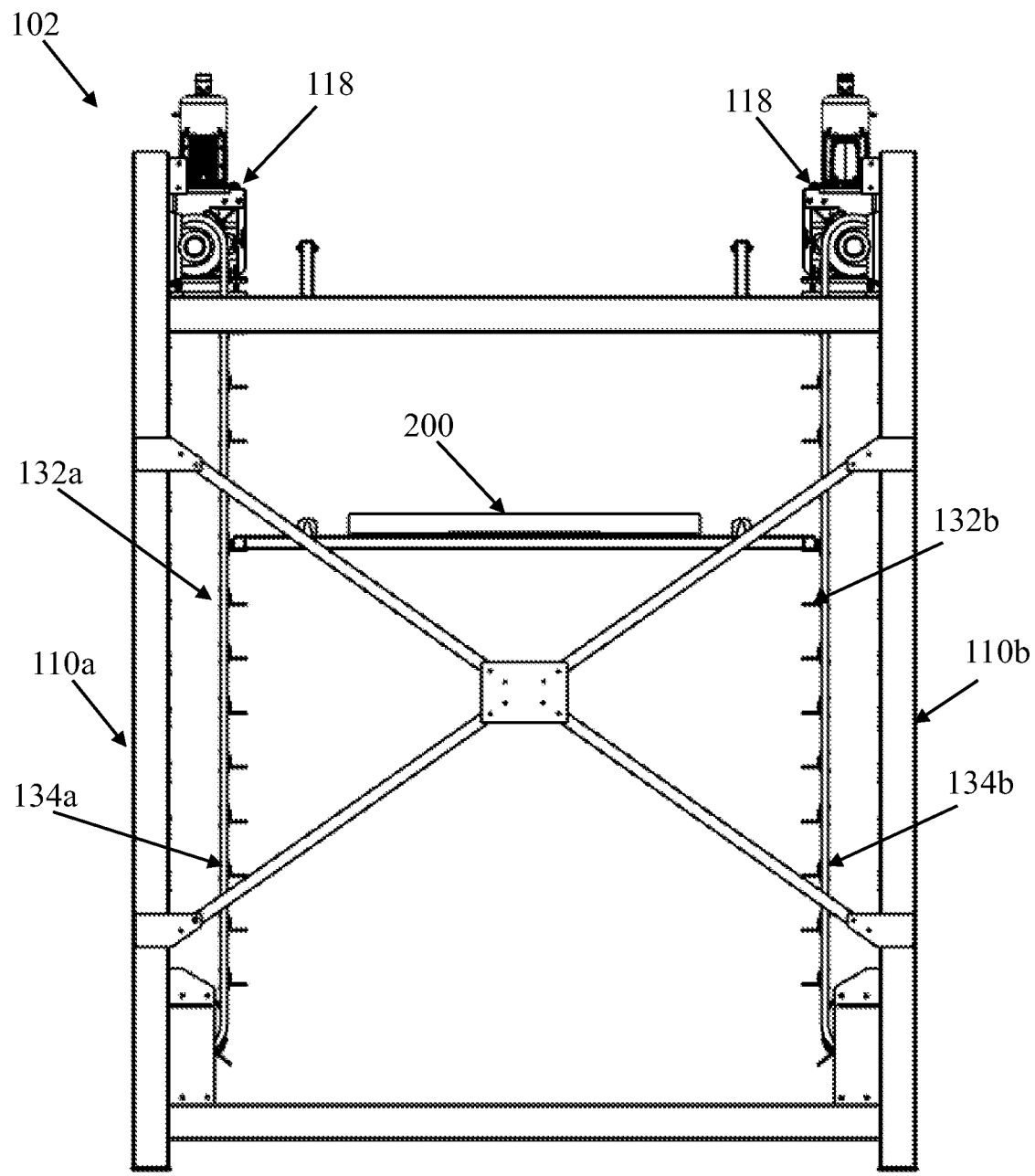
Figure 22A:
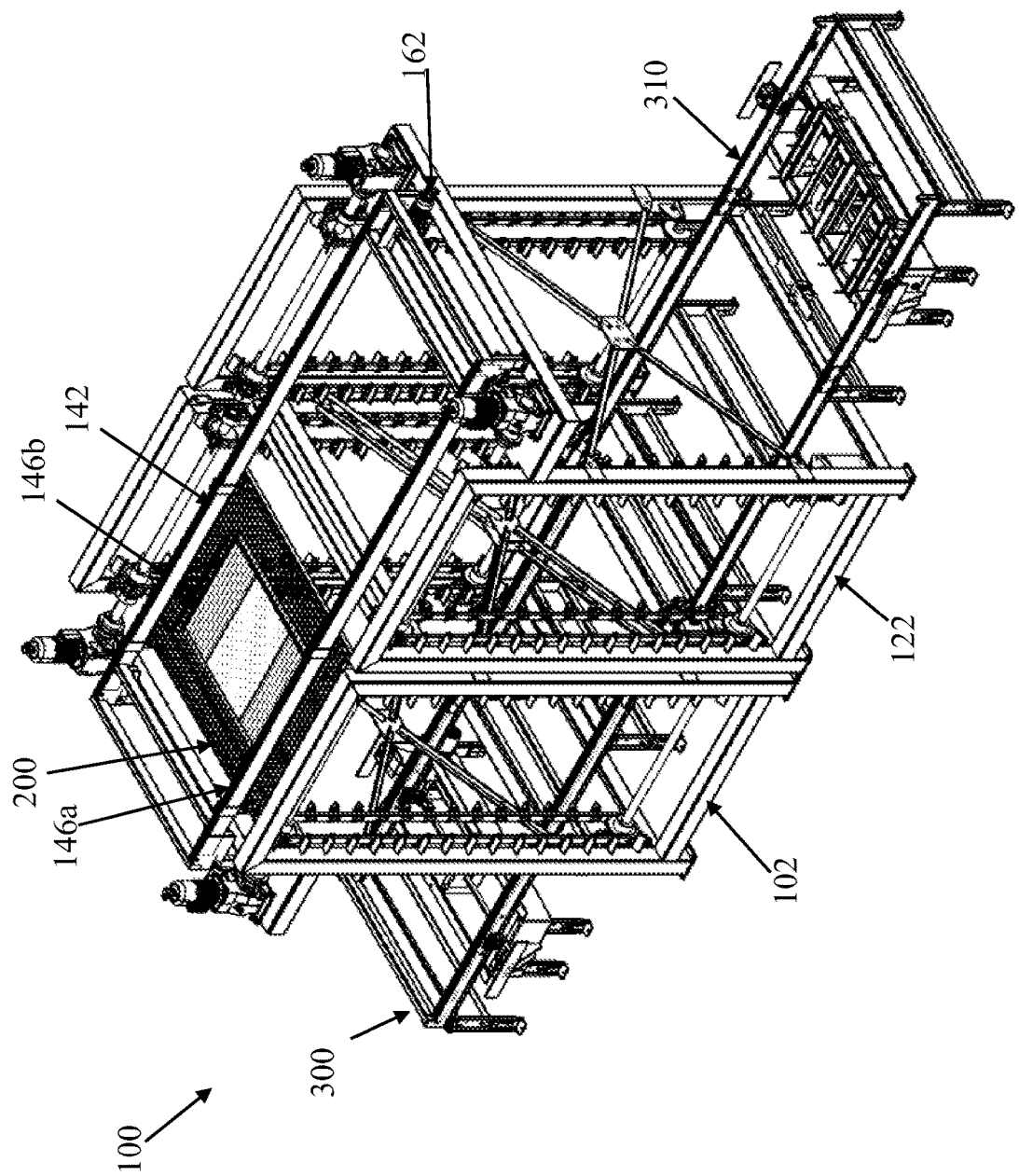
Figure 22B:
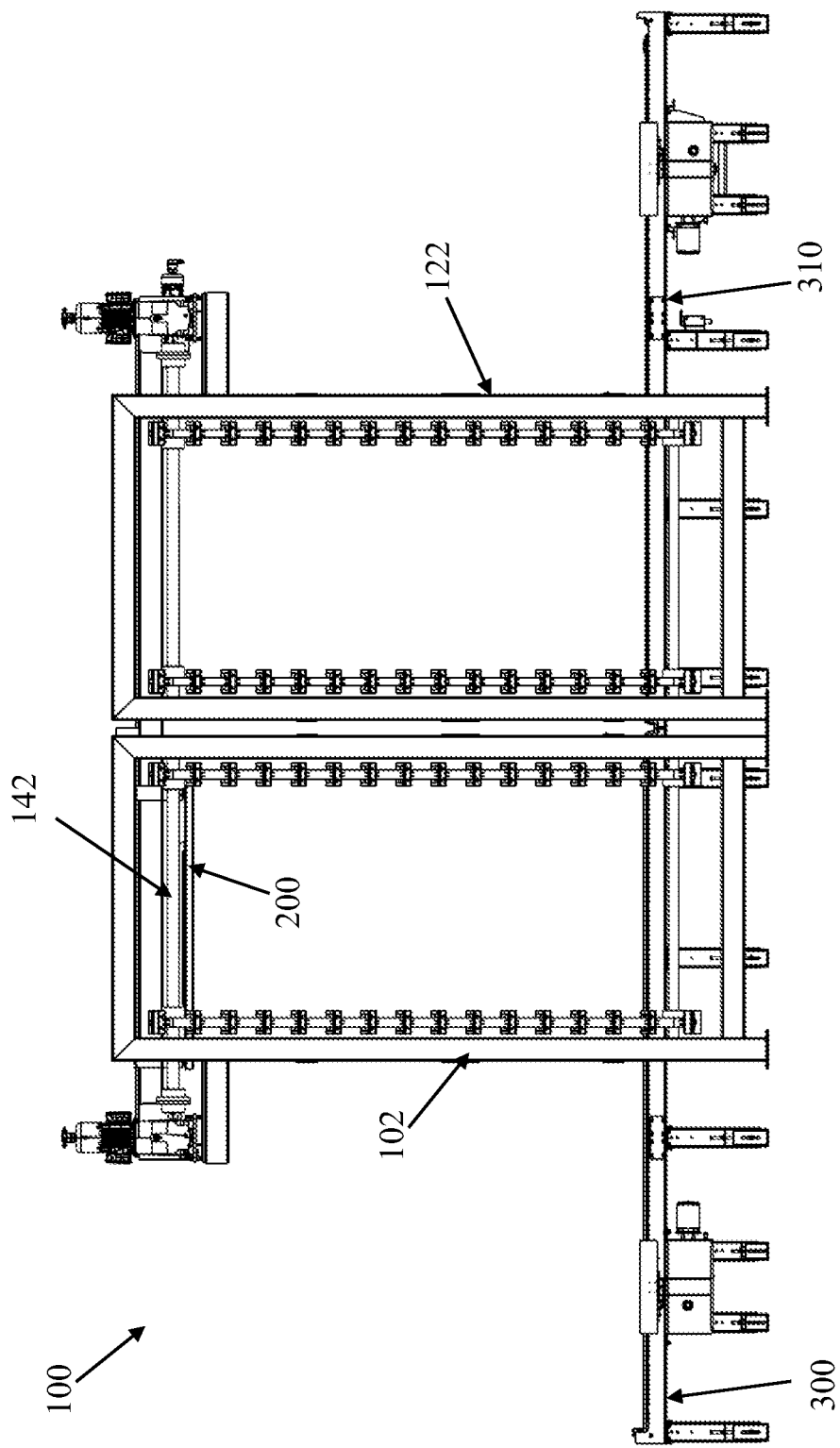
Figure 22C:
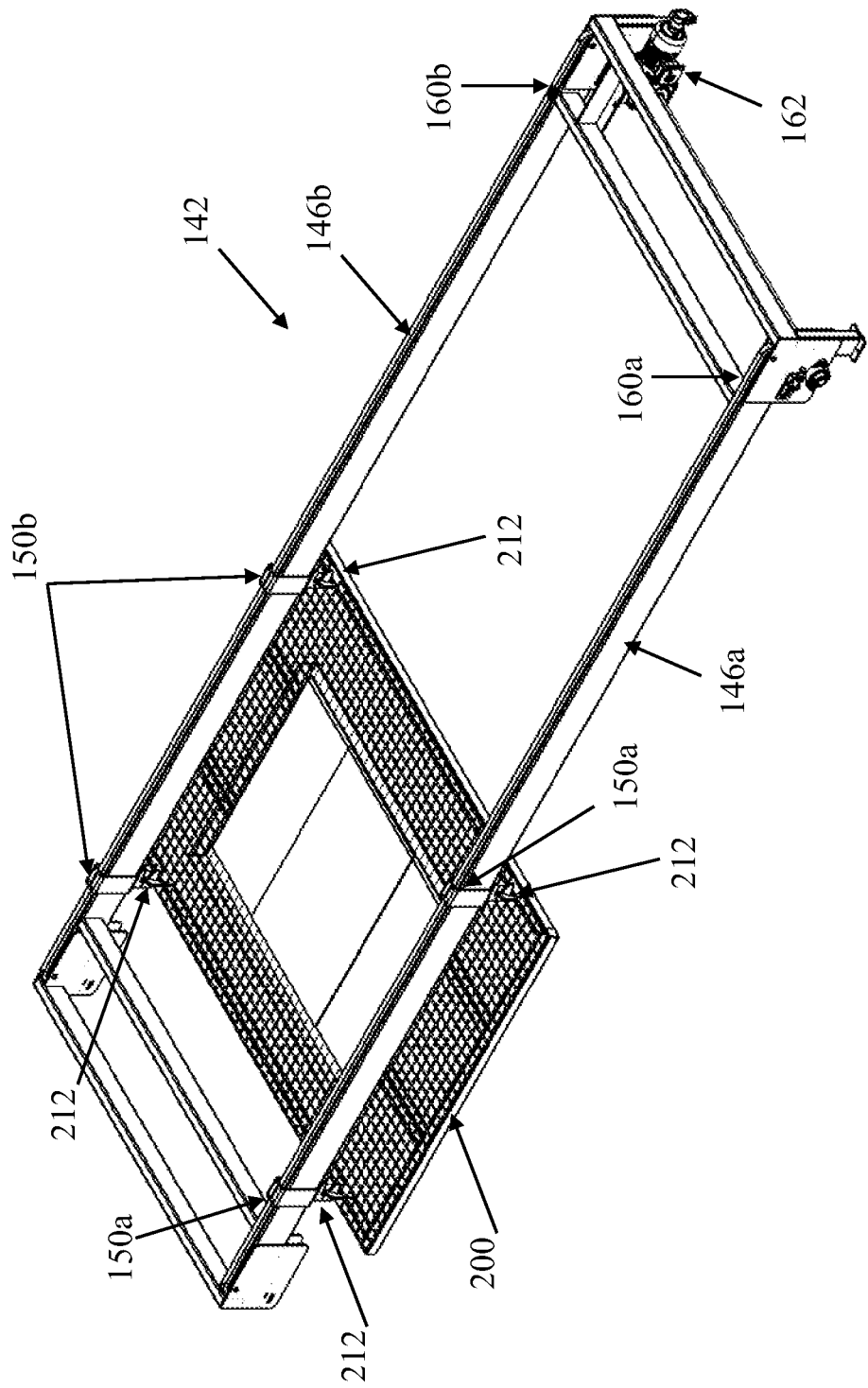
Figure 22F:
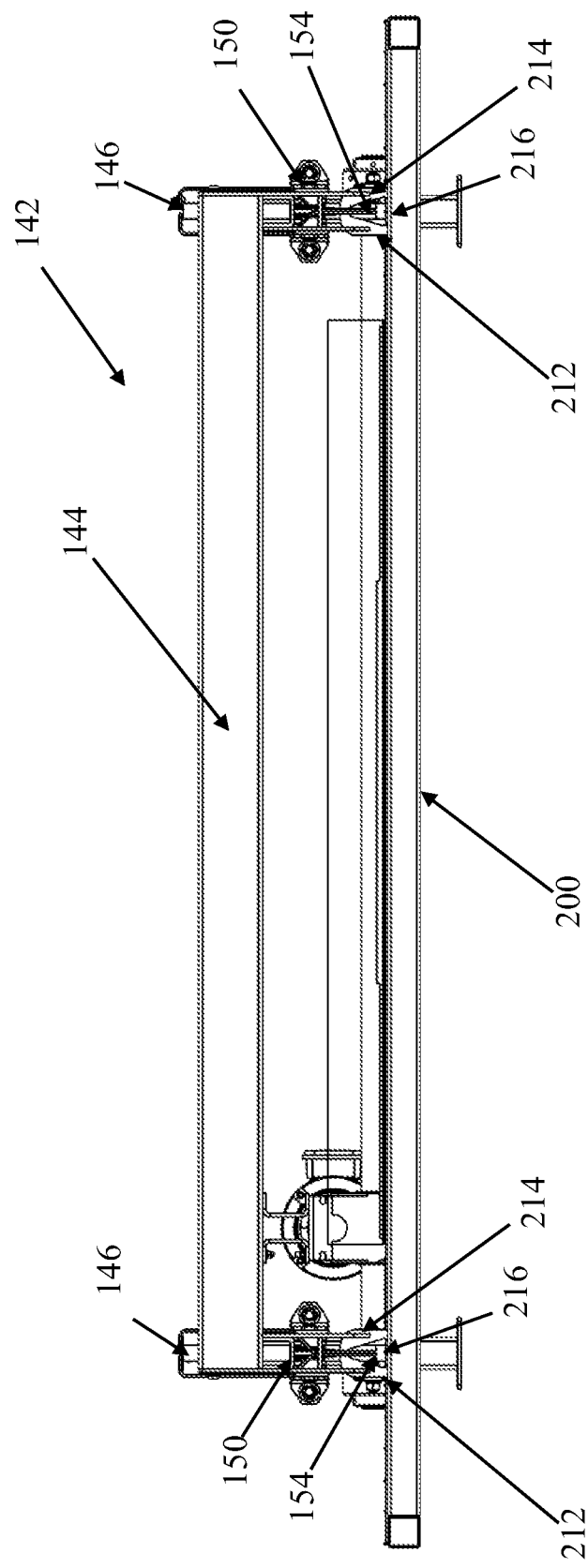
Figure 23A:
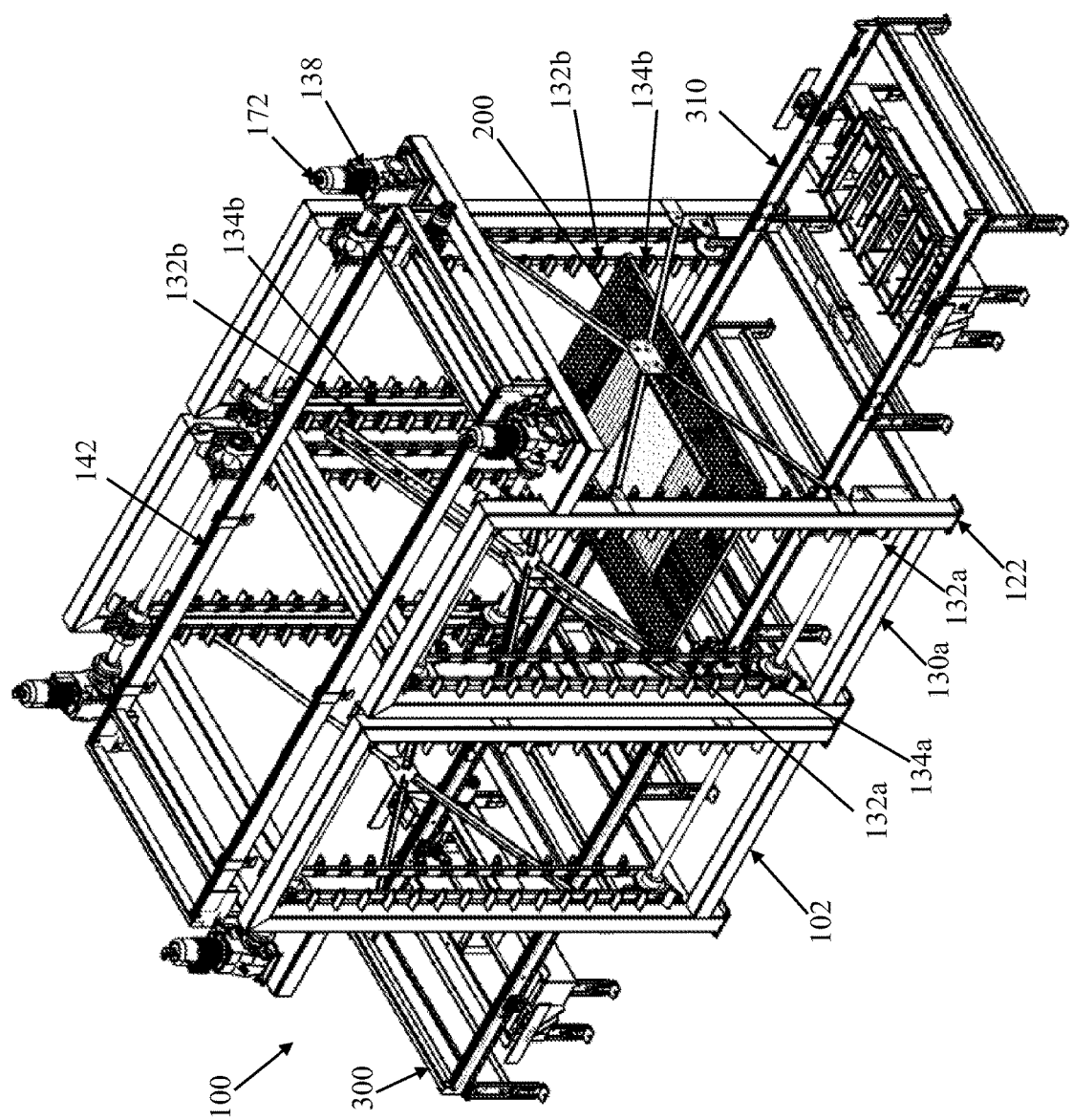
Figure 23B:
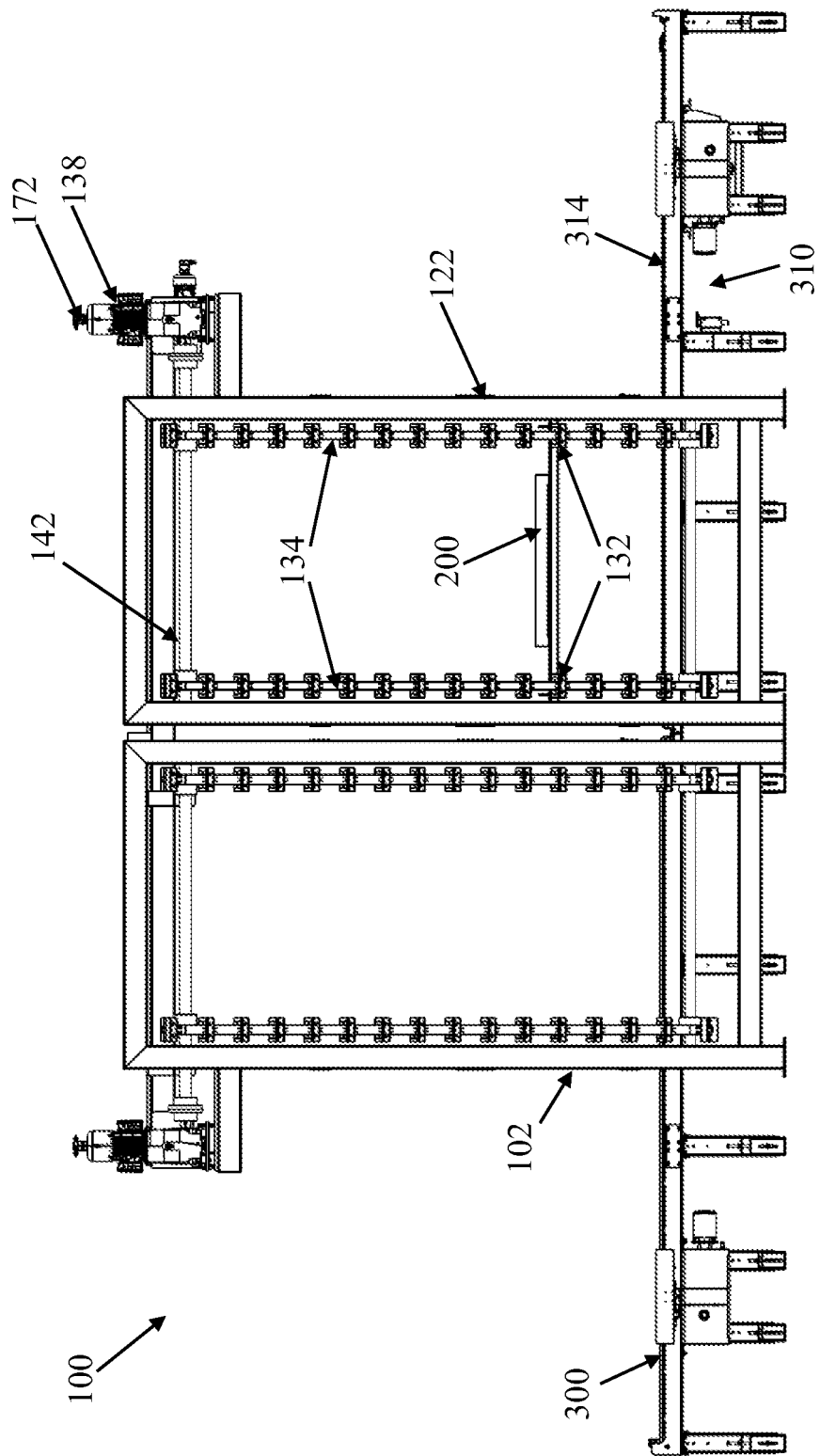
Figure 23C:
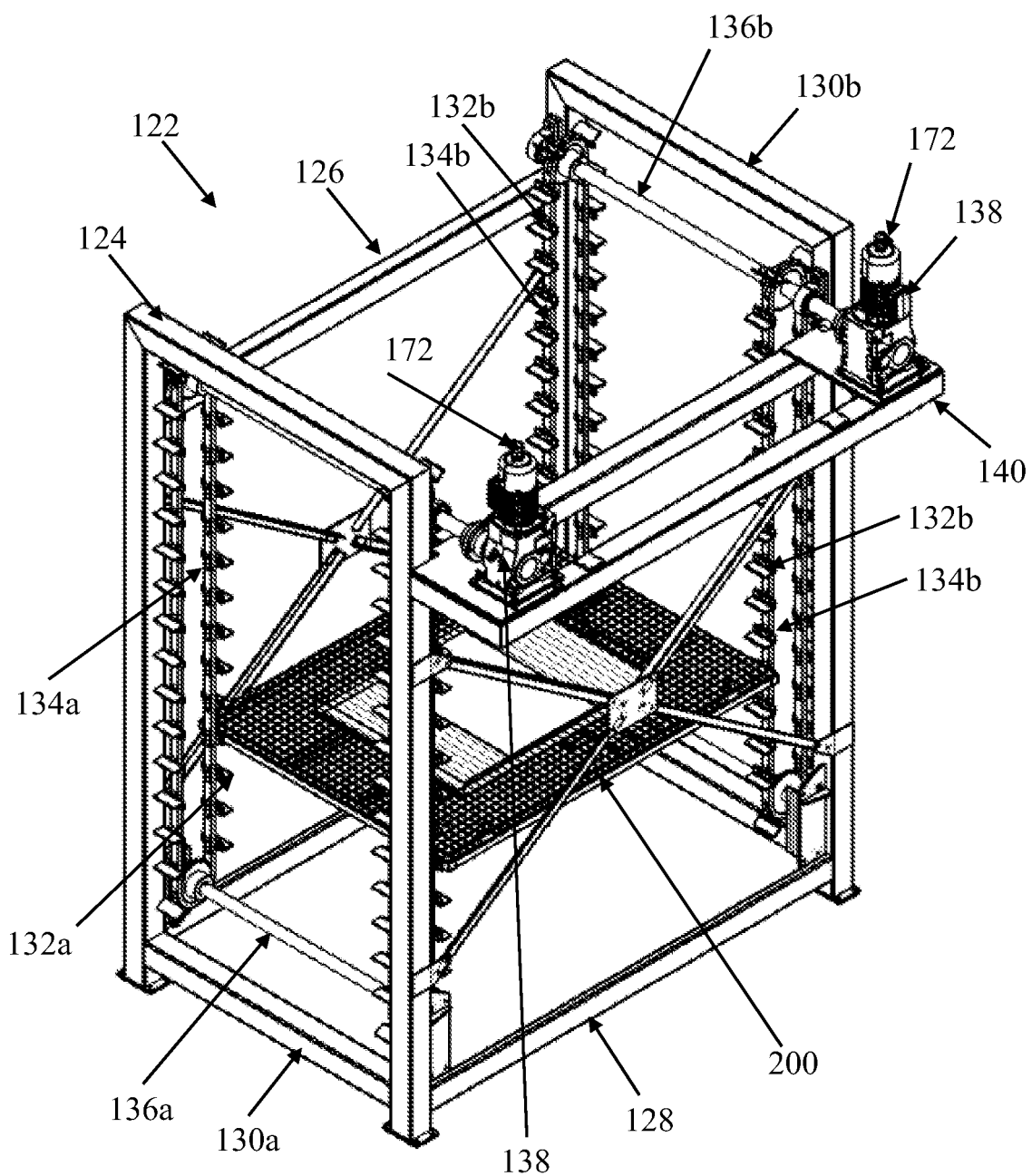
Figure 24:
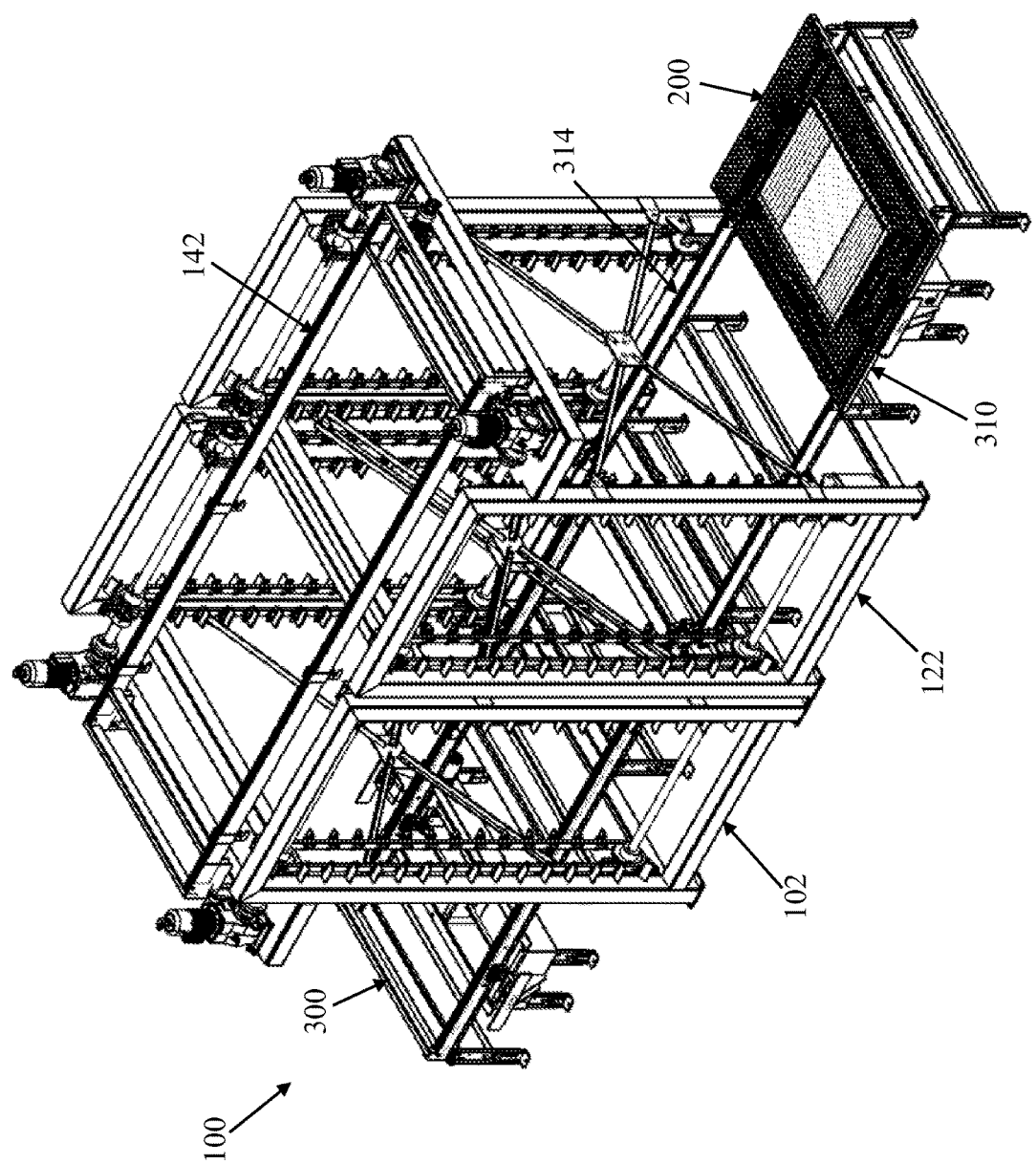
Figure 25:
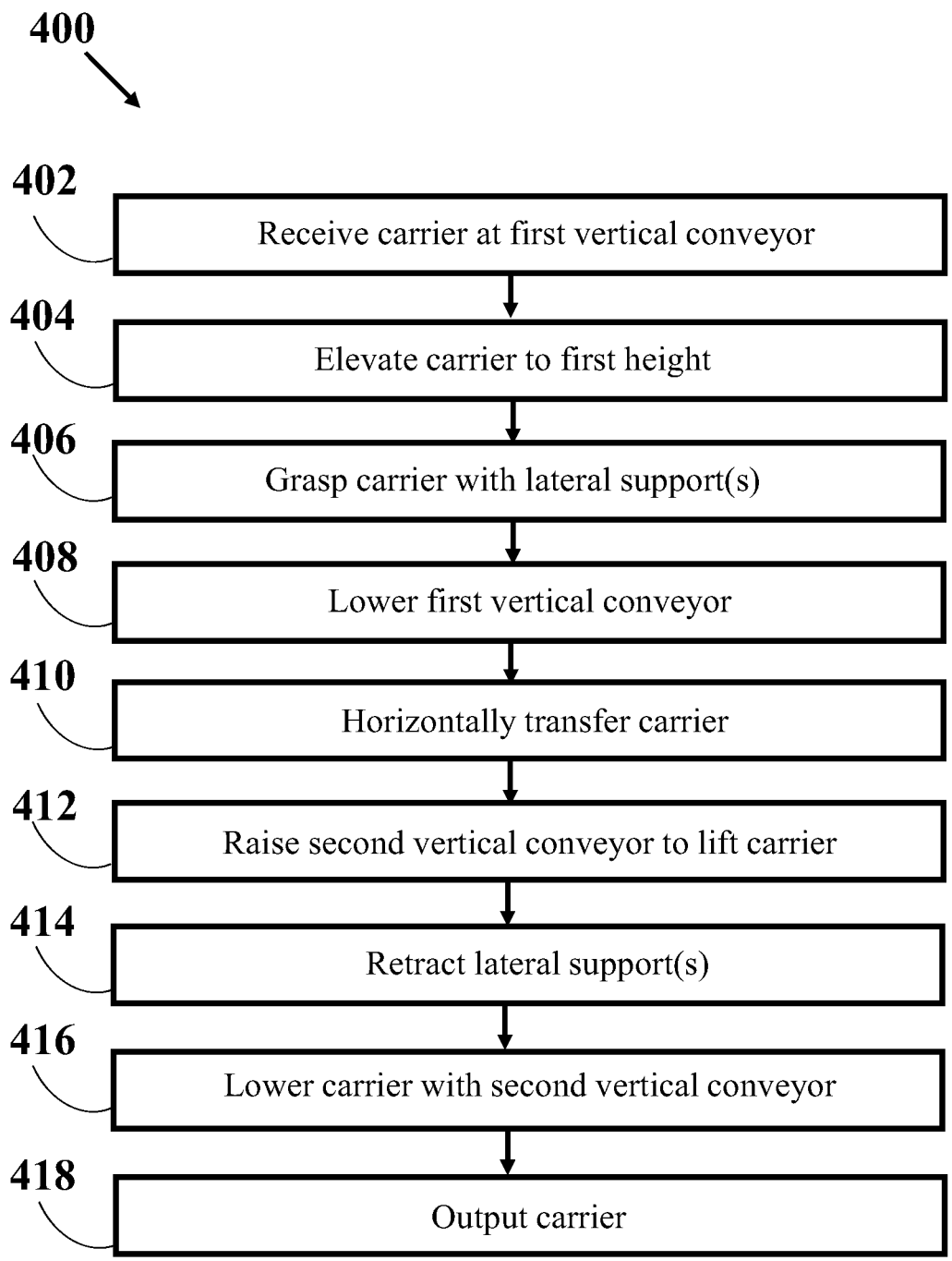

FIC. 21C is a top perspective view of the carrier being lifted by the first vertical conveyor of FIG. 21A;

FIG. 21D is a rear view of the first vertical conveyor of FIG. 21C;

FIG. 22A is a perspective view of a carrier being supported by the lateral conveyor of the conveyor system of FIG. 15;

FIG. 22B is a side view of the conveyor system of FIG. 22A;

FIG. 22C is a top perspective view of a carrier supported by the lateral conveyor of FIG. 15;

FIGS. 22D-E are side views of the carrier supported by the lateral conveyor of FIG. 22C;

FIG. 22F is a front view of the carrier supported by the lateral conveyor of FIG. 22C;

FIG. 23A is a top perspective view of a carrier being lowered by the second vertical conveyor of the conveyor system of FIG. 15;

FIG. 23B is a side view of the conveyor system of FIG. 23A;

FIG. 23C is a top perspective view of the carrier being lowered by the second vertical conveyor of FIG. 23A;

FIG. 24 is a top perspective view of a carrier being output from the conveyor system of FIG. 15;

FIG. 25 is a schematic illustration depicting a methodology performed by a conveyor system.

DETAILED DESCRIPTION

The following description refers to the accompanying drawings, which illustrate specific embodiments of the present disclosure. Other embodiments having different structures and operation do not depart from the scope of the present disclosure. The description and drawings are not intended to limit the scope of the invention in any manner.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," "up," "down," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Described herein are various technologies pertaining to a buffer conveying system for conveying one or more articles in a manner to temporarily store conveyed articles. The conveying system includes a first vertical conveyor for vertically raising the articles and a second vertical conveyor for vertically lowering the articles. The conveying system also includes a lateral conveyor configured to horizontally transfer the articles between the first vertical conveyor and the second vertical conveyor. The conveying system also includes a controller that is in communication with the first vertical conveyor, the second vertical conveyor, and the lateral conveyor to control the conveyance of the articles through the conveyor system. The controller is configured to control the conveyance of articles from the first vertical conveyor to the lateral conveyor and from the lateral conveyor to the second vertical conveyor. The conveyor system is configured to receive an independently conveyed carrier, such as from an input conveyor, and convey the carrier through the conveyor system, such as to an output conveyor. The conveyor system is also configured to align the independently conveyed carrier as it conveyed through the conveyor system between the conveyors. The conveyor system may be configured to increase the number of workpieces which may be baked in an oven, such as by increasing the number of workpieces which may be exposed to a predetermined heat for a predetermined period of time (e.g., time at a temperature sufficient to bake the workpiece) as the workpieces are conveyed through the oven. In will be understood that the term "bake" or "baked" encompasses curing, cooking, heat-treating, and otherwise treating an item with heat for a period of time.

Referring to FIGS. 1-5, a conveyor system 100 is depicted according to one embodiment. The conveyor system 100 is configured to move a carrier in a non-linear path, such as to increase the time the carrier spends in a particular location or environment, such as for temporary or buffer storage. It will be understood that the term "carrier" encompasses any container, bucket, tray, basket, or carrier operable to carry one or more articles or items as well as any item or article which may be conveyed by the system 100. The conveyor system 100 may be utilized in an overall conveyor system with limited floor space availability, such as part of a manufacturing operation. In some embodiments, the conveyor system 100 is configured to operate in temperatures in excess of about 500° Fahrenheit, such as in excess of about 600° Fahrenheit, such as in an industrial oven. For example, the conveyor system 100 may be utilized within an oven to convey one or more items such that the one or more items bake while being conveyed through the oven.

The conveyor system 100 includes a first vertical conveyor 102, a lateral conveyor 142 disposed at least partially above the first vertical conveyor 102, and a second vertical conveyor 122 disposed at least partially below another portion (e.g., a downstream portion) of the lateral conveyor 142. The first vertical conveyor 102 is configured to elevate one or more carriers. The first vertical conveyor 102 may be configured to receive the carriers at a first height, such as a height of an input conveyor, and elevate the carriers toward the lateral conveyor 142. The first vertical conveyor 102 is configured to elevate each carrier to a second height such that the carrier may be transferred to the lateral conveyor 142. The lateral conveyor 142 receives each carrier from the first vertical conveyor 102 at a first horizontal position and laterally conveys the carriers to a second horizontal position substantially aligned with the second vertical conveyor 122. In some embodiments, the lateral conveyor 142 is configured to laterally (e.g., horizontally) convey carriers at substantially the second height from the first horizontal position to the second horizontal position. The second vertical conveyor 122 is configured to receive each carrier from the lateral conveyor 142 at the second horizontal position and subsequently lower the carrier. The second vertical conveyor 122 may lower each carrier such that the carrier may be conveyed out of the conveyor system 100, such as onto an output conveyor disposed at the first height.

The conveyor system 100 may include or be used in conjunction with carriers which may be independently conveyed into, through, and out of the conveyor system 100. It will be understood that the term "independently conveyed" encompasses the conveyance of carriers into, through, and out of the conveyor system 100 separately from the conveyor system 100 such that the carriers may be inserted into and/or removed from the conveyor system 100. For example, the carriers may be placed onto an input conveyor to be conveyed into the conveyor system 100, be grasped or otherwise transported through the conveyor system 100, and placed onto an output conveyor to be conveyed out of the conveyor system 100. The carriers may be independent from and not fixed to the components of conveyor system 100. Further, articles or items to be conveyed may be independently disposed on and/or in the carriers such that articles or items may be placed onto or removed from each carrier during conveyance.

The conveyor system 100 is configured to extend the time the article or carrier spends in a given location or environment, such as within an oven. For example, the conveyor system 100 may convey one or more carriers via the first vertical conveyor 102, the lateral conveyor 142, and the second vertical conveyor 122 to increase the travel time and distance of the carrier compared to a conventional lateral conveyor. The conveyor system 100 may also be configured to operate substantially continuously and to receive a plurality of carriers such that the conveyor system 100 may continuously convey carriers through the conveyor system 100 in continuous succession (e.g., in an order in which the carriers are received). In some embodiments, the conveyor system 100 is configured to simultaneously convey two or more carriers through conveyor system 100. For example, the conveyor system 100 may be configured to receive a stream of carriers from an input conveyor, independently convey each carrier via the first vertical conveyor 102, the lateral conveyor 142, and the second vertical conveyor 122, and output each article or carrier to an output conveyor. One or more items or articles may be disposed on each carrier as the carrier is conveyed into, through, and out of the conveyor system 100.

Figure 1:
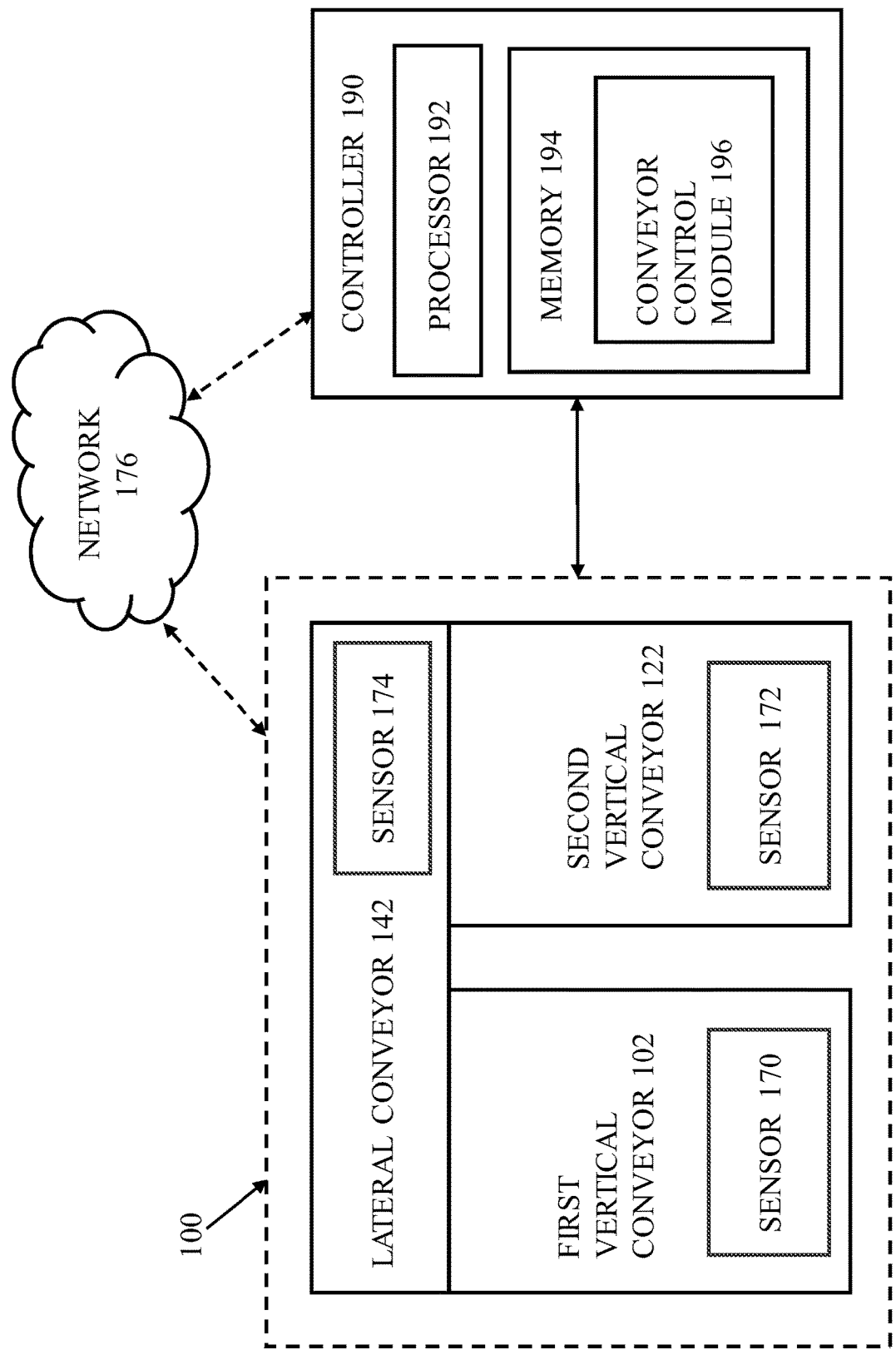
FIG. 1 illustrates block schematic illustration of a conveyor system.
Figure 2:
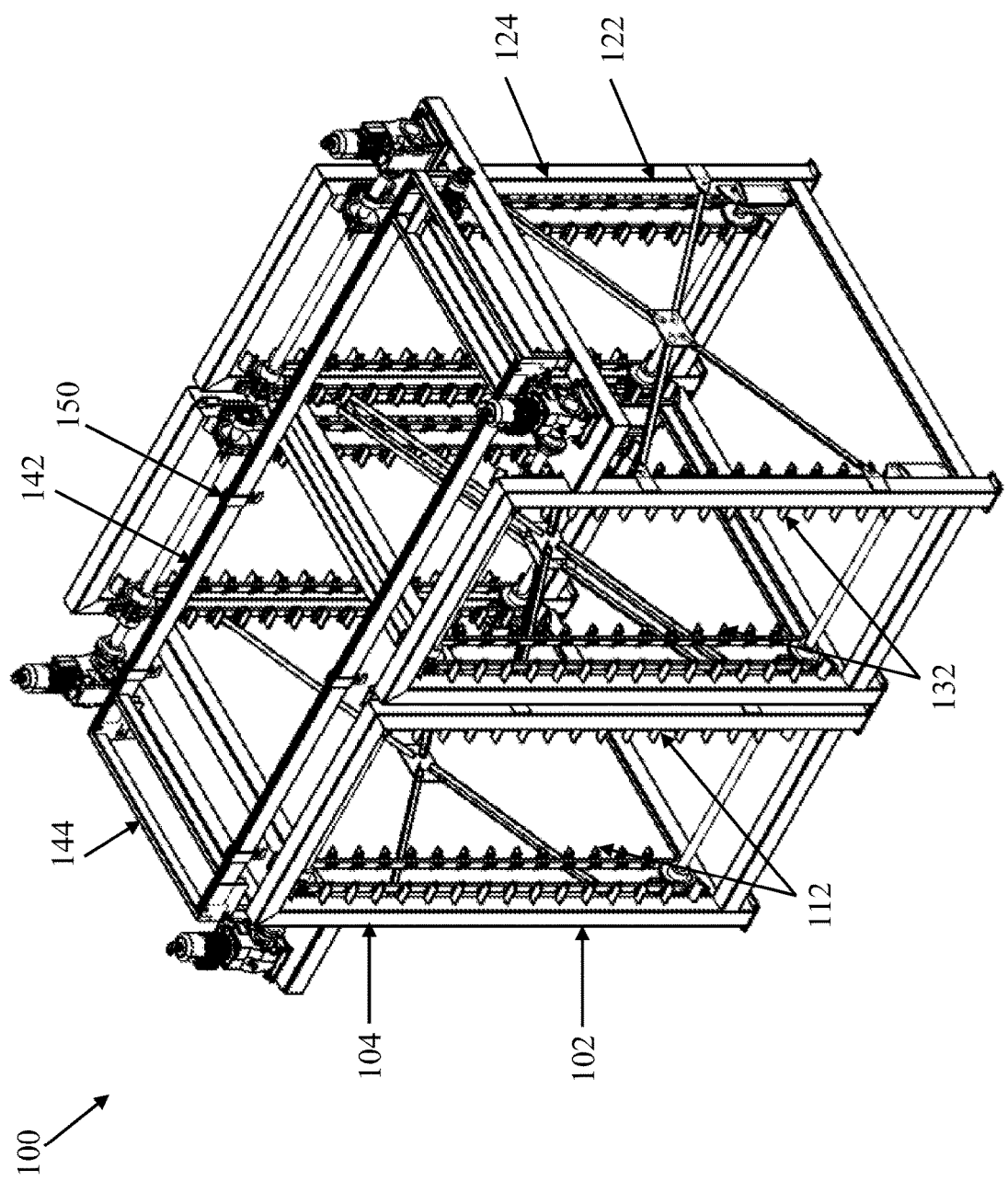
FIG. 2 is a top perspective view of a conveyor system according to one embodiment.
Figure 3:
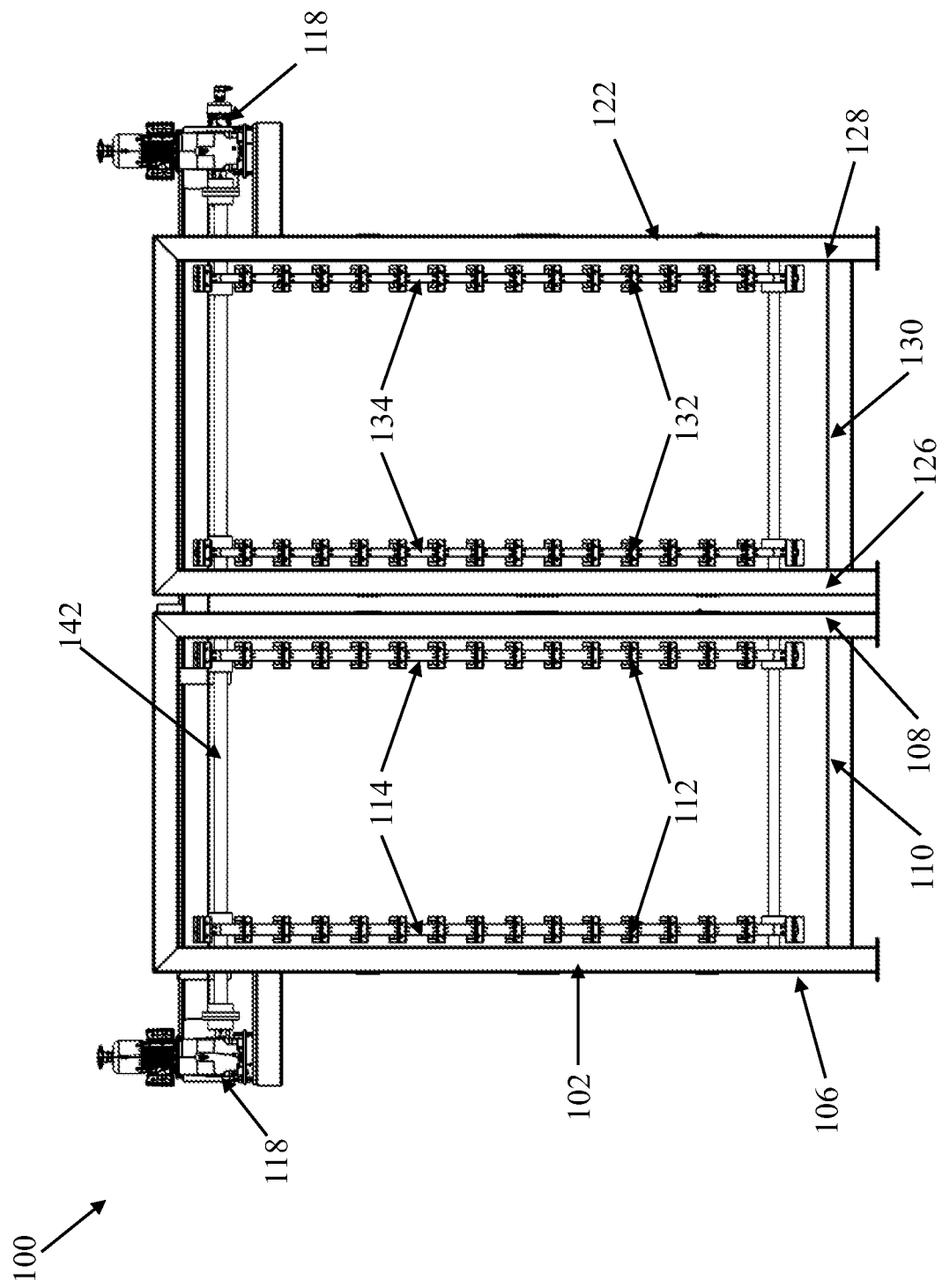
FIG. 3 is a side view of the conveyor system of FIG. 2.
Figure 4:
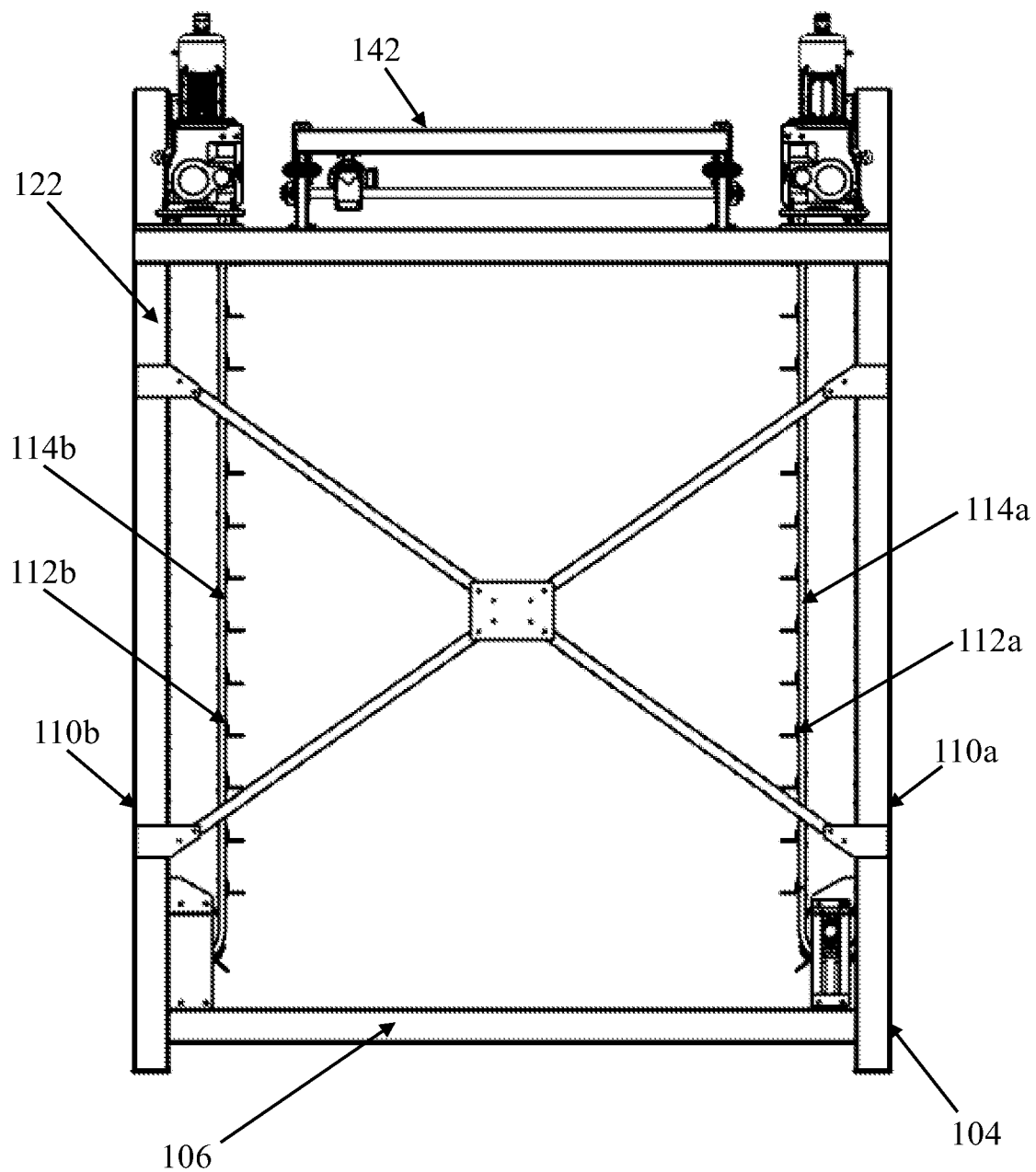
FIG. 4 is a front view of the conveyor system of FIG. 2.
Figure 5:
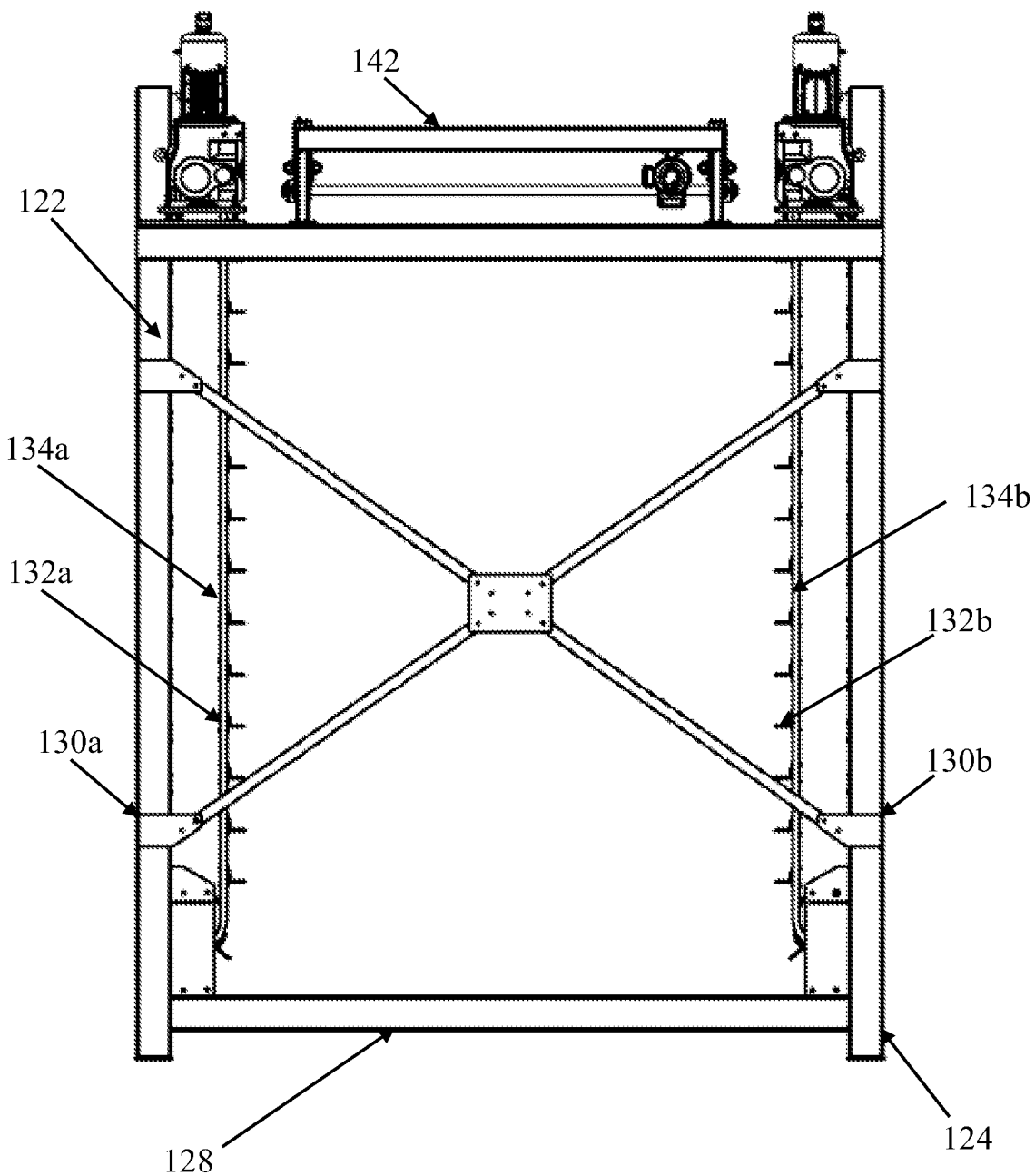
FIG. 5 is a rear view of the conveyor system of FIG. 2.
Figure 6:
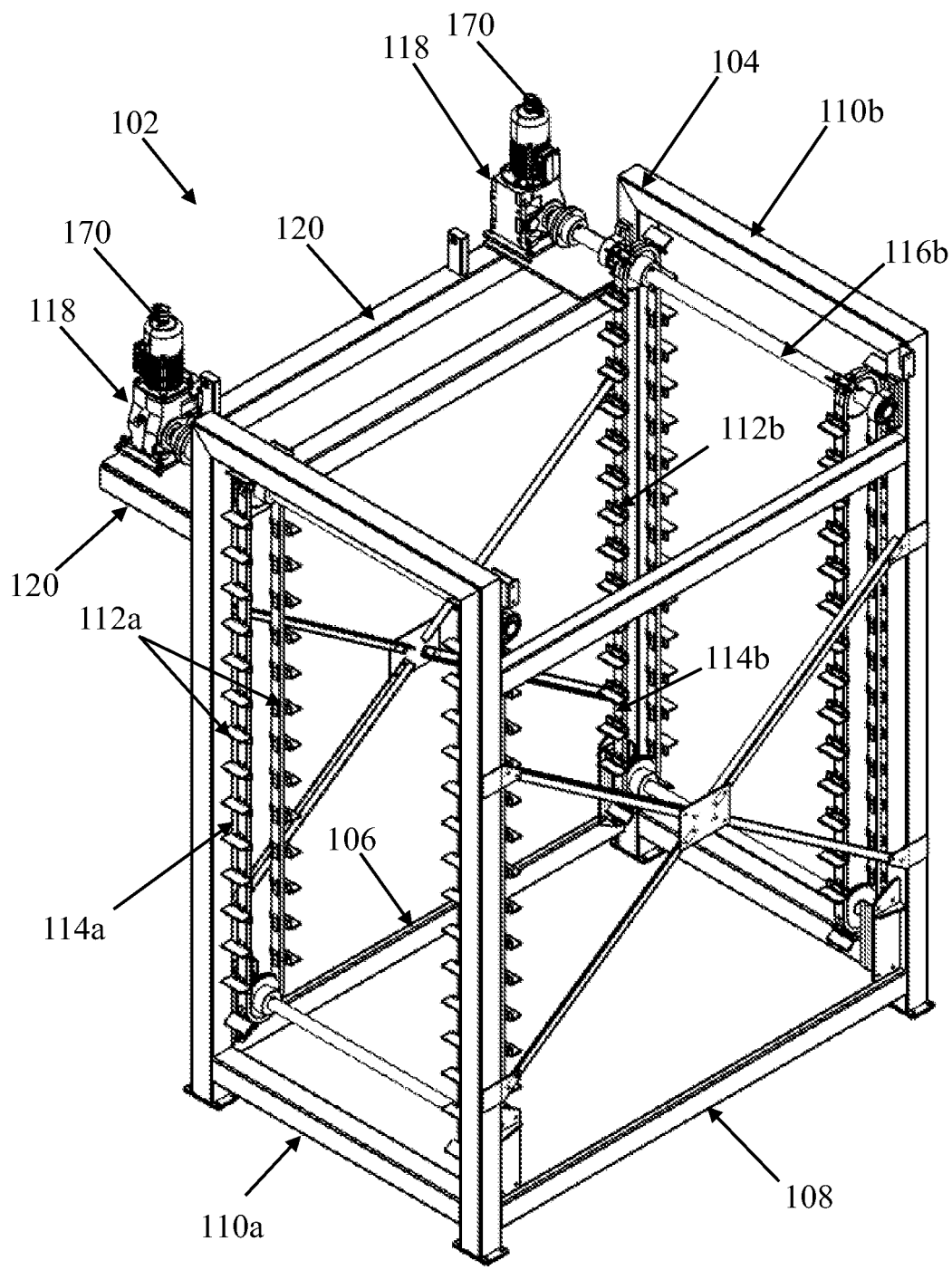
FIG. 6 is a top perspective view of a first vertical conveyor of the conveyor system of FIG. 2.
Figure 7:
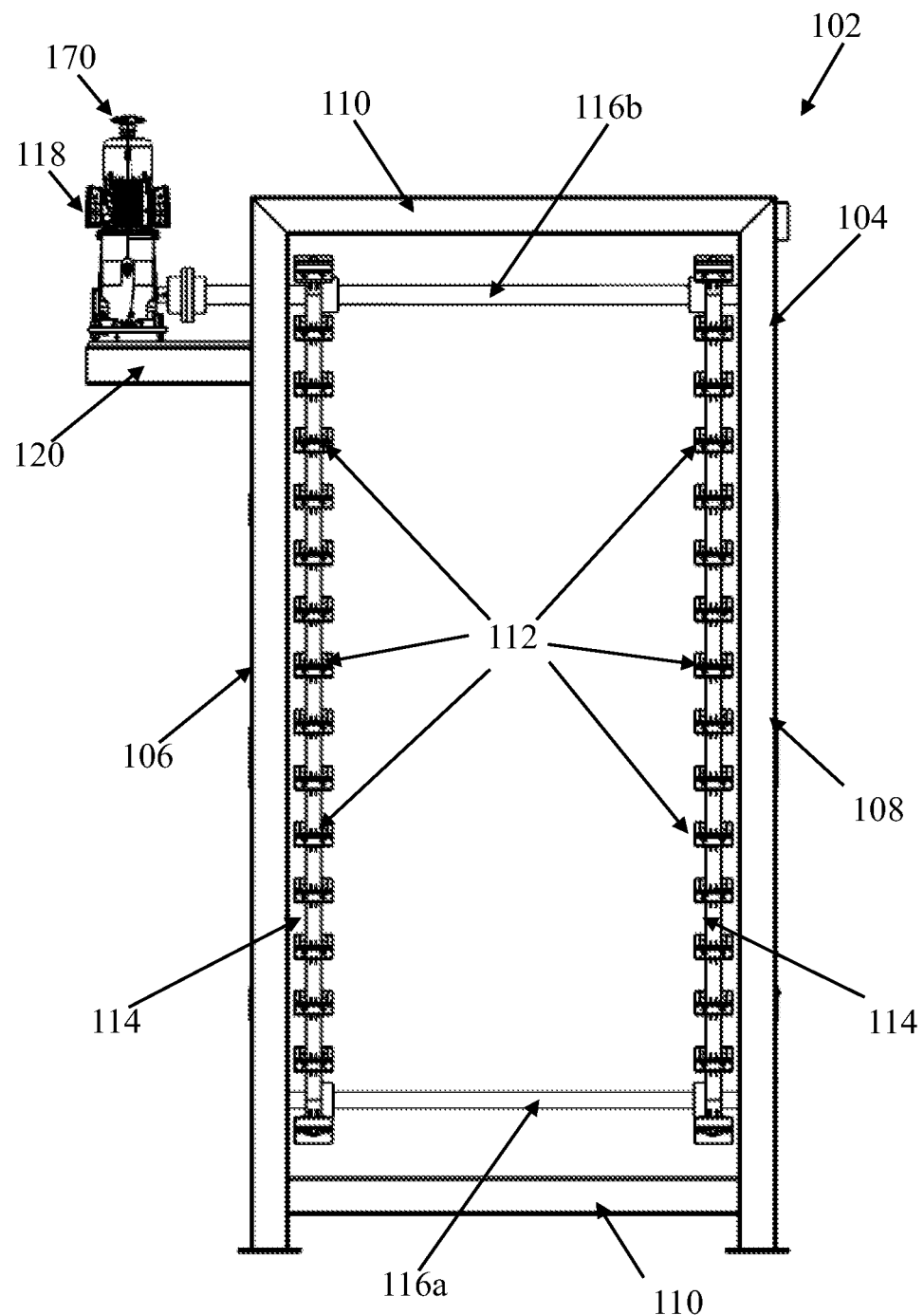
FIG. 7 is a side view of the first vertical conveyor of FIG. 6.
Figure 8:
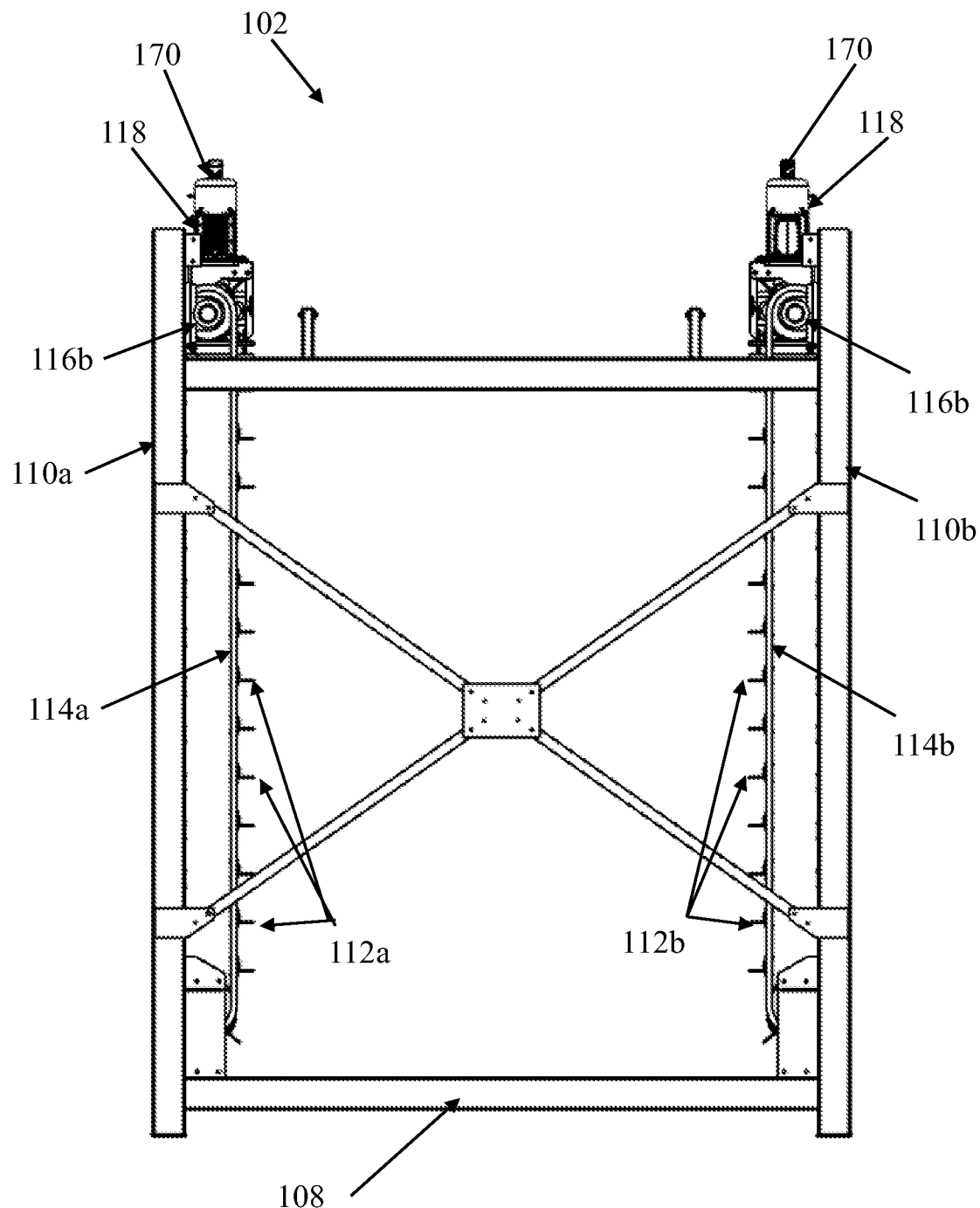
FIG. 8 is a rear view of the first vertical conveyor of FIG. 6.
Figure 9:
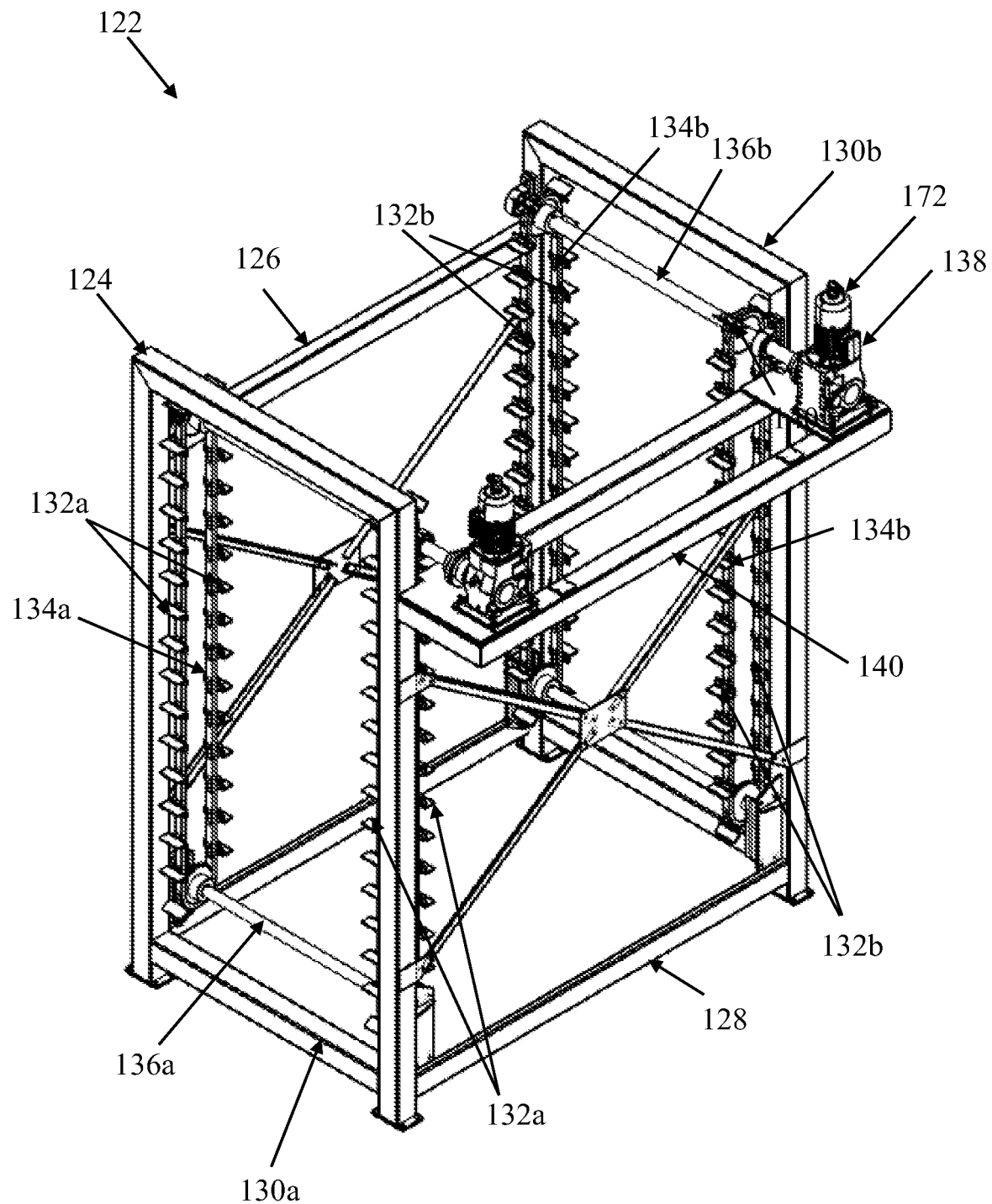
FIG. 9 is a top perspective view of a second vertical conveyor of the conveyor system of FIG. 2.
Figure 10:
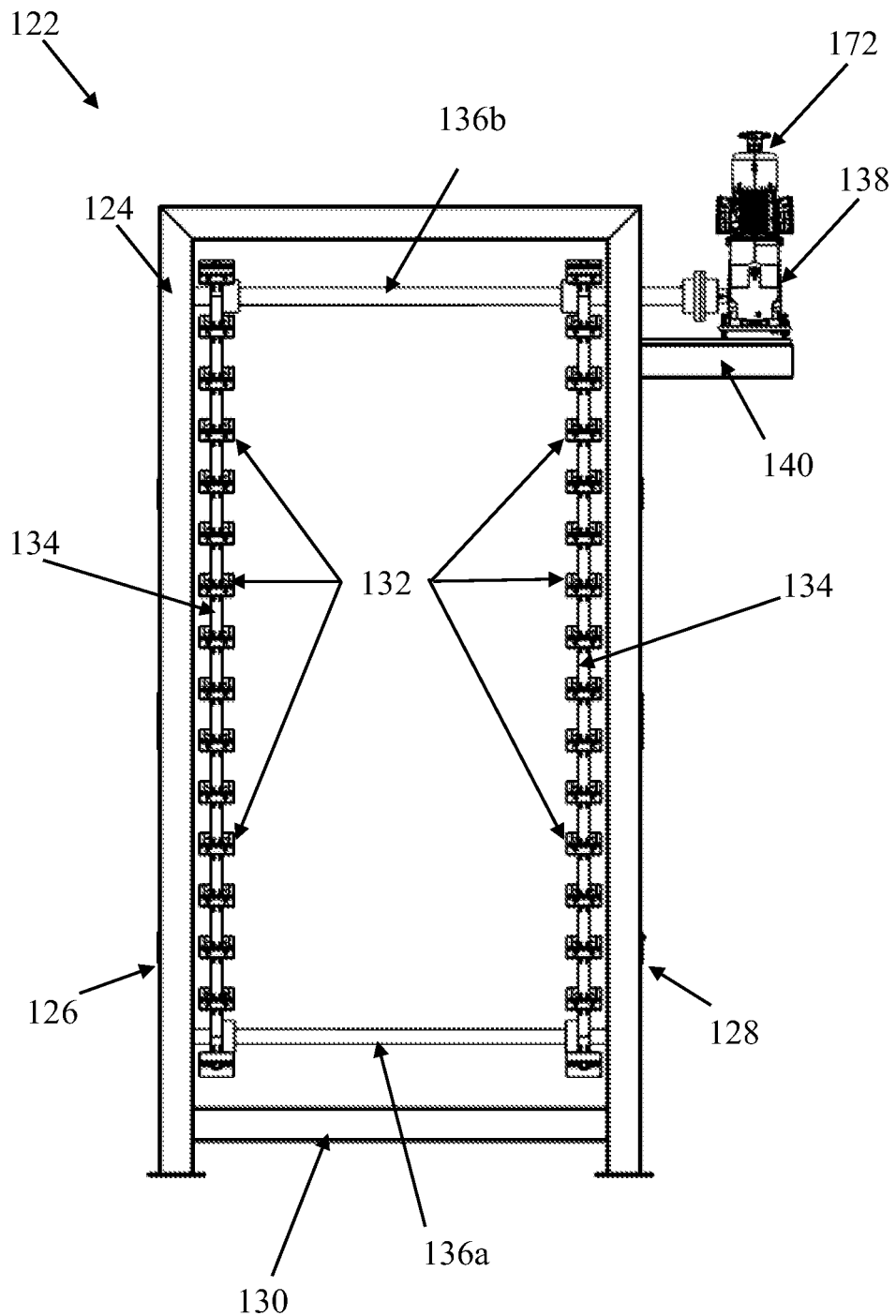
FIG. 10 is a side view of the second vertical conveyor of FIG. 9.
Figure 11:
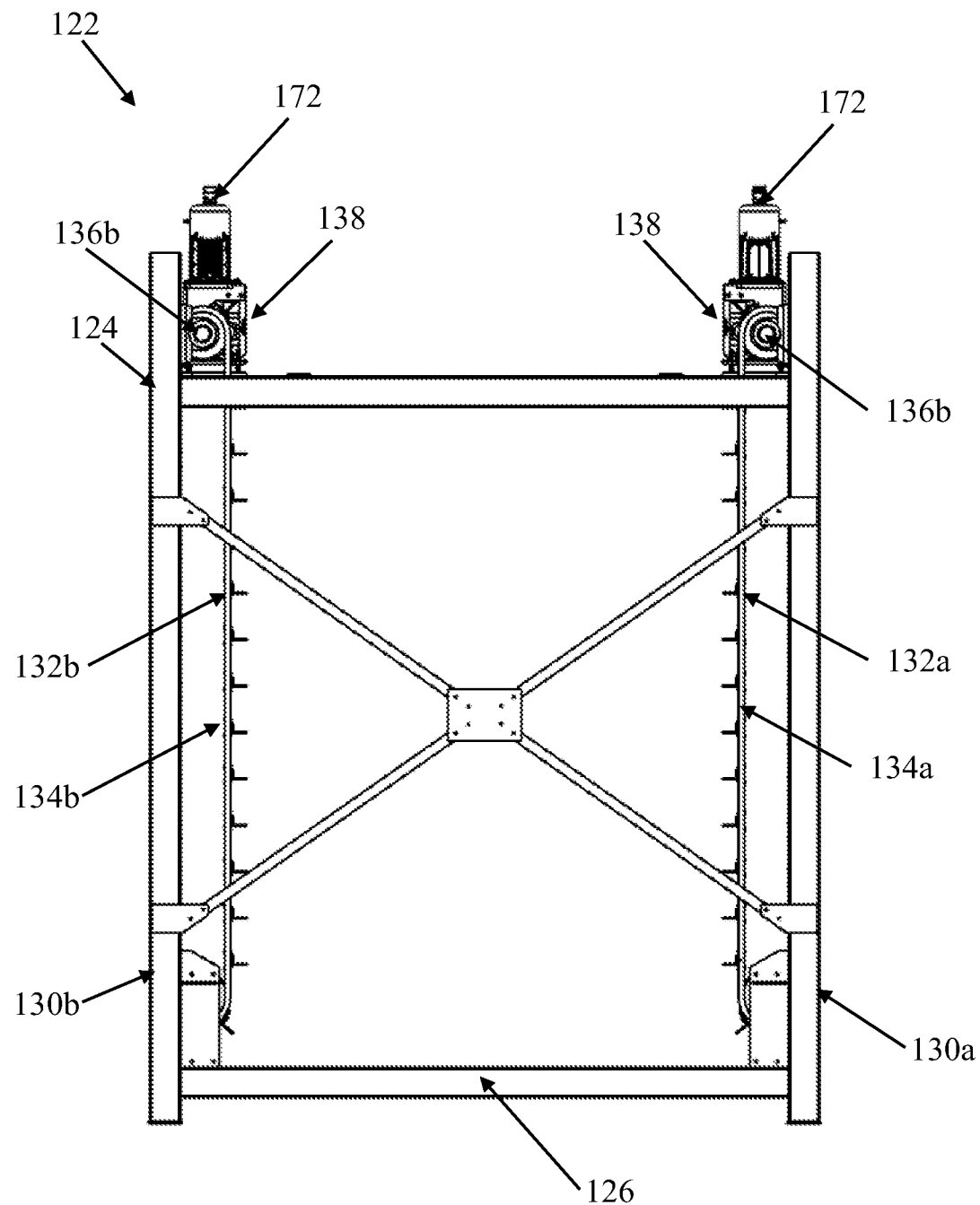
FIG. 11 is a front view of the second vertical conveyor of FIG. 9.
Figure 12:
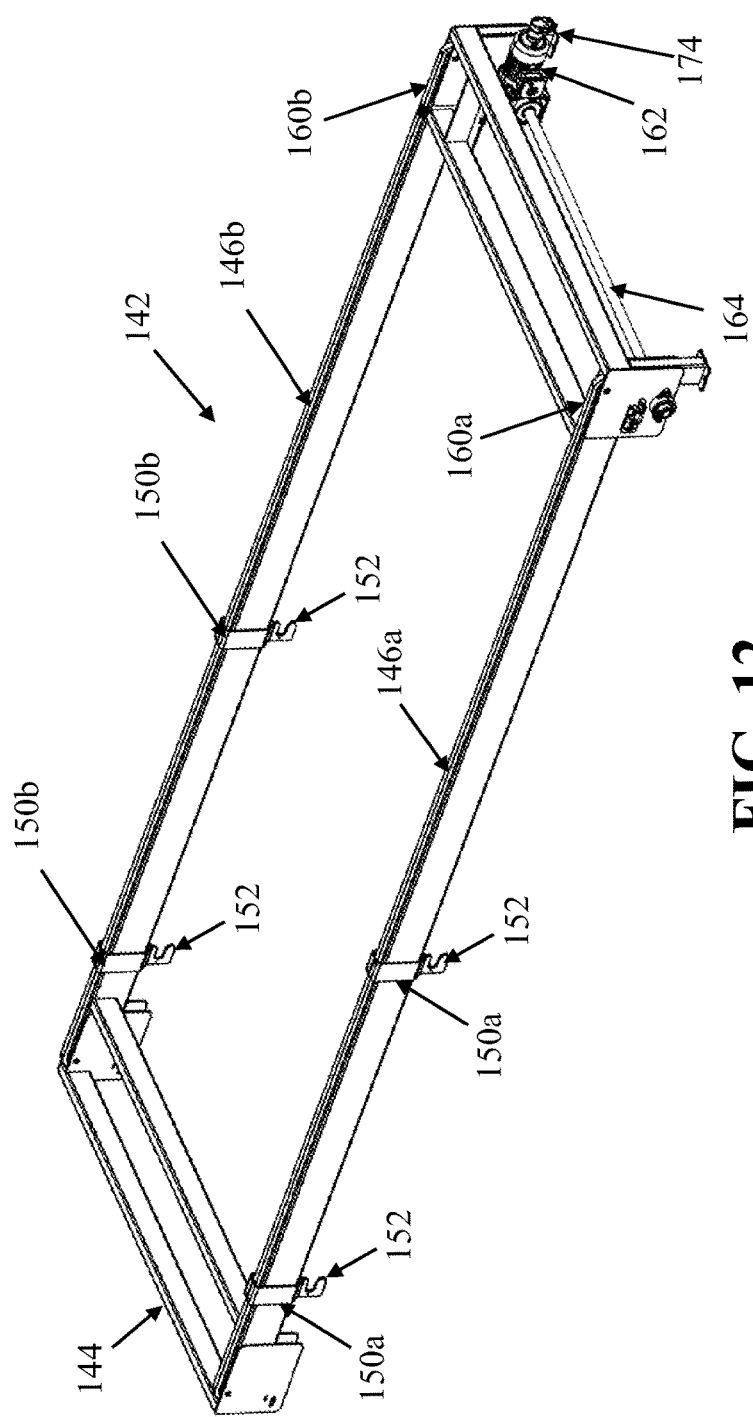
FIG. 12 is a top perspective view of a lateral conveyor of the conveyor system of FIG. 2.
Figure 13:
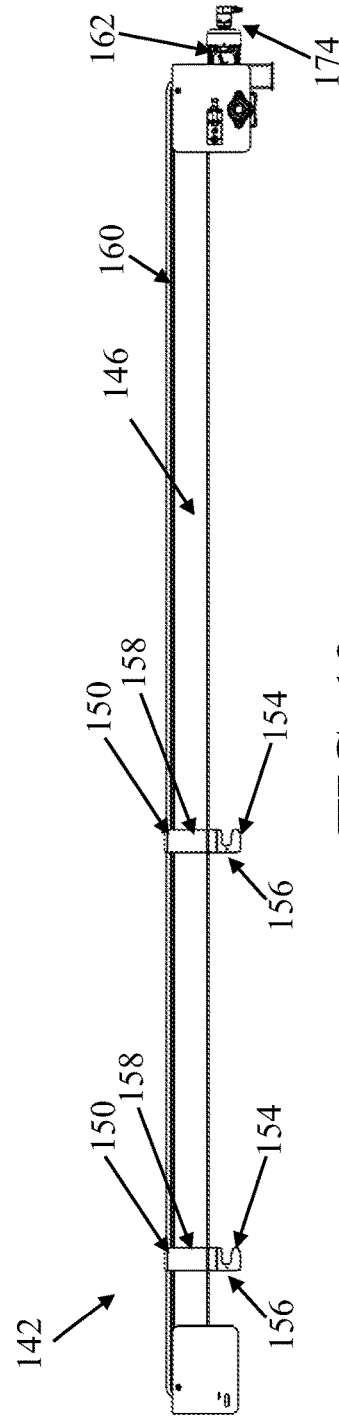
FIG. 13 is a side view of the lateral conveyor of FIG. 12.
Figure 14A:
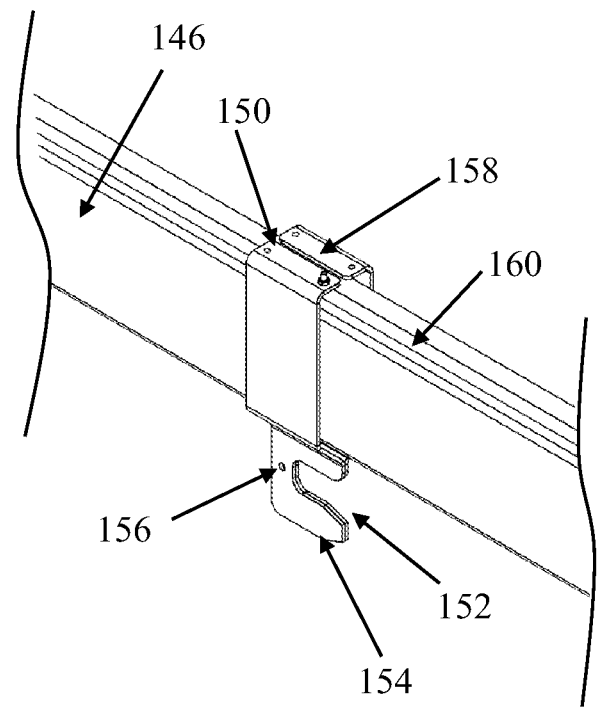
FIG. 14A is a top perspective view of a lateral support disposed on a side rail of the lateral conveyor of FIG. 12.
Figure 14B:
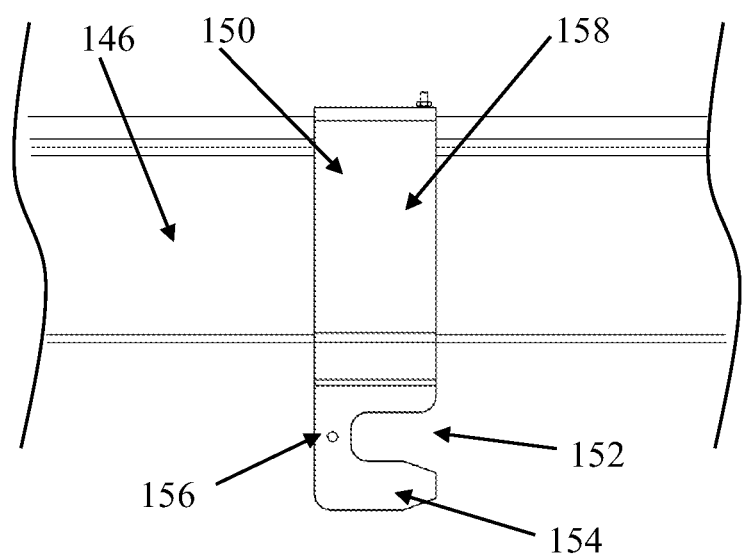
FIG. 14B is a side view of the lateral support of FIG. 14A disposed on a side rail of the lateral conveyor of FIG. 12.

The conveyor system 100 may be used in conjunction with or include a controller 190 configured to control one or more operations of the conveyor system 100. The controller 190 may be and/or include a microprocessor or any other electronic control device known in the art. As shown in FIG. 1, the controller 190 may include at least one processor 192 that executes instructions that are stored in a memory 194. The memory 194 has a conveyor control module 196 loaded therein that is configured to control the conveyance of carriers through the conveyor system 100. The conveyor control module 196 may be configured to generate and output one or more commands to control an operation of the first vertical conveyor 102, the lateral conveyor 142, and/or the second vertical conveyor 122 to control the conveyance of one or more carriers into, through, and out of the conveyor system 100.

The processor 192 can be a central processing unit (CPU), a graphical processing unit (GPU), a field programmable gate array (FRGA), or any suitable combination of such computing devices. Further, the controller 190 and/or the processor 192 may implement a neural network which may be any suitable type of neural network, including a convolutional neural network, a deep neural network, a recurrent neural network, a graph neural network, etc.

The conveyor system 100 may include one or more sensors 170, 172, 174 distributed in, on, and/or around the conveyor system 100. The sensors 170, 172, 174 are configured to generate one or more outputs indicative of the position of one or more carriers in the conveyor system 100 and/or the positions of the first vertical conveyor 102, the lateral conveyor 142, and/or the second vertical conveyor 122. In the illustrated embodiment, the conveyor system 100 includes a first sensor 170 configured to generate an output indicative of the operation of the first vertical conveyor 102, a second sensor 172 configured to generate an output indicative of the operation of the second vertical conveyor 122, and a third sensor 174 configured to generate an output indicative of the operation of the lateral conveyor 142. In some embodiments, the sensors 170, 172, 174 are configured to generate outputs indicative of one or more conveyance errors or problems in the conveyor system 100. For example, the sensors 170, 172, 174 may be configured to generate an output indicative of one or more carriers being misaligned within the conveyor system 100. The sensors 170, 172, 174 may be any suitable sensors configured to generate outputs based upon the operations of the conveyor system 100. For example, the sensors 170, 172, 174 may be light sensors, photoelectric sensors, laser measurement sensors, cameras, proximity sensors, accelerometers, position sensors, 2-D or 3-D vision sensors, high-temperature fiber optic sensors, proximity switches, photo eyes, or the like, or any combination thereof. Further, while the conveyor system 100 has been described as including one sensor 170 for the first vertical conveyor 102, one sensor 172 for the second vertical conveyor 122, and one sensor 174 for the lateral conveyor 142, it will be understood that the conveyor system 100 may include any suitable number of sensors 170, 172, 174. For example, each of the first vertical conveyor 102, the second vertical conveyor 122, and the lateral conveyor 142 may include a plurality of sensors 170, 172, 174.

In some embodiments, the sensors 170, 172, 174 are in direct data communication with the controller 190. For example, the sensors 170, 172, 174 may be in data communication with the controller 190 such that the controller 190 may receive outputs generated by each of the sensors 170, 172, 174. The conveyor system 100 may also include one or more networks 176 in data communication with the conveyor system 100, the sensors 170, 172, 174, and/or the controller 190. Each network 176 may be any suitable wired or wireless communication system which may permit data communication between devices, computers, processors, hardware components, or other suitable components. For example, each network 176 may be the Internet, intranet, wire connection, or any other suitable means for enabling operable communication between devices, computers, processors, hardware components, or other suitable components.

The controller 190 may receive the outputs of the sensors 170, 172, 174 as input and generate one or more outputs based upon the outputs of the sensors 170, 172, 174. The controller 190, such as the conveyor control module 196, may generate one or more commands based upon the outputs of the sensors 170, 172, 174 to control an operation of the first vertical conveyor 102, the lateral conveyor 142, and/or the second vertical conveyor 122. The commands output by the controller 190 may cause the conveyor system 100, such as the first vertical conveyor 102, the lateral conveyor 142, and/or the second vertical conveyor 122, to execute a conveying maneuver to convey one or more carriers through the conveyor system 100, as detailed below. In some embodiments, the controller 190 may also be configured to generate a warning output, such as an output detectable by a user, indicative of an error in the conveyor system 100. For example, the controller 190 may generate an output to a user indicative of a misalignment of a carrier in the system 100 such that the user may fix the misalignment.

While illustrated as a single system, it is to be understood that the controller 190 may be a distributed system. Thus, for instance, several devices may be in communication by way of a network connection, such as via network 176, and may collectively perform tasks described as being performed by the controller 190.

Referring now to FIGS. 2-8, the first vertical conveyor 102 includes a substantially rectangular frame 104 having a front 106, a rear 108 opposite the front 106, and sides 110 extending on opposite sides of the frame 104 between the front and the rear 106, 108. The sides 110 are disposed substantially in parallel with each other with a first or right side 110a disposed opposite a second or left side 110b. Each of the first and second sides 110a, 110b may comprise substantially rectangular frame members and the front 106 and rear 108 of the frame 104 may comprise cross frame members extending between the first and second sides 110a, 110b. In the illustrated embodiment, the front 106 and the rear 108 of the frame 104 each comprise a lower cross-frame member disposed at a bottom of the frame 104 and an upper cross frame member disposed near an upper portion of the frame 104.

The first vertical conveyor 102 includes a plurality of carrier supports 112 extending vertically along the sides 110. The first vertical conveyor 102 may include first carrier supports 112a spaced vertically along the first side 110a and second carrier supports 112b spaced vertically along the second side 110b. The carrier supports 112 are configured to extend at least partially beneath one of the carriers to lift and support the carrier. The first vertical conveyor 102 is configured such that the carrier supports 112 may travel in continuous loops along each side 110 of the frame 104. The carrier supports 112 may be disposed in a first orientation (e.g., upright) when the carrier supports 112 are disposed on the inner sides of the sides 110 and a second or opposite orientation (e.g., upside down) when the carrier supports 112 are disposed on an opposite side of the loop near an outside of the frame 104. Each carrier support 112 may be substantially L-shaped with a vertical portion extending upwardly and a lateral portion extending inwardly (e.g., toward a medial portion of the frame 104) when the carrier support 112 is in the first orientation. The lateral portion of the carrier support 112 extends from a bottom of the vertical portion when the carrier support 112 is in the first orientation (e.g., upright). In some embodiments, the lateral portions of the carrier supports 112 are substantially perpendicular to the vertical portions of the carrier supports 112.

The carrier supports 112 are disposed in the first vertical conveyor 102 such that each first carrier support 112a in the first orientation substantially aligns with (e.g., is disposed at substantially the same height as) one of the second carrier supports 112b in the first orientation. The lateral portions of the first carrier supports 112a in the first orientation and the lateral portions of the second carrier supports 112b in the first orientation may extend toward each other at substantially the same height. The lateral portions of the carrier supports 112 are configured to extend at least partially underneath a bottom surface of a carrier when the carrier is disposed between the first and second carrier supports 112a, 112b. The carrier supports 112 may be sized, shaped, and configured such that the carrier supports 112 sufficiently support the carrier when the carrier is disposed between the first and second carrier supports 112a, 112b. For example, the lateral portions of the carrier supports may extend sufficiently beneath the carrier to stabilize and support the carrier when the carrier is lifted by the carrier supports 112.

The first and second carrier supports 112a, 112b in the first orientation may be spaced apart a distance substantially corresponding to a width of the carriers to be conveyed through the conveyor system 100. The first and second carrier supports 112a, 112b may be spaced apart a distance such that the vertical portions of the carrier supports 112 in the upright position may abut sides of the carrier or otherwise align the carrier when the carrier is disposed between the corresponding first and second carrier supports 112a, 112b. For example, the first and second sides 110a, 110b may be spaced apart a distance corresponding to a width of the carriers to be conveyed through the conveyor system 100.

The first vertical conveyor 102 may include one or more continuous belts 114 configured to drive the carrier supports 112. The continuous belts 114 may be configured to drive the carrier supports 112 in a looped configuration around the sides 110 of the frame 104. The first vertical conveyor 102 may include one or more first continuous belts 114a configured to drive the first carrier supports 112a and one or more second continuous belts 114b configured to drive the second carrier supports 112b. The first continuous belts 114a may be disposed in a looped configuration along the first side 110a and the second continuous belts 114b may be disposed in a looped configuration along the second side 110b. The inclusion of first and second continuous belts 114a, 114b on opposite sides of the frame 104 may distribute the weight of the carriers conveyed by the first vertical conveyor 102. While the continuous belts 114 are illustrated as continuous bands, it will be understood that the continuous belts 114 may have other configurations. For example, the continuous belts 114 may be continuous chains or the like.

The carrier supports 112 may be fixed to the continuous belts 114 such that the continuous belts 114 may drive the carrier supports 112 in the looped travel path. In some embodiments, the vertical portions of the carrier supports 112 are fixed to the continuous belts 114 via fasteners, welding, or the like. For example, the vertical portions of the first carrier supports 112a may be fixed to the first continuous belt 114a and the second carrier supports 112b may be fixed to the second continuous belt 114b. In other embodiments, the carrier supports 112 may be integral with the continuous belts 114. The carrier supports 112 may be spaced apart along the continuous belts 114 such that a plurality of carrier supports 112 may be disposed in the first orientation along the continuous belts 114 such that multiple carriers may be simultaneously conveyed by the first vertical conveyor 102. The carrier supports 112 may also be spaced apart along the continuous belts 114 such that the carriers do not abut each other when the carriers are conveyed through the first vertical conveyor 102 and such that carriers may be conveyed through the conveyor system 100, as detailed below.

Each continuous belt 114 may be looped around one or more drive shafts 116. The continuous belts 114 may be looped around the drive shafts 116 such that rotation of one or more of the drive shafts 116 drives the continuous belts 114 in the looped configuration, such as via friction and/or tension. One of the drive shafts 116 may be a driven shaft configured to drive the continuous belts 114 and one of the drive shafts 116 may be a tensioning shaft configured to provide tension to the continuous belt 114 such that the continuous belt 114 may be driven in the looped configuration. In the illustrated embodiment, each continuous belt 114 is looped around a lower drive shaft 116a disposed near a bottom of the frame 104 and an upper drive shaft 116b disposed near a top of the frame 104.

Each upper drive shaft 116b may be coupled with a motor or drive 118 configured to rotate the upper drive shaft 116b. The drives 118 may be disposed at a top portion of the frame 104 near the front 106 of the frame 104. Each drive 118 may rotate the corresponding upper drive shafts 116b to drive the continuous belts 114 in the looped configuration. The drives 118 may rotate the upper drive shafts 116b to drive the carrier supports 112 in a first direction in which the carrier supports 112 in the first orientation are elevated and a second direction in which the carrier supports 112 in the first orientation are lowered. The drives 118 may be any suitable motor, engine, drive, or the like configured to rotate the upper drive shafts 116b and drive the continuous belts 114. In some embodiments, the first sensor 170 is disposed near the drives 118 such that the first sensor 170 may generate an output based on an operation of the drives 118 as well as the positions of carriers within the first vertical conveyor 102. However, it will be understood that the first vertical conveyor 102 may include additional first sensors 170 and/or that the first sensors 170 may be disposed in other positions and configurations in the first vertical conveyor 102.

In some embodiments, the drives 118 and the first sensor 170 are coupled with the controller 190. The drives 118 and the first sensor 170 may be directly in data communication with the controller 190, such as via wired connections, and/or may be in data communication with the controller 190 via the network 176. The controller 190 and/or the conveyor control module 196 may be configured to generate and output one or more commands to control an operation of each of the drives 118, such as based upon outputs generated by the first sensor 170. For example, the first sensor 170 may generate an output indicative of the position of carriers within the first vertical conveyor 102 and/or of the operation of the drives 118 and the controller 190 and/or the conveyor control module 196 may be configured to generate and output one or more commands to cause the respective drives 118 to drive the carrier supports 112 in the first direction, to drive the carrier supports 112 in the second direction, and/or to stop rotation of either or both drives 118.

In some embodiments, the first vertical conveyor 102 includes two sets of carrier supports 112 disposed along each side 110 of the frame 104. One set of carrier supports 112 may be affixed to continuous belts 114 disposed near the front 106 of the frame 104 and the other set of carrier supports 112 may be affixed to continuous belts 114 disposed near the rear 108 of the frame 104. For example, the first vertical conveyor 102 may include two first continuous belts 114a with a plurality of first carrier supports 112a along the first side 110a and two second continuous belts 114b with a plurality of second carrier supports 112b along the second side 110b.

The first carrier supports 112a of each first continuous belt 114a may be disposed at the same height as a corresponding first carrier support 112a of the other first continuous belt 114a and the second carrier supports 122a of each second continuous belt 114b may be disposed at the same height as a corresponding second carrier support 112b of the other second continuous belt 114b. Each pair of aligned first carrier supports 112a may be aligned with (at the same height as) a pair of aligned second carrier supports 112b. The first continuous belts 114a may be driven in tandem via the upper drive shaft 116b along the first side 110a and the second continuous belts 114b may be driven in tandem via the upper drive shaft 116b along the second side 110b.

The sets of first carrier supports 112a may be spaced along the first side 110a and the sets of second carrier supports 112b may be spaced along the second side 110b a distance such that the carrier supports 112 may evenly support a carrier disposed between the carrier supports 112. For example, each set of carrier supports 112 may be disposed in a position substantially corresponding to or near a corner of a carrier when the carrier is disposed in the first vertical conveyor 102. The inclusion of separate first and second carrier supports 112a, 112b spaced along the first and second sides 110a, 110b may increase the stabilization of the carriers as the carriers are conveyed through the first vertical conveyor 102. Additionally, the inclusion of separate first and second carrier supports 112a, 112b along the first and second sides 100a, 110b may decrease the cost of the conveyor system 100.

In some embodiments, the frame 104 of the first vertical conveyor 102 includes a frame support portion 120 extending from the front 106 of the frame 104. The frame support portion 120 may be disposed near the top of the frame 104 and may be substantially U-shaped. The drives 118 may be disposed on an upper surface of the frame support portion 120. The frame support portion 120 may be disposed at a height such that the drives 118 are substantially in line with the corresponding upper drive shaft 116b. The frame support portion 120 may also be disposed at a height such that carriers may be lifted by the carrier supports 112 and transferred to the lateral conveyor 142, as detailed below.

Referring now to FIGS. 2-5 and 9-11, the second vertical conveyor 122 may be substantially similar to the first vertical conveyor 102. The second vertical conveyor 122 may be configured to receive carriers at a top of the second vertical conveyor 122 and lower the carriers such that the carriers may be output from the conveyor system 100, such as to an output conveyor. The second vertical conveyor 122 includes a substantially rectangular frame 124 having a front 126, a rear 128 opposite the front 126, and sides 130 extending on opposite sides of the frame 124 between the front and the rear 126, 128. The sides 130 are disposed substantially in parallel with each other with a first or right side 130a disposed opposite a second or left side 130b. Each of the first and second sides 130a, 130b comprise a substantially rectangular frame member and the front 126 and the rear 128 of the frame 104 comprise cross frame members extending between the first and second sides 130a, 130b. In some embodiments, the frame 124 of the second vertical conveyor 122 has a height substantially equivalent to a height of the frame 104 of the first vertical conveyor 102. In the illustrated embodiment, the front 126 and the rear 128 of the frame 124 each comprise a lower cross-frame member disposed at a bottom of the frame 124 and an upper cross-section frame member disposed near an upper portion of the frame 124.

The second vertical conveyor 122 may be disposed in line with the first vertical conveyor 102 such that a carrier conveyed from the first vertical conveyor 102 may be laterally transferred to the second vertical conveyor 122. In some embodiments, the sides 130 of the second vertical conveyor 122 may be disposed in alignment with the sides 110 of the first vertical conveyor 102. For example, the first side 130a of the second vertical conveyor 122 may be disposed in alignment with the first side 110a of the first vertical conveyor 102 and the second side 130b of the second vertical conveyor 122 may be disposed in alignment with the second side 110b of the first vertical conveyor 102. In the illustrated embodiment (FIGS. 2-5), the front 126 of the second vertical conveyor 122 is disposed adjacent to the rear 108 of the first vertical conveyor 102. However, it will be understood that the conveyor system 100 may have other suitable configurations. For example, the front 126 of the second vertical conveyor 122 may be spaced apart from the rear 108 of the first vertical conveyor 102 and/or the sides 130 of the second vertical conveyor 122 may not be aligned with the sides 110 of the first vertical conveyor 102.

The second vertical conveyor 122 also includes a plurality of carrier supports 132 extending vertically along the sides 130. The second vertical conveyor 122 may include first carrier supports 132a extending vertically along the first side 130*a* and second carrier supports 132*b* extending vertically along the second side 130*b*. The carrier supports 132 of the second vertical conveyor 122 may be configured and disposed in substantially the same manner as the carrier supports 112 of the first vertical conveyor 102. The carrier supports 132 of the second vertical conveyor 122 are configured to support and carriers and to lower and elevate the carriers within the second vertical conveyor 122.

The second vertical conveyor 122 may include one or more continuous belts 134 configured to drive the carrier supports 132 in a looped travel path similar to the continuous belts 114 of the first vertical conveyor 102. The second vertical conveyor 122 may include one or more first continuous belts 134*a* configured to drive the first carrier supports 132*a* and one or more second continuous belts 134*b* configured to drive the second carrier supports 132*b*. The first continuous belts 134*a* may be disposed in a looped configuration along the first side 130*a* and the second continuous belts 134*b* may be disposed in a looped configuration along the second side 130*b*. The inclusion of first and second continuous belts 134*a*, 134*b* on opposite sides of the frame 124 may distribute the weight of the carriers conveyed by the second vertical conveyor 122. While the continuous belts 134 are illustrated as continuous bands, it will be understood that the continuous belts 134 may have other configurations. For example, the continuous belts 134 may be continuous chains or the like.

The carrier supports 132 may be fixed to the continuous belts 134 such that the continuous belts 134 may drive the carrier supports 132 in the looped travel path. In some embodiments, the vertical portions of the carrier supports 132 are fixed to the continuous belts 134 via fasteners, welding, or the like. For example, the vertical portions of the first carrier supports 132*a* may be fixed to the first continuous belt 134*a* and the second carrier supports 113*b* may be fixed to the second continuous belt 134*b*. In other embodiments, the carrier supports 132 may be integral with the continuous belts 134. The carrier supports 132 may be spaced apart along the continuous belts 134 such that a plurality of carrier supports 132 may be disposed in the first orientation (e.g., upright) along the continuous belts 134 such that multiple carriers may be simultaneously conveyed by the second vertical conveyor 122. The carrier supports 132 may also be spaced apart along the continuous belts 134 such that the carriers do not abut each other when the carriers are conveyed through the second vertical conveyor 122 and such that a carrier may be received by upper carrier supports 132 while multiple carriers are disposed on other carrier supports 132 in the second vertical conveyor 122, as detailed below.

Each continuous belt 134 may be looped around one or more drive shafts 136. The continuous belts 134 may be looped around the drive shafts 136 such that rotation of one or more drive shafts 136 drives the continuous belts 134 in the looped configuration, such as via friction and/or tension. One of the drive shafts 136 may be a driven shaft configured to drive the continuous belts 134 and one of the drive shafts 136 may be a tensioning shaft configured to provide tension to the continuous belt 134 such that the continuous belt 134 may be driven in the looped configuration. In the illustrated embodiment, each continuous belt 134 is looped around a lower drive shaft 136*a* disposed near a bottom of the frame 124 and an upper drive shaft 136*b* disposed near a top of the frame 124.

Each upper drive shaft 138*b* may be coupled with a motor or drive 138 configured to rotate the upper drive shaft 138*b*. The drive 138 may be disposed at a top portion of the frame 124 near the rear 128 of the frame 124. Each drive 138 may rotate the corresponding upper drive shaft 138*b* to drive the carrier supports 132 in a first direction in which the carrier supports 132 in the first orientation (upright) are elevated and a second direction in which the carrier supports 132 in the first orientation are lowered. The drives 138 may be any suitable motor, engine, drive, or the like configured to rotate the upper drive shafts 138*b* and drive the continuous belts 134. In some embodiments, the second sensor 172 is disposed near the drives 138 such that the second sensor 172 may generate an output based on an operation of the drives 138 as well as the positions of carriers within the second vertical conveyor 122. However, it will be understood that the second vertical conveyor 122 may include additional second sensors 172 and/or that the second sensors 172 may be disposed in other positions and configurations in the second vertical conveyor 122.

In some embodiments, the drives 138 and the second sensor 172 are coupled with the controller 190. The drives 138 and the second sensor 172 may be directly in data communication with the controller 190, such as via wired connections, and/or may be in data communication with the controller 190 via the network 176.

The controller 190 and/or the conveyor control module 196 may be configured to generate and output one or more commands to control an operation of each of the drives 138, such as based upon outputs generated by the second sensor 172. For example, the second sensor 172 may generate an output indicative of the position of carriers within the second vertical conveyor 122 and/or of the operation of the drives 138 and the controller 190 and/or the conveyor control module 196 may be configured to generate and output one or more command outputs to cause the respective drives 138 to drive the carrier supports 132 in the first direction, to drive the carrier supports 132 in the second direction, and/or to stop rotation of either or both drives 138.

In some embodiments, the second vertical conveyor 122 includes two sets of carrier supports 132 along each side 130 of the frame 124. One set of carrier supports 132 may be affixed to continuous belts 134 disposed near the front 126 of the frame 124 and the other set of carrier supports 132 may be affixed to continuous belts 134 disposed near the rear 108 of the frame 104. For example, the second vertical conveyor 122 may include two first continuous belts 134*a* with a plurality of first carrier supports 132*a* along the first side 130*a* and two second continuous belts 134*b* with a plurality of second carrier supports 132*b* along the second side 130*b*. The first and second continuous belts 134*a*, 134*b* and the first and second carrier supports 132*a*, 132*b* may be disposed and positioned in the same manner as the first and second continuous belts 114*a*, 114*b* and the first and second carrier supports 112*a*, 112*b* of the first vertical conveyor 102. The first and second carrier supports 132*a*, 132*b* may be disposed on the first and second continuous belts 134*a*, 134*b* such that carriers may be balanced and supported by the carrier supports 132 and such that the carrier supports 132 may elevate and lower the carriers.

In some embodiments, the frame 124 of the second vertical conveyor 122 includes a frame support portion 140 extending from the rear 128 of the frame 124. The frame support portion 140 may be disposed near the top of the frame 124 and may be substantially U-shaped. The drives 138 may be disposed on an upper surface of the frame support portion 140. The frame support portion 140 may be disposed at a height such that the drives 138 are substantially in line with the corresponding upper drive shaft 136*b*. The frame support portion 140 may also be disposed at a height such that carriers may conveyed from the lateral conveyor 142 onto the carrier supports 132 of the second vertical conveyor 122 and lowered by the carrier supports 132, as detailed below.

Referring now to FIGS. 2-5 and 12-14B, the lateral conveyor 142 is shown according to one embodiment. The lateral conveyor 142 is configured to be disposed at least partially above the first vertical conveyor 102 and at least partially above the second vertical conveyor 122. The lateral conveyor 142 is configured to receive carriers conveyed upwardly through the first vertical conveyor 102 to a height substantially at the top of the first vertical conveyor 102. The lateral conveyor 142 is also configured to laterally convey each carrier toward the second vertical conveyor 122 and deposit each carrier onto the second vertical conveyor 122 at a height substantially at the top of the second vertical conveyor 122, such as for the carriers to be lowered by the second vertical conveyor 122.

The lateral conveyor 142 includes a frame 144 having two side rails 146. The side rails 146 may be disposed substantially in parallel with each other with a first or right side rail 146a disposed opposite a second or left side rail 146b. In some embodiments, the frame 144 includes one or more cross frame members extending between the side rails 146 and configured to increase the structural integrity of the frame 144. In some embodiments, the frame 144 may also include one or more vertical supports 148 extending downwardly from one or more of the side rails 146. The vertical supports 148 may be affixed to the side rails 146 and configured to attach to or otherwise support the frame 144 on the first and second vertical conveyors 102, 122. In the illustrated embodiment, the frame 144 includes a vertical support 148 disposed at each end (e.g., upstream and downstream ends) of each of the first and second side rails 146a, 146b. The vertical supports 148 disposed at the upstream end of each of the side rails 146a, 146b may be attached to the upper surface of the frame support portion 120 of the frame 104 of the first vertical conveyor 102. The vertical supports 148 disposed at the downstream end of the each of the side rails 146a, 146b may be attached to the upper surface of the frame support portion 140 of the frame 124 of the second vertical conveyor 122.

The frame 144 may be positioned above at least a portion of each of the first and second vertical conveyors 102, 122. The upstream end of the frame 144 may be positioned above the first vertical conveyor 102 and the downstream end of the frame 144 may be positioned above the second vertical conveyor 122. The frame 144 may substantially cover the tops of each of the first and second vertical conveyors 102, 122. The side rails 146 of the frame 144 may be disposed medially to (e.g., in between) the sides 110, 130 of the first and second vertical conveyors 102, 122. The first side rail 146a may be disposed medial to the first sides 110a, 130a of the first and second vertical conveyors 102, 122. The second side rail 146b may be disposed medially to the second sides 110b, 130b of the first and second vertical conveyors 102, 122. The side rails 146 may also be disposed medially to the carrier supports 112, 132 of the first and second vertical conveyors 102, 122. The side rails 146a, 146b may be spaced apart corresponding to sizes (e.g., a width) of the carriers to be used with the conveyor system 100, as detailed below.

In the illustrated embodiment, the first and second side rails 146a, 146b are substantially straight and substantially level and extend substantially between the frame support portion 120 of the first vertical conveyor 102 and the frame support portion 140 of the second vertical conveyor 122 (e.g., the combined length of the first and second vertical conveyors 102, 122). However, it will be understood that the conveyor system 100 may have other suitable configurations. For example, the side rails 146a, 146b may be curved and/or may include one or more inclines and/or declines (e.g., changes in height). Additionally or alternatively, the first and second vertical conveyors 102, 122 may be spaced apart a distance such that the side rails 146a, 146b of the lateral conveyor 142 span the distance (e.g., a gap) between the first and second vertical conveyors 102, 122.

The lateral conveyor 142 includes one or more lateral supports 150 disposed at least partially below each of the side rails 146. The lateral supports 150 are configured to operably secure a carrier and laterally convey the carrier between the first and second vertical conveyors 102, 122. The lateral supports 150 may be configured to receive a carrier conveyed upwardly through the first vertical conveyor 102, laterally convey the carrier from the top of the first vertical conveyor 102 to the top of the second vertical conveyor 122, and deposit the carrier onto the second vertical conveyor 122.

Each lateral support 150 includes a carrier support portion 152 configured to operably secure and laterally convey a carrier. The carrier support portion 152 may extend below the respective side rail 146. In the illustrated embodiment, the carrier support portion 152 extends substantially (e.g., vertically) below the respective side rail 146. However, it will be understood that the carrier support portion 152 may have other configurations. For example, the carrier support portion 152 may extend at least partially medially to the side rail 146, such as toward the opposite side rail 146.

Each carrier support portion 152 may include a lateral projection 154 configured to operatively carry a portion of one of the carriers to be conveyed through the conveyor system 100. The lateral projection 154 may extend laterally from the remainder of the carrier support portion 152. The lateral projection 154 may be sized, shaped, and configured to be inserted at least partially inserted into and/or through a portion of a carrier to be conveyed through the system 100. The lateral support 150 may be operatively coupled with the carrier when the lateral projection 154 is at least partially inserted into and/or through a portion of the carrier. In the illustrated embodiment, the lateral projection 154 extends downstream (e.g., in the direction extending from the first vertical conveyor 102 to the second vertical conveyor 122) from the remainder of the carrier support portion 152.

The end of the lateral projection 154 may be tapered or rounded such that the end of the lateral projection 154 is narrower than the remainder of the lateral projection 154. The narrower end of the lateral projection 154 may allow the lateral support 150 to couple with a carrier more easily, as described below. In the illustrated embodiment, the lateral projection 154 is substantially straight in the lateral direction from the remainder of the carrier support portion 152. However, it will be understood that the lateral projection 154 may have other suitable configurations. For example, the end of the lateral projection 154 opposite the remainder of the carrier support portion 152 may extend upwardly to further secure a carrier on the lateral support 150 when the lateral projection 154 is at least partially disposed through a portion of the carrier, as detailed below.

Each carrier support portion 152 may also include a neck 156 configured to extend between the respective side rail 146 and the lateral projection 154. The neck 156 may have a lateral length less than the lateral length of the lateral projection 154. The neck 156 may also be sized, shaped, and configured to support a carrier when the carrier is coupled to the lateral supports 150, such as when a portion of the carrier is disposed on each of the lateral projections 154. The neck 156 may also be sized, shaped, and configured to abut and drive a carrier coupled to the lateral supports 150. For example, the neck 156 may abut a portion of the carrier disposed on the lateral projection 154 such that lateral movement of the lateral support 150 drives the carrier in the lateral direction.

Each lateral support 150 may also include a rail support portion 158 configured to slidably couple the lateral support 150 to the respective side rail 146. The rail support portion 158 may correspond to the shape of the side rail 146 and may substantially surround the respective side rail 146. The rail support portion 158 may extend around the side rail 146 such that the lateral support 150 is securely coupled to the side rail 146 when a carrier is coupled with the lateral supports 150. In some embodiments, the side rails 146 and the rail support portions 158 of the lateral supports 150 are substantially rectangular such that the orientation of the lateral supports 150 is maintained as the lateral supports 150 are laterally moved along the side rails 146.

The lateral conveyor 142 may include one or more first lateral supports 150a disposed at least partially beneath the first side rail 146a and one or more second lateral supports 150b disposed at least partially beneath the second side rail 146b. The first and second lateral supports 150a, 150b may be disposed on the first and second side rails 146a, 146b corresponding to the configuration of the carriers to be conveyed through the conveyor system 100, as detailed below.

In the illustrated embodiment, the lateral conveyor 142 includes two first lateral supports 150 spaced apart on the first side rail 146a and two second lateral supports 150b spaced apart on the second side rail 146b. The first lateral supports 150a may be spaced apart a distance along the first side rail 146a a distance corresponding to length of the carriers to be conveyed through the conveyor system 100. For example, the first lateral supports 150a may be spaced apart substantially corresponding to a distance between hooks or eyelets of the carriers, as detailed below. The second lateral supports 150b may be spaced apart a distance along the second frame rail 146b substantially the same distance as the space between the first lateral supports 150a. The first lateral supports 150a on the first side rail 146a may be substantially aligned with the second lateral supports 150b on the second side rail 146b. For example, the front or upstream first lateral support 150a may be substantially aligned with the front or upstream second lateral support 150b and the rear or downstream first lateral support 150a may be substantially aligned with the rear or downstream second lateral support 150b.

The lateral conveyor 142 may include one or more frame members disposed between the lateral supports 150 to maintain the position of the lateral supports 150 and/or to increase the structural integrity of the lateral conveyor 142. In some embodiments, the lateral conveyor 142 includes a lateral frame member extending between the upstream first lateral support 150a and the upstream second lateral support 150b and/or a lateral frame member extending between the downstream first lateral support 150a and the downstream second lateral support 150b, such as to increase the structural integrity of the lateral conveyor 142 when carrying a carrier. In some embodiments, the lateral conveyor 142 includes a longitudinal frame member extending between the first lateral supports 150a and/or a longitudinal frame member extending between the second lateral supports 150b, such as to maintain the spacing between the first lateral supports 150a and/or between the second lateral supports 150b.

The lateral conveyor 142 also includes one or more continuous belts 160 configured to drive the lateral supports 150 disposed on each side rail 146. The continuous belts 160 may be rotatable around and/or within the respective side rail 146. In some embodiments, the continuous belts 160 extend though longitudinal grooves extending along the side rails 146. For example, each side rail 146 may include a longitudinal groove extending into the top, bottom, front, and rear surfaces of the side rail 146 to receive one of the continuous belts 160. The continuous belts 160 may be attached or otherwise coupled to each lateral support 150 of the respective side rail 146 such that rotation of the continuous belt 160 drives the lateral supports 150 laterally along the respective side rail 146. The continuous belts 160 may be attached or otherwise coupled to the rail support portions 158 of the lateral supports 150 such that the rail support portions 158 may slide laterally along the side rails 146. The continuous belts 160 may rotate in both directions to move the lateral supports 150 upstream and downstream along the side rails 146. The continuous belts 160 may be configured to rotate in a first direction to move the lateral supports 150 downstream from a first horizontal position substantially above the first vertical conveyor 102 to a second horizontal position substantially above the second vertical conveyor 122, such as to receive a carrier from the first vertical conveyor 102 and convey the carrier to the second vertical conveyor 122. The continuous belts 160 may also be configured to rotate in a second direction to move the lateral supports 150 upstream from the second horizontal position back to the first horizontal position, such as to position the lateral supports 150 to receive a subsequent carrier.

In the illustrated embodiment, the lateral conveyor 142 includes a first continuous belt 160a extending around the first side rail 146a and coupled to the first lateral supports 150a and a second continuous belt 160b extending around the second side rail 146b and coupled to the second lateral supports 150b. In some embodiments, the first and second continuous belts 160a, 160b may be driven in unison such that the first and second lateral supports 150a, 150b may be laterally driven together along the respective first and second side rails 146a, 146b.

The lateral conveyor 142 may also include one or more motors or drives 162 configured to rotate the continuous belts 160 and laterally move the lateral supports 150. Each drive 162 may be any suitable motor, engine, drive or the like configured to rotate the continuous belts 160 and laterally move the lateral supports 150 along the side rails 146. In the illustrated embodiment, the lateral conveyor 142 includes one drive 162 configured to rotate (e.g., drive) both the first and second continuous belts 160a, 160b. The lateral conveyor 142 may include a drive shaft 164 configured to impart rotation from the drive 162 to the first and second continuous belts 160a, 160b. The drive shaft 164 may be coupled with the drive 162 and may extend substantially laterally between the first and second continuous belts 160a, 160b. Each end of the drive shaft 164 may be coupled with one of the continuous belts 160a, 160b via one or more shafts, bands, pulleys, belts, chains, or the like such that rotation of the drive shaft 164 is transferred to both continuous belts 160a, 160b. The drive shaft 164 may be coupled with the continuous belts 160a, 160b such that rotation of the drive shaft 164 drives the continuous belts 160a, 160b in unison.

In the illustrated embodiment, the lateral conveyor 142 includes one drive 162 configured to drive rotation of the first and second continuous belts 160a, 160b via the drive shaft 164. However, it will be understood that the lateral conveyor 142 may have other configurations and operation. For example, the lateral conveyor 142 may include drives 162 coupled with each continuous belt 160a, 160bb such that each drive 162 may independently drive the movement of the first or second lateral supports 150a, 150b via the first or second continuous belts 160a, 160b, respectively. In some embodiments, the third sensor 172 is disposed near the drive 162 such that the third sensor 172 may generate an output based on an operation of the drive 162 as well as the position of a carrier within the lateral conveyor 142. However, it will be understood that the lateral conveyor 142 may include additional second sensors 174 and/or that the third sensors 174 may be disposed in other positions and configurations in the lateral conveyor 142.

In some embodiments, the one or more drives 162 may each be coupled with the controller 190. The drives 162 and the third sensor 174 may be directly in data communication with the controller 190, such as via wired connections, and/or may be in data communication with the controller 190 via the network 176. The controller 190 and/or the conveyor control module 196 may be configured to generate and output one or more commands to control an operation of each of the drives 162, such as based upon outputs generated by the third sensor 174. For example, the third sensor 174 may generate an output indicative of the position of a carrier within the lateral conveyor 142 and/or of the operation of the drives 162 and the controller 190 and/or the conveyor control module 196 may be configured to generate and output one or more commands to cause the respective drives 162 to drive the lateral supports 150 in a first direction (e.g., downstream), to drive the lateral supports 150 in a second direction (e.g., upstream), and/or to stop rotation of the drives 162 (e.g., stop movement of the lateral supports 150).

While the lateral conveyor 142 has been described as including two spaced apart first lateral supports 150a and two spaced apart second lateral supports 150b, it will be understood that the lateral conveyor 142 may have other configurations. For example, the lateral conveyor 142 may include one first lateral support 150a on the first side rail 146a and one second lateral support 150b on the second side rail 146b, with each lateral support 150a, 150b having two lateral projections 154 for coupling two portions of the carrier. Alternatively, the lateral conveyor 142 may include a single lateral support 150 disposed between the side rails 146a, 146b and having four lateral projections 154 for coupling four portions of the carrier.

Referring to FIGS. 15-18, the vertical conveyor system 100 may be used in conjunction with an input conveyor 300 and an output conveyor 310. The input conveyor 300 may be configured to convey carriers into the first vertical conveyor 102 and the output conveyor 310 may be configured to convey carriers downstream from the second vertical conveyor 122. The input and output conveyors 300, 310 may be any suitable conveyors for conveying carriers.

The input conveyor 300 may be configured to convey carriers into the frame 104 of the first vertical conveyor 102 such that each carrier may be lifted by the carrier supports 112 of the first vertical conveyor 102. The input conveyor 300 may include frame members 302 disposed on opposite sides of the input conveyor 300 and define an input conveying surface 304 between the frame members 302. The input conveyor 300 may include a first or right side frame member 302a and a second or left side frame member 302b opposite the first side frame member 302a. The input conveying surface 304 may have any suitable configuration for conveying carriers. For example, the input conveyor 300 may include a plurality of cylindrical rollers, a plurality of skate wheel rollers, one or more belts, one or more chains, or the like, or any combination thereof defining the input conveying surface 304. The input conveyor 300 may also include one or more drives configured to drive carriers along the input conveying surface 304.

The downstream end of the input conveyor 300 may be at least partially disposed in the frame 104 of the first vertical conveyor 102. The frame members 302 of the input conveyor 300 may be disposed substantially parallel to and be medially inset from the sides 110 of the first vertical conveyor 102. The input conveyor 300 may be sized such that the frame members 302 are disposed medially to the carrier supports 112 disposed in the upright position. For example, the first frame member 302a may be disposed medially to the first side 110a and the first carrier supports 112a and the second frame member 302b may be disposed medially to the second side 110b and the second carrier supports 112b. The input conveyor 300 may be spaced within the first vertical conveyor 102 such that the medial first and second carrier supports 112a, 112b may be raised and lowered beyond (e.g., outside) the first and second frame members 302a, 302b. The downstream end of the input conveyor 300 may be narrower than the carriers such that a portion of the carrier hangs over each of the side frame members 302a, 302b when the carrier is disposed on the input conveying surface 304. For example, the bottom surface of the carrier may be exposed beyond each of the side frame members 302a, 302b when the carrier is disposed on the input conveying surface 304, as detailed below.

The downstream end of the input conveyor 300 may be disposed near the rear 108 of the frame 104 of the first vertical conveyor 102. The input conveying surface 304 may convey carriers into the frame 104 of the first vertical conveyor 102 such that a length of the downstream carrier on the input conveyor 300 extends in downstream of the carrier supports 112 and such that a length of the downstream carrier on the input conveyor 300 extends upstream of the carrier supports 112. In some embodiments, the input conveyor 300 includes a stop or shoulder disposed at the downstream end of the input conveying surface 304 to prevent the carrier from conveying off the input conveyor 300 and to evenly align the carrier with the carrier supports 112 of the first vertical conveyor 102. For example, the shoulder of the input conveyor 300 may stop the downstream carrier on the input conveying surface 304 in line with the carrier supports 112 such that the carrier may be balanced when lifted by the carrier supports 112, as detailed below. In some embodiments, the controller 190 is configured to control the operation of the input conveyor 300 to control the movement of carriers into the first vertical conveyor 102, such as based upon the output of one or more sensors, such as the first sensor 170.

The input conveying surface 304 of the input conveyor 300 may be disposed at a first height such that the carriers conveyed on the input conveying surface 304 may be lifted by the carrier supports 112 of the first vertical conveyor 102. The first height may be disposed at a height corresponding to a height in which the carriers disposed within the sides 110 of the frame 104 are in the fully upright position. For example, the medial first and second carrier supports 112a, 112b may be disposed with the vertical portions disposed substantially vertically and the lateral portions disposed substantially laterally at the first height.

The output conveyor 310 may be configured to be disposed at least partially within the frame 124 of the second vertical conveyor 122 such that the output conveyor 310 may convey carriers lowered by the carrier supports 132 of the second vertical conveyor 122. The output conveyor 310 may include frame members 312 disposed on opposite sides of the output conveyor 310 and define an output conveying surface 314 between the frame members 312. The output conveyor 310 may include a first or right side frame member 312a and a second or left side frame member 312b opposite the first frame member 312a. The output conveying surface 314 may have any suitable configuration for conveying carriers. For example, the output conveyor 310 may include a plurality of cylindrical rollers, a plurality of skate wheel rollers, one or more belts, or the like, or any combination thereof defining the output conveying surface 314. The output conveyor 310 may also include one or more drives configured to drive carriers along the output conveying surface 314.

The upstream end of the output conveyor 310 may be at least partially disposed in the frame 124 of the second vertical conveyor 122. The frame members 312 of the of the output conveyor 310 may be disposed substantially parallel to and be medially inset from the sides 130 of the second vertical conveyor 122. The output conveyor 310 may be sized such that the frame members 312 are disposed medially to the carrier supports 132 disposed in the upright position. For example, the first frame member 312a may be disposed medially to the first side 130a and the first carrier supports 132a and the second frame member 312b may be disposed medially to the second side 130b and the second carrier supports 132b. The output conveyor 310 may be spaced within the second vertical conveyor 122 such that the medial first and second carrier supports 132a, 132b may be raised and lowered beyond (e.g., outside) the first and second frame members 312a, 312b. The upstream end of the output conveyor 310 may be narrower than the carriers such that the output conveying surface 314 may support and contact carriers lowered by the carrier supports 132a, 132b. For example, the bottom surface of the carriers supported by the carrier supports 132a, 13b may be lowered onto output conveying surface 314 and the corresponding carrier supports 132a, 132b may be lowered below the output conveying surface 314, as detailed below.

The upstream end of the output conveyor 310 may be disposed near the front 126 of the frame 124 of the second vertical conveyor 122. The output conveyor 310 may be disposed such that carriers lowered by the first and second carrier supports 132a, 132b may be lowered substantially onto the output conveying surface 314. For example, the upstream end of the output conveyor 310 may extend into the frame 124 of the second vertical conveyor 122 upstream of the horizontal position at which the carriers are lowered by the carrier supports 132a, 132b of the second vertical conveyor 122. The sides of the carrier may extend over the first and second frame member 312a, 312b of the output conveyor 310 when carrier is lowered onto the output conveyor 310. The output conveying surface 314 may be disposed at a height to convey carriers out of the second vertical conveyor 122, such downstream along a conveyor system. In some embodiments, the output conveying surface 314 of the output conveyor 310 is disposed at substantially the same height as the input conveying surface 304 of the input conveyor 300 (e.g., the first height).

Referring now to FIG. 19A-19D, an exemplary carrier 200 is illustrated which may be used in conjunction with the conveyor system 100. The carrier 200 may be conveyed into the conveyor system 100, such as from an input conveyor, through the conveyor system 100, and out of the conveyor system 100, such as via an output conveyor. The carrier 200 may support one or more workpieces 218 to be conveyed through the conveyor system 100 and/or the carrier 200 may contain or otherwise receive one or more articles or items therein. It will be understood that the workpieces 218 may be any components, pieces, articles, or items to be conveyed through the conveyor system 100, such as any components, pieces, articles, or items which may bake, heat-treat, or cure when exposed to a given temperature for a predetermined amount of time. The carrier 200 may be configured such that one or more articles or items may bake when supported by the carrier 200, such as when the carrier 200 is conveyed through or otherwise disposed in an oven.

In the illustrated embodiment, the carrier 200 is substantially box-shaped with a front wall 202, a rear wall 204 opposite the front wall 202, and two side walls 206 extending between the front and rear walls 202, 204. The carrier 200 has a top surface 208 extending substantially between the front and rear walls 202, 204 and substantially between the side walls 206. The carrier 200 also includes a bottom surface 210 opposite the top surface 208. The top surface 208 is configured to support workpieces 218 thereon. The bottom surface 210 of the carrier 200 is configured such that the carrier 200 may be disposed on and conveyed along input and output conveyors (e.g., input conveyor 300 and output conveyor 310) and such that the carrier 200 may be carried by opposing carrier supports 112 of the first vertical conveyor 102 and by opposing carrier supports 132 of the second vertical conveyor 122. The carrier 200 has a width extending between the side walls 206 that is substantially equivalent to (e.g., slightly less than) the distance between the vertical portions of opposing carrier supports 112, 132 when the carrier supports 112, 132 are oriented inwardly (e.g., toward medial portions of the frames 104, 124).

The carrier 200 may be substantially heat resistant such that workpieces 218 disposed on the carrier 200 may bake when the carrier 200 is subjected to higher temperatures, such as in an oven. In some embodiments, the top surface 208 is mesh or latticed, such as to improve heat dissipation of the carrier 200, to decrease manufacturing costs, and/or to decrease the weight of carrier 200. However, it will be understood that the carrier 200 may have other configurations. For example, in some embodiments, a central portion of the top surface 208 may be substantially solid and/or include one or more walls extending vertically and disposed substantially around the solid central portion of the top surface 208, such as to better support or contain the workpiece(s) 218 on the carrier 200.

In some embodiments, the bottom surface 210 of the carrier 200 includes a frame extending around the perimeter of the bottom surface 210. For example, the frame may be disposed below the latticed portion of the top surface 208. The frame may increase the structural integrity of the carrier 200, such as when the carrier 200 is lifted or otherwise supported by the carrier supports 112, 132 of the first or second vertical conveyors 102, 122. The bottom surface 210 of the carrier 200 may also include one or more supports extending across at least a portion of the bottom surface 210 to increase the structural integrity of the carrier 200.

The carrier 200 includes two or more handles 212 extending upwardly from the top surface 208 and/or one or more of the front wall 202, the rear wall 204, and the side walls 206. Each handle 212 includes a handle body 214 defining an eyelet 216 extending through a medial portion of the handle body 214. Each handle 212 is configured such that at least a portion of one of the lateral supports 150 (e.g., the lateral projection 154) may be disposed laterally through the eyelet 216 and such that, when the carrier 200 is lowered, an upper surface of the lateral support 150 may abut an upper portion of the handle body 214 such that the carrier 200 may be supported by the lateral support 150, as described below. In some embodiments, the eyelets 216 are substantially triangular with a wider bottom and being substantially tapered or narrowed toward the top. For example, the bottom of each eyelet 216 may be widened such that one of the lateral projections 154 may move laterally into and out of the eyelets 216 and the top of each eyelet 216 may be narrowed such that the handle 212 may be retained on the lateral support 150 (e.g., on the lateral projection 154) when the handle 212 is lowered onto the lateral support 150.

The handles 212 are positioned and oriented around the carrier 200 such that the carrier 200 may be substantially supported and level when the carrier 200 is lifted by each of the handles 212. The handles 212 may be positioned on the top surface 208 near the front and rear walls 202, 204 to stabilize the carrier 200 when the carrier 200 is lifted by the handles 212. The carrier 200 may include two handles 212 near the front wall 202 on opposite sides of the front wall 202 (e.g., near each of the side walls 206) and two handles 212 near the rear wall 204 on opposite sides of the rear wall 204 (e.g., near each of the side walls 206). For example, the handles 212 may be positioned near the corners of the carrier 200 such that the carrier 200 is substantially balanced when lifted by the handles. The handles 212 may be oriented such that one of the lateral projections 154 of the lateral supports 150 may be moved laterally into and out of each of the eyelets 216 of the handles 212. In some embodiments, the handles 212 are disposed substantially perpendicular to the lateral projections 154 (e.g., the direction of conveyance of the lateral conveyor 142).

In the illustrated embodiment, the handles 212 extend upwardly from the top surface 208 of the carrier 200. However, it will be understood that the handles 212 may be disposed in other positions and configurations. For example, the handles 212 may extend upwardly from the front and rear walls 202, 204. Additionally, the handles 212 may extend upwardly from the side walls 206 or from the top surface 208 near the side walls 206. In the illustrated embodiment, the carrier 200 includes four handles 212. However, it will be understood that the carrier 200 may include any suitable number of handles 212.

The handles 212 may be positioned and oriented around the carrier 200 such that each handle 212 may laterally receive one of the lateral projections 154 through the respective eyelet 216 substantially at the same time. For example, the handles 212 may be positioned around the carrier 200 corresponding to the relative positions of the lateral projections 154 of the lateral supports 150. The handles 212 may be spaced apart in a width direction (e.g., between the side walls 206) a distance substantially corresponding to the distance between the lateral projections 154 of each of the lateral supports 150. The handles 212 may also be spaced in a length direction (e.g., between the front and rear walls 202, 204) a distance substantially corresponding to the distance between the lateral projections 154 of each lateral support 150 disposed on each of the side rails 146a, 146b. For example, the first lateral supports 150a disposed on the first side rail 146a may be spaced apart a distance corresponding to the length between the handles 212 and the second lateral supports 150b disposed on the second side rail 146b may be spaced apart the same distance. The handles 212 may be configured to support the carrier 200 on the lateral supports 150 when the carrier 200 is conveyed by the lateral conveyor 142, as detailed below.

While the carrier 200 has been described as being substantially rectangular or box-shaped, it will be understood that the carrier may have any suitable shape or configuration and may have any number of sides. For example, the top and bottom surfaces 208, 210 may be circular, elliptical, ovular, or other suitable shape and have a corresponding number of sides (e.g., one side when the top and bottom surfaces 208, 210 are circular, elliptical, ovular). Additionally, while the carrier 200 is illustrated as a pallet upon which articles or items may be placed, it will be understood that the conveyor system 100 may be used with any suitable carrier. For example, the conveyor system 100 may be used with a container, such as a basket or a bin, in which articles or items may be placed or stored. Additionally, the conveyor system 100 may directly convey the article or item to be conveyed without the use of a carrier.

Referring now to FIGS. 20A-24, the conveyor system 100 may be configured to convey carriers 200 upwardly through the first vertical conveyor 102, laterally via the lateral conveyor 142, and downwardly through the second vertical conveyor 122. The carriers 200 may be conveyed into the first vertical conveyor 102 via the input conveyor 300 and the carriers may be conveyed out of the second vertical conveyor 122 via the output conveyor 310. While the conveyor system 100 is described as conveying carriers from the input conveyor 300 to the output conveyor 310, it will be understood that the conveyor system 100 may be utilized in other manners and configurations. For example, one or more users may place carriers into the first vertical conveyor 102 and one or more users may remove carriers from the second vertical conveyor 122, such as via equipment such as a forklift.

Figure 20A:
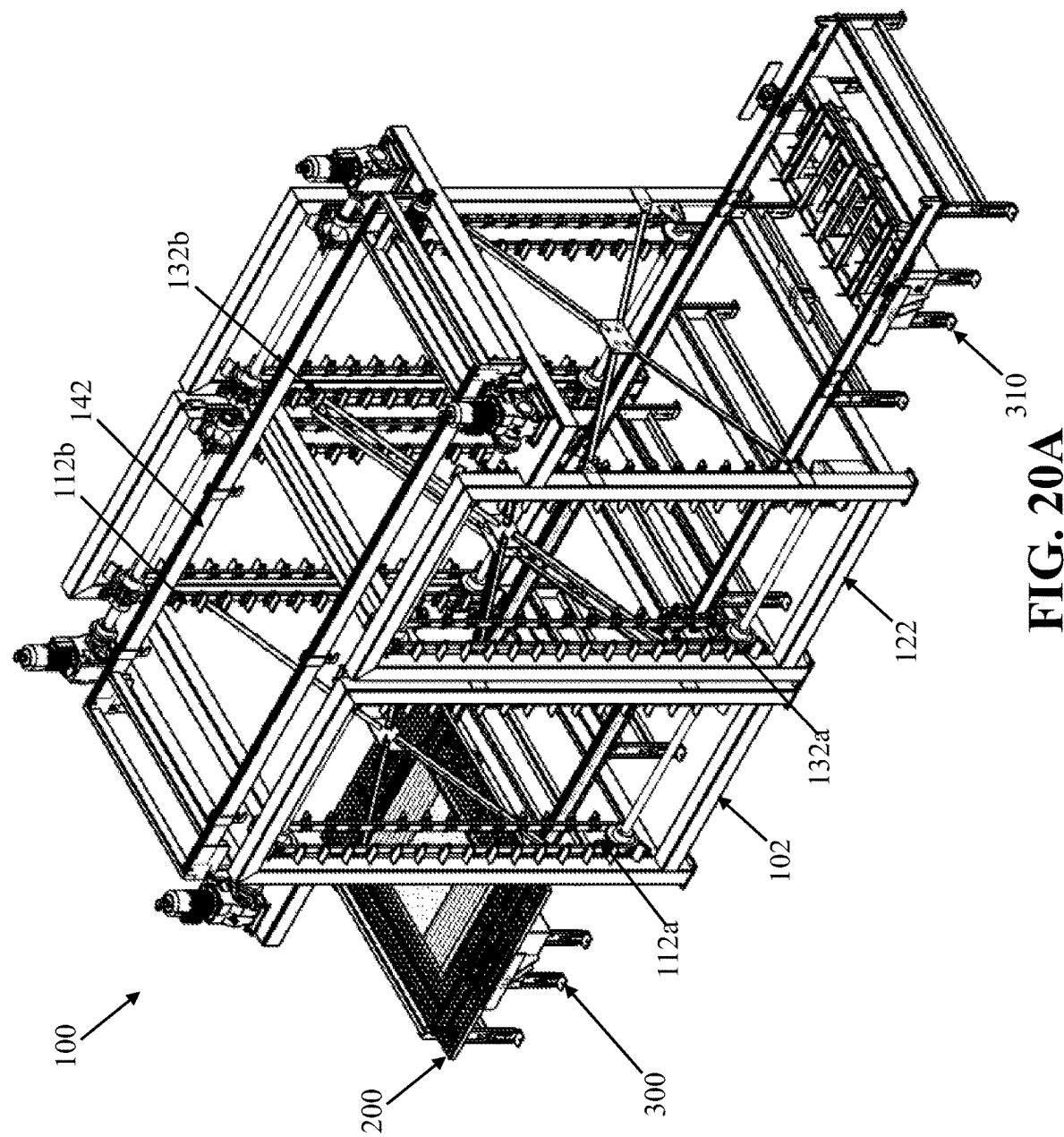
FIG. 20A is a perspective view of a carrier being received in the conveyor system of FIG. 15.
Figure 20B:
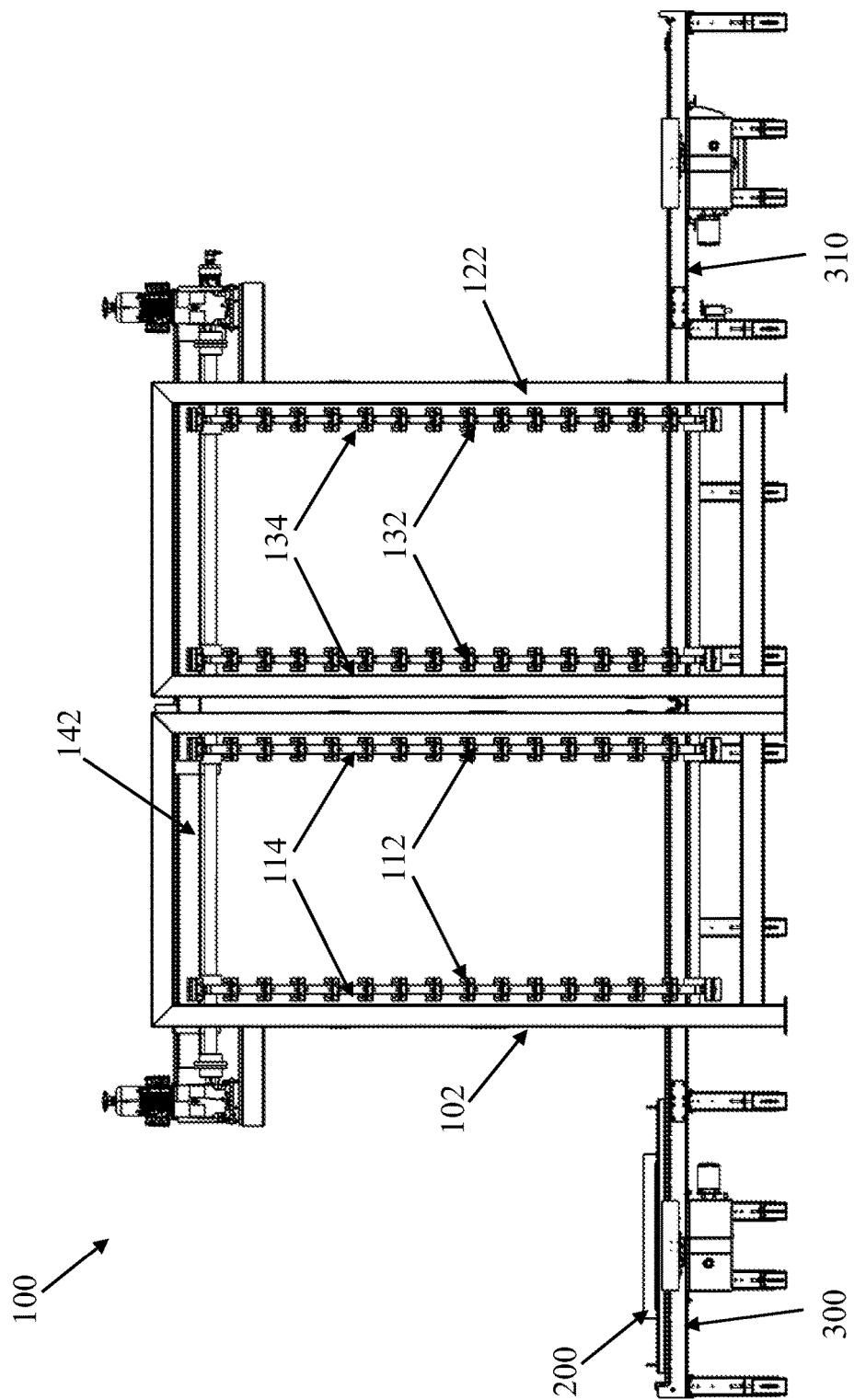
FIG. 20B is a side view of the conveyor system of FIG. 20A.

Referring to FIGS. 20A-20B carriers 200 may be conveyed from the input conveyor 300 into the first vertical conveyor 102. The carriers 200 may be initially conveyed on the input conveying surface 304 of the input conveyor 300 such that the side walls 206 of the carrier 200 are disposed laterally beyond the frame members 302 of the input conveyor 300. The carrier 200 may be disposed on the input conveying surface 304 such that the bottom surface 210 of the carrier 200 is exposed on each side of the input conveyor 300.

The carrier 200 may be conveyed into the frame 104 of the first vertical conveyor 102 at a first height (e.g., the height of the input conveying surface 304 of the input conveyor 300) such that the carrier 200 aligns with the direction of travel of the carrier supports 112 of the first vertical conveyor 102. The carrier 200 may be conveyed between the sides 110 of the first vertical conveyor 102 such that a portion of the carrier 200 (e.g., the front wall 202) is disposed downstream of the carrier supports 112 and such that a portion of the carrier 200 (e.g., the rear wall 204) is disposed upstream of the carrier supports 112. The carrier 200 may be conveyed into the first vertical conveyor 102 such that the carrier supports 112 are disposed evenly around the carrier 200 such that the carrier 200 may be balanced on the carrier supports 112, as detailed below. In some embodiments, the carrier 200 contacts the shoulder of the input conveyor 300 such that the carrier 200 is substantially aligned to be lifted by the carrier supports 112 of the first vertical conveyor 102. The carrier supports 112 may be disposed above and below the carrier 200 as the carrier 200 is conveyed into the first vertical conveyor 102 such that the carrier supports 112 do not abut the carrier 200 as the carrier 200 is conveyed laterally into the first vertical conveyor 102. For example, some of the carrier supports 112 disposed in the upright position may be disposed below the first height and the other carrier supports 112 disposed in the upright position may be disposed above a height of the carrier 200 and the articles disposed thereon.

Referring to FIGS. 21A-21C, after the carrier 200 is conveyed into first vertical conveyor 102 such that the carrier 200 is aligned with the carrier supports 112, the carrier supports 112 may be elevated (e.g., raised) such that the carrier supports 112 disposed immediately below the carrier 200 contact the bottom surface 210 of the carrier 200. The drive 118 of the first vertical conveyor 102 may be actuated to rotate the continuous belts 114 such that the carrier supports 112 disposed in the upright configuration (e.g., the carrier supports 112 disposed between the input conveyor 300 and the drive shafts 116) are elevated. The carrier supports 112 may be elevated such that the lateral portions of the carrier supports 112 abut the bottom surface 210 of the carrier 200 near the side walls 206 and without abutting the frame members 302 of the input conveyor 300. For example, the first carrier supports 112a may contact the bottom surface 210 of the carrier 200 between the first side 110a of the first vertical conveyor 102 and the first frame member 302a of the input conveyor 300 and the second carrier supports 112b may contact the bottom surface 210 of the carrier 200 between the second side 110b of the first vertical conveyor 102 and the second frame member 302b of the input conveyor 300.

The carrier supports 112 may be elevated farther such that the carrier supports 112 lift the carrier 200 off the input conveying surface 304 of the input conveyor 300. The carrier supports 112 may be positioned and configured such that the carrier supports 112 evenly support and balance the carrier 200 as the carrier 200 is lifted in the first vertical conveyor 102. For example, the first vertical conveyor 102 may include two sets of each of the first and second carrier supports 112a, 112b such that the carrier 200 is supported near the front wall 202 and near the rear wall 204. In some embodiments, the vertical portions of the carrier supports 112 supporting the carrier 200 may abut the side walls 206 of the carrier 200, such as to align the carrier 200 within the first vertical conveyor 102. For example, the vertical portions of the carrier supports 112 may align the carrier 200 such that the handles 212 may be aligned with the lateral supports 150 of the lateral conveyor 142.

Referring to FIGS. 22A-22E, each carrier 200 may be conveyed upwardly through the first vertical conveyor 102 to be received by the lateral conveyor 142. The carrier supports 112 may be raised, such as via the continuous belts 114, such that the carrier 200 is raised toward the top of the first vertical conveyor 102. The carrier supports 112 supporting the carrier 200 may be elevated to a second height such that the eyelets 216 of the carrier 200 are substantially aligned with (e.g., at the same height as) the lateral projections 154 of the lateral conveyor 142. As the carrier supports 112 supporting the carrier 200 are elevated to the second height, the lateral supports 150 of the lateral conveyor 142 may be disposed in a first horizontal position such that each lateral support 150 is disposed upstream of the corresponding handle 212 of the carrier 200. For example, the upstream (e.g., rear) first and second lateral supports 150a, 150b may be disposed laterally upstream (e.g., toward the front 106 of the first vertical conveyor 102) of the handles 212 disposed near the rear wall 204 of the carrier 200 and the downstream (e.g., front) first and second lateral supports 150a, 150b may be disposed laterally upstream of the handles 212 disposed near the front wall 202 of the carrier 200 (e.g., between laterally between the handles 212 near the front wall 202 and the handles 212 near the rear wall 204).

While the carriers 200 are described as being conveyed upwardly through the first vertical conveyor 102, it will be understood that the first vertical conveyor 102 may lift or otherwise raise the carrier 200 in a noncontinuous manner from the first height to the second height. For example, the first vertical conveyor 102 may iteratively raise the carrier 200, maintain the vertical position of the carrier 200 (e.g., dwell), lower the carrier 200, and again raise the carrier 200 between the first and second heights, such that other carriers disposed above the carrier 200 may be transferred from the first vertical conveyor 102 to the second vertical conveyor 122, as described below.

After the carrier supports 112 supporting the carrier 200 are disposed at the second height, the lateral supports 150 of the lateral conveyors 142 may be moved laterally downstream (e.g., toward the second vertical conveyor 122) to a second horizontal position such that the lateral supports 150 engage the handles 212 of the carrier 200. For example, the drive 162 of the lateral conveyor 142 may rotate the continuous belts 160 to laterally move the lateral supports 150 toward the second vertical conveyor 122. Each lateral support 150 may be moved laterally such that the respective lateral projection 154 is inserted at least partially through the eyelet 216 of the corresponding handle 212 of the carrier 200. When the lateral supports 150 are moved to the second horizontal position, the neck 156 of each lateral support 150 may abut the rear face of the respective handle 212 (e.g., surface facing the rear wall 204 of the carrier). In some embodiments, the first and second lateral supports 150a, 150b are moved laterally in unison.

After the lateral supports 150 are moved to the second horizontal position to engage the handles 212 of the carrier 200, the carrier supports 112 supporting the carrier 200 may then be lowered to a third height lower than the second height such that the respective carrier supports 112 are disposed beneath (e.g., lowered from) the bottom surface 210 of the carrier 200. The carrier supports 112 may no longer contact the carrier 200 when the carrier supports 112 are disposed at the third height. The lateral supports 150 may remain at the second horizontal position as the carrier supports 112 are lowered to the third height such that the carrier 200 is lowered onto the lateral supports 150. For example, the carrier 200 may be lowered such that an upper portion of each handle 212 rests upon an upper surface of the lateral projection 154 inserted through the respective eyelet 216. The handles 212 and the lateral supports 150 may be positioned and configured such that the carrier 200 is substantially level when supported by lateral supports 150 of the lateral conveyor 142.

The carrier 200 may be conveyed laterally via the lateral conveyor 142 and transferred to the second vertical conveyor 122. The lateral supports 150 of the lateral conveyor 142 may be moved laterally from the second horizontal position to a third horizontal position substantially above the carrier supports 132 of the second vertical conveyor 122. For example, the drive 138 of the second vertical conveyor 122 may rotate the continuous belts 134 to laterally move the lateral supports 150 to the third horizontal position. The carrier 200 may be suspended from the lateral supports 150 via the handles 212 such that the carrier 200 is suspended from the lateral supports 150 and such that the carrier 200 is moved laterally with the lateral supports 150. In some embodiments, the handles 212 rest on the lateral projections 154 and the each neck 156 abuts the rear face of the respective handle 212 such that lateral movement of the lateral supports 150 drives the carrier 200 laterally via abutment between the necks 156 of the lateral supports 150 and the handles 212 of the carrier 200. The carrier support portions 152 of the lateral supports 150 may be sized, shaped, and configured such that the carrier 200 remains substantially level and coupled to the lateral supports 150 as the lateral supports 150 are moved from the second horizontal position to the third horizontal position. When the lateral supports 150 are in the third horizontal position, the carrier 200 may be disposed above the carrier supports 132 of the second vertical conveyor 122. The carrier 200 may be disposed in alignment with the carrier supports 132 of the second vertical conveyor 122 such that the carrier 200 is substantially balanced when vertically transferred to the carrier supports 132 of the second vertical conveyor 122. In some embodiments, the controller 190 may output one or more command outputs to control the timing and/or movement of the lateral supports 150 to engage with the handles 212 of the carrier 200 and convey the carrier 200 from the top of the first vertical conveyor 102 to the top of the second vertical conveyor 122.

As the lateral supports 150 of the lateral conveyor 142 are moved from the second horizontal position to the third horizontal position, the carrier supports 112 of the first vertical conveyor 102 may be raised again, such as to convey subsequent carriers 200 up the first vertical conveyor 102 to the lateral conveyor 142. The continuous belts 114 of the first vertical conveyor 102 may be rotated such that the carrier supports 112 which elevated the carrier 200 through the first vertical conveyor 102 loop around the upper drive shafts 116b to descend on the outside of the continuous belts 114 in the upside down position. The process of elevating the carrier supports 112 to transfer carriers to the lateral conveyor 142 may be repeated for subsequent carriers. For example, the continuous belts 114 of the first vertical conveyor 102 may be rotated to elevate the carrier supports 112 immediately below the carrier supports 112 which conveyed the carrier 200 to the lateral conveyor 142 to the second height to repeat the process. In some embodiments, the controller 190 may output one or more command outputs to control the timing and/or movement of the carrier supports 112 to raise the carrier 200 through the first vertical conveyor 102 to be received by the lateral conveyor 102, lower the carrier 200 onto the lateral supports 150, and raise subsequent carriers in the first vertical conveyor 102.

When the lateral supports 150 are moved from the second horizontal position to the third horizontal position, the carrier supports 132 near the top of the second vertical conveyor 122 may be disposed lower than the carrier 200 when the lateral supports 150 supporting the carrier 200 are disposed in the third horizontal position such that the carrier supports 132 of the second vertical conveyor 122 do not interfere with the carrier 200. For example, the upper carrier supports 132 of the second vertical conveyor 122 may be disposed at the third height such that the handles 212 of the carrier 200 are at least partially lifted off the lateral projections 150 of the lateral supports 150. In some embodiments, the controller 190 may output one or more command outputs to control the timing and/or movement of the carrier supports 132 to lift the carrier 200 at least partially off the lateral supports 150.

After the lateral supports 150 of the lateral conveyor 142 are moved to the third horizontal position with the carrier 200 disposed substantially above the carrier supports 132 of the second vertical conveyor 122, the carrier supports 132 of the second vertical conveyor 122 may be raised to engage the carrier 200. The carrier supports 132 of the second vertical conveyor 122 may be raised, such as via the continuous belts, such that the carrier supports 132 contact the bottom surface 210 of the carrier 200 and decouple the carrier 200 from the lateral supports 150 of the lateral conveyor 142. The lateral portions of the carrier supports 132 may contact the bottom surface 210 of the carrier 200 and lift the carrier 200 as the carrier supports 132 are raised. The carrier supports 132 may be disposed and configured to substantially support the carrier 200 when the carrier 200 is transferred to the second vertical conveyor 122. The carrier supports 132 may be raised such that the carrier 200 is raised relative to the lateral supports 150 and such that the handles 212 of the carrier 200 are lifted off the lateral projections 154 of the lateral supports 150. The carrier supports 132 may raise the carrier 200 such that the upper portions of the handles 212 no longer rest on the upper surfaces of the lateral projections 154. For example, the upper carrier supports 132 may be raised from the third height to the second height to decouple the carrier 200 from the lateral supports 150 of the lateral conveyor 142.

After the carrier supports 132 of the second vertical conveyor 122 are raised to engage and support the carrier 200, the lateral supports 150 of the lateral conveyor 142 may be moved to a fourth horizontal position such that the lateral supports 150 are disengaged from the carrier 200. For example, the continuous belts 160 of the lateral conveyor 142 may be driven in the opposite direction such that the lateral supports 150 are laterally moved toward the front 106 of the first vertical conveyor 102. The lateral supports 150 may be moved laterally such that that the lateral projections 154 are retracted from the eyelets 216 of the handles 212 of the carrier 200. When the lateral supports 150 are disengaged from the carrier 200 (e.g., the lateral projections 154 are retracted from the eyelets 216 of the handles 212), the carrier 200 may be transferred from the lateral conveyor 142 to the second vertical conveyor 122 such that the carrier 200 is supported by the uppermost carrier supports 132 disposed in the upright position. The carrier 200 may be substantially balanced on the carrier supports 132. For example, the vertical portions of the carrier supports 132 may be adjacent to or may abut the side walls 206 of the carrier 200 and the carrier supports 132 may be disposed evenly around the carrier 200, such as with the front wall 202 of the carrier 200 disposed downstream of the downstream (e.g., front) first and second carrier supports 132a, 132b and with the rear wall 204 of the carrier 200 disposed upstream of the upstream (e.g., rear) first and second carrier supports 132a, 132b.

After the lateral supports 150 are moved to the fourth horizontal position, the lateral supports 150 may be moved laterally back toward the first horizontal position, such as to repeat the process of receiving a carrier from the first vertical conveyor 102 and laterally conveying the carrier to the second vertical conveyor 122. The carrier supports 112 of the first vertical conveyor 102 and the carrier supports 132 of the second vertical conveyor 122 may be moved or otherwise positioned (e.g., lowered) such that the lateral supports 150 do not contact the carrier supports 112, 132 as the lateral supports 150 are moved back to the first horizontal position. In some embodiments, the controller 190 may output one or more command outputs to control the timing and/or movement of the lateral supports 150, the carrier supports 112 of the first vertical conveyor 102, and the carrier supports 132 of the second vertical conveyor 122 to horizontally transfer and release the carrier 200 above the second vertical conveyor 122 and subsequently return the lateral supports 150 to the first horizontal position without contacting the carrier supports 112, 132 of the first or second vertical conveyors 102, 122. For example, the controller 190 may output one or more command outputs to lower the carrier supports 132 of the second vertical conveyor 122 supporting the carrier 200 before the lateral supports 150 are retracted to the first horizontal position, as described below.

Referring to FIGS. 23A-24, each carrier 200 may be conveyed downwardly through the second vertical conveyor 122 and transferred to the output conveyor 310. The carrier supports 132 of the second vertical conveyor 122 may be lowered toward the bottom of the second vertical conveyor 122, such as toward the output conveyor 310, such that the carrier 200 may be output from the second vertical conveyor 122. For example, the drive 138 may rotate the continuous belts 134 to lower the carrier supports 132 toward the bottom of the second vertical conveyor 122.

In some embodiments, the carrier supports 132 may be lowered to transfer the carrier 200 from the second vertical conveyor 122 to the output conveyor 310. The carrier supports 132 may be lowered such that the bottom surface 210 of the carrier 200 rests upon the output conveying surface 314 of the output conveyor 310. The carrier supports 132 may be lowered such that the carrier 200 is substantially supported on the output conveying surface 314 of the output conveyor 310. The carrier supports 132 may be disposed laterally beyond the frame members 312 of the output conveyor 310 such that the carrier supports 132 may be raised and lowered between the between the drive shafts 136 and the frame members 312 of the output conveyor 310. For example, when supporting the carrier 200, the first carrier supports 132a (when in the upright position) may be disposed between the drive shafts 136 near the first side 130a of the second vertical conveyor 122 and the first frame member 312a of the output conveyor 310 and the second carrier supports 132b may be disposed between the drive shafts 136 near the second side 130b of the second vertical conveyor 122 and the second frame member 312b of the output conveyor 310. After the carrier 200 is supported by the output conveyor 310, the carrier supports 132 which previously supported the carrier 200 may be lowered below the output conveying surface 314 such that carrier supports 132 no longer contact the carrier 200 and such that the carrier 200 may be conveyed out of the second vertical conveyor 122. For example, the output conveying surface 314 may be driven to convey the carrier 200 downstream through the remainder of the conveying operation. In some embodiments, the controller 190 may output one or more command outputs to control the timing and/or movement of the carrier supports 132 to lower the carrier 200 through the second vertical conveyor 122.

While the carriers 200 are described as being conveyed downwardly through the second vertical conveyor 122, it will be understood that the second vertical conveyor 122 may lower the carrier 200 in a noncontinuous manner from the lateral conveyor 142 to the output conveyor 310. For example, the second vertical conveyor 122 may iteratively lower the carrier 200, maintain the vertical position of the carrier 200 (e.g., dwell), raise the carrier 200, and again lower the carrier 200 between the lateral conveyor 142 and the output conveyor 310, such that other carriers may be transferred from the lateral conveyor 142 to the carrier supports 132 of the second vertical conveyor 122 above the carrier 200, as described above.

In some embodiments, the second vertical conveyor 122 is configured and/or operated such that subsequent carriers and/or higher carrier supports 132 (e.g., carrier supports 132 disposed above the carrier supports 132 which conveyed the carrier 200) do not contact or otherwise interfere with the carrier 200 as the carrier 200 is conveyed out of the second vertical conveyor 122. For example, the first and second carrier supports 132a, 132b may be spaced vertically apart on the first and second continuous belts 134a, 134b such that the carrier supports 132 immediately above the carrier supports 132 which lowered the carrier 200 onto the output conveyor 310 do not contact or otherwise interfere with the carrier 200 as the carrier 200 is conveyed on the output conveying surface 314 and the continuous belts 134 are rotated. Additionally or alternatively, the continuous belts 134 may be driven or operated such that the carrier supports 132 do not contact or otherwise interfere with the carrier 200 as the carrier 200 is conveyed on the output conveying surface 314. For example, the controller 190 may generate one or more output commands which cause the drive 138 of the second vertical conveyor 122 to temporarily stop as the carrier 200 is conveyed out of the second vertical conveyor 122 and/or which cause the continuous belts 134 to raise the carrier supports 132, such as to transfer a subsequent carrier 200 from the lateral conveyor 142 onto the upper carrier supports 132 of the second vertical conveyor 122.

It will be understood that the conveyor system 100 may be configured to simultaneously convey a plurality of carriers 200 through and that the conveyor system 100 may be sized, shaped, and configured such that articles disposed on the carriers 200 substantially bake when conveyed through the conveyor system 100. The conveyor system 100 may be configured and operated such that each workpiece 218 disposed on the carrier 200 is subjected to a desired temperature for a desired amount time as the carrier 200 is conveyed through the conveyor system 100. For example, the conveyor system 100 may be disposed in an oven and an amount of time required to convey each carrier 200 through the conveyor system 10 may substantially correspond to an amount of time that articles disposed on the carriers 200 require to bake in the oven. Additionally, the conveyor system 100 may be operated and configured to continuously convey carriers 200 through the conveyor system 100 (e.g., to continuously receive carriers into the first vertical conveyor 102 and continuously output carriers from the second vertical conveyor 122) with a plurality of carriers simultaneously disposed in the conveyor system 100. For example, the conveyor system 100 may be configured such that a plurality of carriers may be conveyed on the separate rungs of carrier supports 112 of the first vertical conveyor 102, a carrier may be conveyed by the lateral supports 150 of the lateral conveyor 142, and a plurality of carriers may be conveyed by the separate rungs of carrier supports 132 of the second vertical conveyor 122 while the conveyor system 100 is operated.

While the above operation has been described in context with the carrier 200 of FIGS. 19A-19D, it will be understood that the conveyor system 100 may be configured to operate with other suitable carriers which may be independently conveyed from the through the first vertical conveyor 102, the lateral conveyor 142, and the second vertical conveyor 122. Additionally, while the conveyor system 100 has been described as elevating then laterally conveying and then lowering the carrier, it will be understood that the conveyor system 100 may have other configurations. For example, the first vertical conveyor 102 may be configured to lower the carrier, the lateral conveyor 142 may be disposed below the first vertical conveyor 102, and the second vertical conveyor 122 may be configured to elevate the carrier when received from the lateral conveyor 142.

FIG. 25 illustrates an exemplary methodology relating to temporary buffer conveyance of carriers. While the methodology is shown as being a series of acts that are performed in sequence, it is to be understood and appreciated that the methodology is not limited by the order of the sequence. For example, some acts can occur in a different order than what is described herein. In addition, an act can occur in concurrence with another act. Further, in some instances, not all acts may be required to implement the methodology described herein.

Moreover, the acts described herein may be controlled by computer-executable instructions that can be implemented by one or more processors and/or stored on computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

With reference to FIG. 25, a flow diagram illustrating a method 400 performed by a conveyor system is illustrated. The conveyor system may perform the methodology 400 to provide buffer conveyance within a limited footprint, such as to increase the time articles conveyed through the conveyor system spend in a particular location or environment, such as an oven.

At step 402, a carrier is received in a first vertical conveyor of the conveyor system. One or more articles may be disposed on the carrier and the carrier may include one or more handles with eyelets. The first vertical conveyor may receive the carrier at a first height (e.g., an input height). As described above, the carrier may be conveyed into the first vertical conveyor via an input conveyor having an input conveying surface disposed at the first height. The carrier may be disposed on the input conveying surface of the input conveyor such that the sides of the carrier extend laterally beyond the sides of the input conveyor.

At step 404, the carrier may be lifted by one or more carrier supports of the first vertical conveyor. As described above, the first vertical conveyor may include first carrier supports spaced vertically along a first side of the frame and a plurality of second carrier supports spaced vertically along a second side of the frame, each first carrier support being vertically aligned with one or more second carrier supports. The carrier supports are disposed laterally between the respective side of the first vertical conveyor and the respective side frame member of the input conveyor. One or more carrier supports are disposed below the input conveying surface and the bottom surface of the carrier. The carrier supports are raised, such as via continuous belts, to elevate the carrier supports such that one or more carrier supports (e.g., one or more first carrier supports and one or more second carrier supports) lift the carrier off the input conveying surface. As described above, lateral portions of the carrier supports may extend at least partially under the carrier and vertical portions of the carrier may abut side walls of the carrier, such as to align the carrier with the carrier supports and the first vertical conveyor. The carrier supports may be raised to a second height (e.g., a transfer height) such that one or more handles of the carrier are disposed substantially in line with one or more lateral supports of a lateral conveyor of the conveyor system. The lateral supports may be disposed at a first horizontal position upstream of the handles as the carrier supports are raised to the second height. For example, the lateral supports may be disposed at the first horizontal position such that lateral supports do not contact or otherwise interfere with the carrier supports or the carrier as the carrier supports are raised to the second height.

It will be understood that the first vertical conveyor may lift or otherwise raise the carrier in a noncontinuous manner from the first height to the second height. For example, the first vertical conveyor may iteratively raise the carrier, maintain the vertical position of the carrier (e.g., dwell), lower the carrier, and again raise the carrier, such that other carriers disposed above the carrier may be transferred from the first vertical conveyor to the second vertical conveyor, as described below.

At step 406, the carrier is transferred to a lateral conveyor of the conveyor system. As described above, the lateral supports of the lateral conveyor may be driven laterally to a second horizontal position to couple with the carrier. For example, the lateral supports may be driven via one or more continuous belts of the lateral conveyor. The lateral supports may be moved laterally such that lateral projections of the lateral supports are each disposed through an eyelet of the carrier when the lateral supports are in the second horizontal position.

At step 408, the carrier supports of the first vertical conveyor are lowered such that the carrier is supported entirely by the lateral supports of the lateral conveyor. When the lateral supports are in the second horizontal position and each of the lateral projections extend through one of the eyelets, the carrier supports of the first vertical conveyor may be lowered to decouple the carrier from the carrier supports. The carrier supports may be lowered to a third height (e.g., a release height) lower than the second height such that the carrier supports are below the bottom surface of the carrier and such that the carrier supports no longer support the carrier. The carrier may be suspended from the lateral supports when the carrier supports are lowered from the carrier.

At step 410, the carrier is laterally (e.g., horizontally) conveyed from above the carrier supports of the first vertical conveyor to a position substantially above the carrier supports of a second vertical conveyor. The lateral supports may be laterally driven from the second horizontal position to a third horizontal position substantially above one or more carrier supports of a second vertical conveyor. As described above, each of the lateral supports may include a carrier support portion configured to secure and laterally convey the carrier as the lateral supports are moved laterally. For example, the carrier support portions of each of the lateral supports may include the lateral projection and a neck configured to abut a portion of the carrier to laterally drive the carrier with the lateral supports. The second vertical conveyor may include first carrier supports spaced vertically along a first side of the frame and a plurality of second carrier supports spaced vertically along a second side of the frame, each first carrier support being vertically aligned with one or more second carrier supports. The carrier supports of the second vertical conveyor may be disposed at a height such that the carrier supports do not contact or interfere with the lateral supports or the carrier as the lateral supports convey the carrier substantially above the carrier supports of the second vertical conveyor. For example, the upper carrier supports of the second vertical conveyor may be disposed below the carrier (e.g., at the third height) as the lateral conveyor conveys the carrier above the carrier supports of the second vertical conveyor.

At step 412, the carrier supports of the second vertical conveyor are raised to engage and lift the carrier. The carrier supports of the second vertical conveyor may be raised, such as via continuous belts, to elevate the carrier supports such that one or more carrier supports lift the carrier at least partially off the lateral supports of the lateral conveyor. As described above, lateral portions of the carrier supports may extend at least partially under the carrier and vertical portions of the carrier may abut side walls of the carrier, such as to align the carrier with the carrier supports and the second vertical conveyor. For example, the carrier supports may be raised to the second height such that the upper portions of the handles are lifted off the lateral projections of the lateral supports and such that the carrier is substantially supported by the carrier supports of the second vertical conveyor. The lateral supports of the lateral conveyor may remain (e.g., dwell) at the third horizontal position while the carrier supports of the second vertical conveyor lift the carrier at least partially off the lateral supports.

At step 414, the lateral supports are retracted to decouple the lateral supports from the carrier such that the carrier is transferred from the lateral conveyor to the second vertical conveyor. As described above, the lateral supports are moved laterally in an upstream direction such that the lateral projections are retracted from the eyelets of the carrier such that the carrier is released from the lateral support onto the carrier supports of the second vertical conveyor. For example, the lateral supports may be moved laterally upstream to a fourth horizontal position such that the lateral projections are retracted from the eyelets of the carrier and such that the carrier is supported only by the carrier supports of the second vertical conveyor. The lateral supports are not vertically aligned (e.g., overlapped) with the handles when the lateral supports are in the fourth horizontal position. Additionally, the lateral supports may be moved from the retracted position (e.g., fourth horizontal position) to the first horizontal position upstream of the second position, such as to position the lateral supports upstream of the carriers of the first vertical conveyor to repeat step 406. The movement of the lateral supports back to the first horizontal position may be timed or otherwise controlled such that the lateral supports do not contact the carrier supports of the first or second vertical conveyors as the lateral supports are moved back to the first horizontal position.

At step 416, the carrier is lowered by one or more carrier supports of the second vertical conveyor. After the lateral supports are retracted from the carrier, the carrier may be supported entirely by the carrier supports of the second vertical conveyor. The carrier supports of the second vertical conveyor may be lowered such that the carrier is lowered onto an output conveying surface of an output conveyor. As described above, the carrier supports may be lowered, such as via continuous belts, to lower the carrier such that the bottom surface of the carrier is supported by the output conveying surface of the output conveyor. The carrier supports may be subsequently lowered below the output conveying surface such that the carrier is transferred to (e.g., entirely supported by) the output conveyor. The output conveying surface may be disposed at substantially the same height as the input conveying surface (e.g., the first height). The carrier supports which previously supported the carrier may be lowered between the side frame members of the output conveyor and the sides of the second vertical conveyor to a height below the output conveying surface of the output conveyor such that the carrier is disposed entirely on the output conveyor and such that carrier supports do not contact or otherwise interfere with the carrier.

It will be understood that the second vertical conveyor may lower the carrier in a noncontinuous manner from the lateral conveyor (e.g., the second height) to the output conveyor (e.g., the first height). For example, the second vertical conveyor may iteratively lower the carrier, maintain the vertical position of the carrier (e.g., dwell), raise the carrier, and again lower the carrier, such that other carriers may be transferred from the lateral conveyor to carrier supports above the carrier, as described above.

At step 418, the carrier is output from the conveyor system. The carrier may be conveyed out of the second vertical conveyor via the output conveyor. As described above, the conveyor system may be configured and/or operated such that subsequent carriers and/or carrier supports do not interference with the carrier as it output from the conveyor system.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. A conveyor system for conveying a carrier, the conveyor system comprising:
 a first vertical conveyor comprising:
  a frame having a front, a rear, a first side, and a second side;
  a plurality of first carrier supports disposed on a first continuous belt extending along the first side; and a plurality of second carrier supports disposed on a second continuous belt extending along the second side;
a second vertical conveyor comprising:
a frame having a front, a rear, a first side, and a second side;
a plurality of first carrier supports disposed on a first continuous belt extending along the first side; and
a plurality of second carrier supports disposed on a second continuous belt extending along the second side;
a lateral conveyor disposed above the first and second vertical conveyors, the lateral conveyor comprising:
a first side rail disposed near the first sides of the first and second vertical conveyors;
a second side rail disposed near the second sides of the first and second vertical conveyors;
a first lateral support slidably disposed on the first side rail; and
a second lateral support slidably disposed on the second side rail;
wherein the carrier supports of the first vertical conveyor are configured to elevate the carrier to the lateral conveyor, the first and second lateral supports are configured to couple with the carrier elevated by the carrier supports of the first vertical conveyor and laterally convey the carrier to a position substantially above the second vertical conveyor, and the carrier supports of the second vertical conveyor are configured to receive the carrier from the lateral supports and lower the carrier through the second vertical conveyor; and
wherein each of the carrier supports of the first and second vertical conveyors include a vertical portion configured to abut a side wall of the carrier and a lateral portion configured to abut a bottom surface of the carrier.

2. The conveyor system according to claim 1, wherein the first vertical conveyor is configured to receive the carrier from an input conveyor.

3. The conveyor system according to claim 2, wherein the first vertical conveyor is configured to raise and lower the carrier supports of the first vertical conveyor between the sides of the frame of the first vertical conveyor and frame members of the input conveyor.

4. The conveyor system according to claim 1, wherein the second vertical conveyor is configured to convey the carrier to an output conveyor.

5. The conveyor system according to claim 4, wherein the second vertical conveyor is configured to raise and lower the carrier supports of the second vertical conveyor between the sides of the frame of the second vertical conveyor and frame members of the output conveyor.

6. The conveyor system according to claim 1, wherein the lateral supports of the lateral conveyor each include a carrier support portion configured to secure and laterally convey the carrier.

7. The conveyor system according to claim 6, wherein the carrier support portion of each lateral support includes a neck configured to abut a side surface of the carrier and a lateral projection configured to extend through an eyelet of the carrier.

8. A conveyor system comprising:
a first vertical conveyor having first carrier supports affixed to a first continuous belt, second carrier supports affixed to a second continuous belt, and at least one first drive configured to drive the first and second continuous belts;
a second vertical conveyor adjacent to the first vertical conveyor, the second vertical conveyor having third carrier supports affixed to a third continuous belt, fourth carrier supports affixed to a fourth continuous belt, and at least one second drive configured to drive the third and fourth continuous belts;
a lateral conveyor disposed above the first and second vertical conveyors, the lateral conveyor having a first lateral support disposed on a first side rail and affixed to a fifth continuous belt, a second lateral support disposed on a second side rail and affixed to a sixth continuous belt, and a third drive configured to drive the fifth and sixth continuous belts; and
processing circuitry that is configured to perform acts comprising:
generating an output command to cause the first drives to elevate the first and second carrier supports to elevate a carrier from a first height to a second height near a top of the first vertical conveyor;
generating an output command to cause the third drive to laterally move the first and second lateral supports to couple with the carrier at the second height;
generating an output command to cause the first drives to lower the first and second carrier supports from the second height to a third height to disengage from the carrier;
generating an output command to cause the third drive to laterally move the first and second lateral supports to a position above the third and fourth carrier supports;
generating an output command to cause the second drives to elevate the third and fourth carrier supports to lift the carrier and decouple the carrier from the first and second lateral supports;
generating an output command to cause the third drive to laterally move the first and second lateral supports away from the carrier; and
generating an output command to cause the second drives to lower the third and fourth carrier supports in the second vertical conveyor.

9. The conveyor system according to claim 8, wherein the first vertical conveyor further comprises a sensor coupled with the processing circuitry and configured to generate an output indicative of the positions of the first and second carrier supports.

10. The conveyor system according to claim 8, wherein the second vertical conveyor further comprises a sensor coupled with the processing circuitry and configured to generate an output indicative of the positions of the third and fourth carrier supports.

11. The conveyor system according to claim 8, wherein the lateral conveyor further comprises a sensor coupled with the processing circuitry and configured to generate an output indicative of the positions of the first and second lateral supports.

12. The conveyor system according to claim 8, wherein the first and second lateral supports each include a lateral projection configured to be inserted through an eyelet of the carrier to couple the lateral supports to the carrier.

13. The conveyor system according to claim 8, wherein the carrier is received by the first and second carrier supports via an input conveyor and the third and fourth carrier supports lower the carrier onto an output conveyor.

14. A method for conveying a carrier through a conveyor system, the method comprising the steps of:
receiving the carrier at a first height in a first vertical conveyor comprising at least two carrier supports;

elevating the carrier from the first height to a second height via the carrier supports of the first vertical conveyor;

laterally moving lateral supports of a lateral conveyor from a first horizontal position spaced apart from the carrier supports of the first vertical conveyor to a second horizontal position such that the lateral supports couple with the carrier;

lowering the carrier supports of the first vertical conveyor to a third height below the carrier;

laterally moving the lateral supports from the second horizontal position to a third horizontal position substantially above two or more carrier supports of a second vertical conveyor;

elevating the carrier supports of the second vertical conveyor to decouple the carrier from the lateral supports;

laterally moving the lateral supports to a fourth horizontal position to decouple the lateral supports from the carrier;

lowering the carrier supports of the second vertical conveyor; and conveying the carrier out of the second vertical conveyor.

15. The method of claim 14, wherein each of the lateral supports include a lateral projection configured to be inserted at least partially into an eyelet of carrier to couple the lateral projections to the carrier.

16. The method of claim 14, wherein the lateral conveyor is configured to drive the lateral supports substantially horizontally.

17. The method of claim 14, wherein the first vertical conveyor comprises two sets of first carrier supports disposed along a first side of a frame of the first vertical conveyor and two sets of second carrier supports disposed along a second side of the frame of the first vertical conveyor.

18. The method of claim 14, wherein the second vertical conveyor comprises two sets of first carrier supports disposed along a first side of a frame of the second vertical conveyor and two sets of second carrier supports disposed along a second side of the frame of the second vertical conveyor.

19. The method of claim 14, wherein the conveyor system comprises a controller with a memory and a processor, wherein the processor includes a conveyor control module configured to control operations of the conveyor system.

\* \* \* \* \*